US007693142B2

(12) United States Patent  
Beshai

(10) Patent No.: US 7,693,142 B2  
(45) Date of Patent: Apr. 6, 2010

(54) SCALABLE ROUTER-SWITCH

(75) Inventor: Maged E. Beshai, 70 Trailway Circle, Stittsville, Ontario (CA) K2S-1E2

(73) Assignee: Maged E. Beshai, Maberly, Ontario (CA)

( * ) Notice: Subject to any disclaimer, the term of this patent is extended or adjusted under 35 U.S.C. 154(b) by 591 days.

(21) Appl. No.: 11/611,132

(22) Filed: Dec. 14, 2006

(65) Prior Publication Data  
US 2007/0140230 A1 Jun. 21, 2007

(30) Foreign Application Priority Data  
Dec. 16, 2005 (CA) .................................. 2528636

(51) Int. Cl.  
*H04L 12/50* (2006.01)  
*H04J 3/24* (2006.01)

(52) U.S. Cl. .................. 370/380; 370/386; 370/388; 370/474

(58) Field of Classification Search .......... 370/386, 370/388, 474  
See application file for complete search history.

(56) References Cited

U.S. PATENT DOCUMENTS

| | | | | |
|---|---|---|---|---|
| 5,798,580 A | * | 8/1998 | Morozov et al. | 307/112 |
| 5,896,380 A | * | 4/1999 | Brown et al. | 370/388 |
| 6,094,430 A | * | 7/2000 | Hoogenboom | 370/375 |
| 6,233,243 B1 | * | 5/2001 | Ganmukhi et al. | 370/412 |
| 2002/0039362 A1 | * | 4/2002 | Fisher et al. | 370/387 |
| 2002/0159445 A1 | * | 10/2002 | Yanagimachi | 370/355 |
| 2003/0053417 A1 | * | 3/2003 | Munter et al. | 370/244 |
| 2003/0081548 A1 | * | 5/2003 | Langevin et al. | 370/230 |
| 2003/0147393 A1 | * | 8/2003 | Stewart | 370/392 |
| 2005/0180410 A1 | * | 8/2005 | Pepenella | 370/386 |

* cited by examiner

*Primary Examiner*—Huy D Vu  
*Assistant Examiner*—Brandon Renner

(57) ABSTRACT

A scalable router-switch comprises a plurality of switch units each having consolidation means for data disassembling and reassembling. The switch units are arranged into switch modules and the switch units of each switch module are interconnected through a dual rotator to form a contention-free temporal mesh.

20 Claims, 53 Drawing Sheets

SCALABLE ROUTER-SWITCH

CROSS-REFERENCE TO RELATED APPLICATIONS

This application claims priority to Canadian application 2,528,636, which was filed on Dec. 16, 2005.

FIELD OF THE INVENTION

The present invention relates to switching nodes in telecommunication networks and, in particular, to electronic router-switch that scale to high capacities.

BACKGROUND

The economics of telecommunications have changed. In the recent past, every effort was made, through clever mathematical traffic modeling and network optimization, to economize the use of transport links. This naturally led to a network that was heavily dependent on multiple switching en route from source to destination. This practice applied almost equally to both the classical high-quality synchronous switching, as in the telephone network, and to the casual, care-free, but much more flexible, packet network. A disadvantage of transport-optimized approach is that it leads to a switch-cluttered network. A switch-cluttered network employing synchronous switching is still manageable; the global telephone network continues to provide virtually flawless service. A multi-hop network, such as the Internet, that uses care-free packet switching does suffer from the adverse effect of cumulative degradation as a path from source to destination traverses numerous router-switches. The mean number of hops decreases sharply as the dimension of the deployed router switches is increased. The decrement in the number of hops, coupled with the changing economics of signal transport can lead to a much simplified, powerful, and highly efficient telecommunication network.

There is a need, therefore, for a flexible router-switch, which scales gracefully from a capacity of multiple gigabits per second (for example $160 \times 10^9$ bits/second) to a capacity of the order of a petabit per second ($10^{15}$ bits/second). Deployment of such a router-switch enables the construction of a global broadband network of virtually unlimited capacity while significantly reducing the number of hops between any two access points on the planet to an acceptable upper bound. The sought router-switch preferably accommodates individual connections of widely varying granularities, ranging from a few kilobits per second to multiple gigabits per second per user in order to form the basis of an economical monolithic broadband network of global coverage.

SUMMARY

The invention provides a configuration and method of operation of a router-switch that scales from an initial moderate capacity to a capacity of the order of hundreds of terabits per second.

According to one aspect, the present invention provides a large-dimension switch comprising contention-free switch modules each switch module having a plurality of input ports and a plurality of output ports where each input port of a switch module has means for receiving data blocks each having a number of data segments, disassembling each data block into constituent data segments, and aggregating data segments according to selected destinations into new data blocks for contention-free switching within the switch module.

According to another aspect, the invention provides a switch comprising a plurality of switch units each having consolidation means for data disassembling and reassembling. The switch units are arranged into switch modules and each switch module includes m switch units, m>1, interconnected through a dual rotator to form a contention-free temporal mesh. Each switch unit in each switch module connects to κ switch units, κ>1, of κ different switch modules to create a full spatial mesh of (m×κ+1) switch modules.

According to a further aspect, the present invention provides a method of switching in a switch comprising a plurality of switch modules. The method comprises: receiving data units; assembling said data units into primary data blocks, according to a first criterion, each primary data block comprising at least one data unit; switching the primary data blocks through a first switch module; disassembling switched primary data blocks into primary constituent data units; reassembling the primary constituent data units into secondary data blocks according to a second criterion; and switching the secondary data blocks through a second switch module. A switched path may traverse a single switch module, two switch modules, or three switch modules. With two switch modules traversed, the method comprises a further step of disassembling secondary data blocks at each of egress ports of the second switch module into constituent data units for transmission to external data sinks. With three switch modules traversed, the method comprises further steps of: disassembling switched secondary data blocks into secondary constituent data units; reassembling the secondary constituent data units into ternary data blocks according to a third criterion; switching the ternary data blocks through a third switch module; and disassembling ternary data blocks at each of egress ports of the third switch module into ternary constituent data units for transmission to external data sinks.

According to a further aspect, the present invention provides a switch comprising a set of N>2 memory devices arranged in a plurality of combinations each combination comprising at least a number m of memory devices, belonging to the set of N memory devices. Within each combination, each memory device cyclically connects to each other memory device to form a temporal mesh. Each memory device in the set of N memory devices belongs to G combinations from among the plurality of combinations, G being a predefined positive integer. The number m is selected to satisfy the inequality $N \leq m^G$. Any two combinations of the plurality of combinations have at most one memory device in common. The switch further comprises an outer controller associated with each of the N memory devices and a combination controller associated with each combination of said plurality of combinations.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Example embodiments of this invention are described below with reference to accompanying drawings, in which.

TERMINOLOGY

Figure 1:
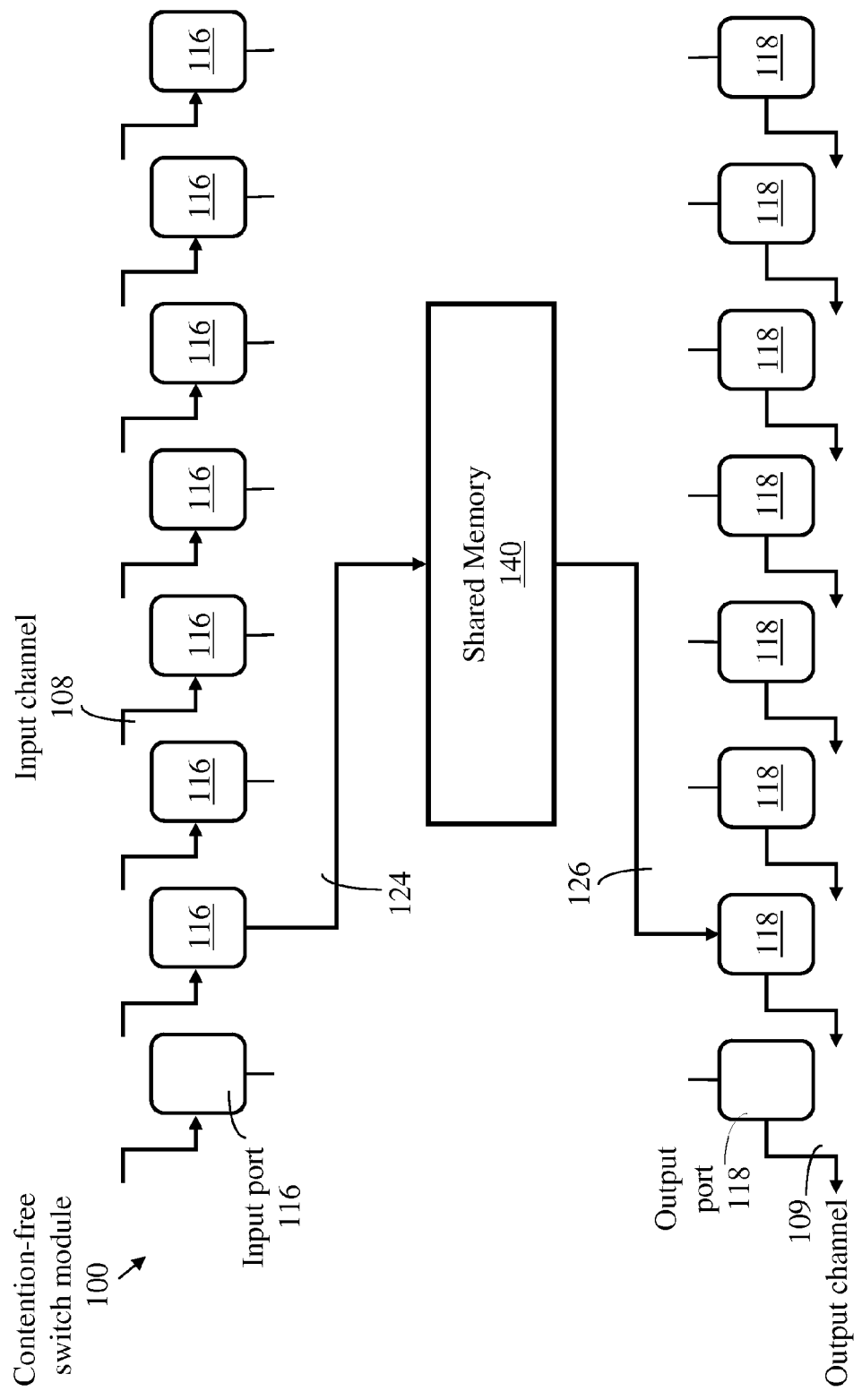
FIG. 1 illustrates a conventional contention-free common-memory switch comprising input ports and output ports sharing a common memory.

Router-switch: A device for directing data from any input port of a plurality input ports to any output port of a plurality of output ports. The input data may include packets of arbitrary lengths and, to facilitate switching, the data may be segmented into data segments of equal size and switched internally as such. The switched data segments are re-assembled at the output ports to reproduce the packets in the forms in which they were received. For brevity, a router-switch may be referenced as a switch.

A switch may receive data in a variety of forms such as data arranged in time-slotted frames or packets of arbitrary sizes. Data received in time-slotted frames, where the data belonging to a session or connection is allocated at least one time slot per frame, is stored at input for time alignment. Data packets, perhaps belonging to multiple users, received at a specific input and destined to a designated output may be allocated a flow rate which is dynamically adjusted based on some criterion, such as the occupancy of a corresponding input buffer.

Packets of arbitrary sizes may be segmented at input into segments of uniform sizes and switched as such within the switch fabric. At output, the packets may be reconstructed from segments.

Switch unit: The basic building block of a router-switch is a switch unit which may be a device performing a temporal-switching function, or a space-switch element having a number, usually a small number, of dual ports. A dual port includes an input port and an output port.

Switch module: A number of switch units may be combined in different way to produce a switch module having a module controller. A router-switch of moderate capacity may simply comprise a single switch module. A router-switch of high capacity may combine several switch modules.

Switch dimension/switch-module dimension: The dimension of a switch (or a switch module) is the number of dual ports of the switch (or switch module).

Switch capacity/switch-module capacity: The maximum throughput (bits per second) of a switch (or a switch module) determines the capacity of the switch (or switch module).

Non-blocking switch module: A non-blocking switch module having a number of input ports and a number of output ports guarantees the availability of a free path, during a time interval, from any input port to any output port, provided that the input and output ports are both unoccupied during the time interval. A switch-module, or an entire router-switch comprising several switch modules, can be made non-blocking in several ways, such as providing internal capacity expansion. A non-blocking switch module, or a non-blocking router-switch, may still require a vacancy-matching process to resolve potential contention and find the guaranteed path.

Contention-free switch module: A contention-free switch module allocates a path without a search process. A contention-free switch may rely on holding data until an addressed output port becomes free, in which case sufficient data-storage capacity must be provided. A contention-free switch module is preferably provided with flow-rate control to ensure proper operation.

Spatial mesh: A number of switch modules may be interconnected by communication links to form a spatial mesh. A communication link may include only one channel. A path from one switch module to another in a spatial mesh may traverse an intermediate switch module.

Temporal mesh: A number of switch units may be interconnected through a dual rotator to provide a time-limited path from each switch unit to each other switch unit. In one implementation, each switch unit connects to each other switch unit during a designated time slot in each time frame having a number of time slots at least equal to the number of switch units.

Spectral multiplexer/demultiplexer: A spectral multiplexer combines multiple signals each occupying a frequency band (wavelength band) onto one medium. A spectral demultiplexer separates multiple signals each occupying a frequency band (wavelength band) in a common medium into individual signals. A spectral multiplexer/demultiplexer may also be referenced as a channel multiplexer/demultiplexer or a wavelength-channel multiplexer/demultiplexer Temporal multiplexer/demultiplexer: A temporal multiplexer time-interleaves multiple signals each repetitively occupying at least one time-slot in a time-slotted frame. A temporal demultiplexer separates time-interleaved signals, each repetitively occupying at least one time-slot in a time-slotted frame, into individual signals.

Shared-memory switch: A switch in which multiple input ports have time-multiplexed access to a single memory is called a shared-memory switch. A shared-memory switch as defined herein is naturally contention-free.

Ascending rotator: A rotator having a plurality of input ports and a plurality of sequentially labeled output ports, where each input port cyclically accesses the output ports in an ascending order is called an ascending rotator.

Descending rotator: A rotator having a plurality of input ports and a plurality of sequentially labeled output ports, where each input port cyclically accesses the output ports in a descending order, is called a descending rotator.

Dual rotator: An ascending rotator and a descending rotator form a dual rotator.

Transit block: A transit block comprises an input rotator constitutes a latent space switch.

Outer and inner channels: An outer channel of a switch module connects to data sources and sinks or external nodes. An inner channel connects to other switch modules to form a switch of large dimension.

Rotating access: A process where an outer channel cyclically accesses several switch elements at input or output is referenced as a rotating-access process.

Circulating access: A process where several switch elements cyclically access each other is referenced as a circulating-access process.

Unfolded multi-stage switch: An unfolded multi-stage switch comprises switch modules arranged into a number of cascaded arrays, so that a path from input to output traverses a switch module in each array.

Folded multi-stage switch: When each switch module in an array of switch modules is combined with a corresponding switch module in another array of switch modules of a multi-stage switch, the resulting switch is referenced as a folded multi-stage switch.

LIST OF REFERENCE NUMERALS

100: Prior-art contention-free shared-memory switch module
108: Input channel
109: Output channel
116: Input port of contention-free switch-module 100
118: Output port of contention-free switch-module 100
124: Cyclic connector of inner ports 116 to shared memory 140
126: Cyclic connector of shared memory 140 to output ports 118
140: Shared memory
200: Contention-free shared-memory switch with integrated input-output units
208: Input Channel
209: Output channel
220: Dual input-output port
224: Cyclic connector of dual inner ports 220 to shared memory 140.
226: Cyclic connector of shared memory 140 to dual ports 220.
300: Rotator arrangements (300A-300F)
321: Ascending-rotator input channel
322: Ascending-rotator output channel
323: Descending-rotator output channel
324: Descending-rotator input channel
332: Ascending-rotator dual input-output channel
334: Descending-rotator dual input-output channel
338: Dual input-output channels of a dual rotator
380: Ascending rotator
382: Descending rotator
390: Dual ascending-descending rotator
400: Rotating-access switch module
416: Input unit including a memory device 418: Output unit including a memory device
424: Aggregation memory device
437: Ascending rotator
438: Transit-memory device
439: Descending rotator
440: Interleaved-access shared memory comprising ascending rotator 437, transit-memory-devices 438, and descending rotator 439
500: Rotating-access switch module with integrated input-output memory devices
516: Input unit including a memory device 518: Output unit including a memory device
520: Integrated input-output unit including a memory device
524: Aggregation input-output unit including a memory device
537: Ascending rotator
538: Transit-memory device
539: Descending rotator
540: Interleaved-access shared memory comprising ascending rotator 537, transit-memory-devices 538, and descending rotator 539
600: Concise representations (600A, 600B) of switch-module 500
637: Dual ascending-descending (or descending-ascending) rotator
640: interleaved-access shared memory comprising dual rotator 637 and transit-memory-devices 538
641: Outer dual channel connecting data sources and sinks to a segregated input-output unit 516/518
642: Outer dual channel connecting data sources and sinks to an integrated input-output unit 520
643: Internal dual channel connecting a segregated input-output unit to dual rotator 637
644: Internal dual channel connecting an integrated input-output unit to dual rotator 637
646: Internal dual channel connecting a transit memory device 538 to dual rotator 637
700: Rotating-access switch module with integrated input-output memory devices and an aggregation memory device
720: Integrated input-output memory devices
724: Aggregation memory device
725: Dual rotator
730: Transit-memory devices
800: Circulating-access switch module (two representations 800A and 800B)
812: Ingress channel
814: Egress channel
820: Switch unit
821, 822, 823, 824: Internal channels
825: Dual rotator
826: Optional aggregation unit
900: Switch module
908: Input channel
909: Output channel
916: Input port
918: Output port
920: Dual rotator
938: Transit memory device
940: Rotating-access memory device
1000: Occupancy array associated with a transit-memory device 938

1002: Cell in occupancy array 1000 dedicated to a specific output port of switch-module 900
1004: Cell in occupancy array 1000 to be assigned to any output port of switch-module 900
1006: Section of occupancy array 1000 including cells 1002
1008: Section of occupancy array 1000 including cells 1004
1104: Ascending rotator
1106: Descending rotator
1120: Switch unit
1126: Access input port of switch unit 1120
1127: Internal input port of switch unit 1120
1128: Internal input port of switch unit 1120
1136: Access output port of switch unit 1120
1137: Internal output port of switch unit 1120
1138: Internal output port of switch unit 1120
1140: Switch module comprising switch units 1120, ascending rotator 1104, and descending rotator 1106
1146: Ingress channel
1147: Internal channel from ascending rotator 1104 to input port 1127
1148: Internal channel from descending rotator 1106 to input port 1128
1156: Egress channel
1157: Internal channel from input port 1127 to ascending rotator 1104
1158: Internal channel from input port 1128 to descending rotator 1106
1220: Memory device
1221: Temporal multiplexer
1222: Temporal demultiplexer
1241: Unprocessed data segment from source at input of a switch unit
1242: Data segment, at input of a switch unit, sent from a source switch unit
1243: Data segment, at input of a switch unit, sent from an intermediate switch unit
1252: Output data segment at a source switch unit
1253: Output data segment at an intermediate switch unit
1261: Delivered data segment originating and terminating within same switch unit
1262: Delivered data segment traversing one rotator
1263: Delivered data segment traversing two rotators
1430: Array representing occupancy of memory device 1220
1500: Conventional three-stage switch
1540: Switch module
1542: Connector from a first-stage switch module to a second-stage switch module
1552: Connector from a second-stage switch module to a third-stage switch module
1600: Three-stage switch with consolidation units
1630: Ingress port
1638: First-stage consolidation unit for data destined to all egress ports
1640: Switch module in first stage
1642: Connector from switch module 1640 to a second-stage consolidation unit
1648: Second-stage consolidation unit for data destined to subsets of egress ports
1650: Switch module in second stage
1652: Connector from switch module 1650 to a third-stage consolidation unit
1658: Third-stage consolidation unit for data destined to specific egress ports
1660: Switch module in third stage
1661: Output data formatting unit
1670: Egress port
1738: Logical queues in a consolidation unit associated with a specific first-stage switch module, each queue holding data destined to any egress port
1748: Logical queues in a consolidation unit associated with a specific second-stage switch module, each queue holding data destined to egress ports of a specific third-stage switch module
1758: Logical queues in a consolidation unit associated with a specific third-stage switch module, each queue holding data destined to a specific egress port of the specific third-stage switch module
1800: Switch having a mesh structure
1816: Ingress switch unit
1818: Egress switch unit
1826: Internal input switch unit
1828: Inner output port
1840: Rotating-access shared-memory device
1850: Internal channel
1860: Switch module
1902: Logical queues at an ingress switch unit 1816 corresponding to egress switch units 1818
1904: Logical queues at an ingress switch unit 1816 corresponding to inner output ports 1828
1906: Logical queues at an internal input switch unit 1826 corresponding to egress switch units 1818
1908: Logical queues at an internal input switch unit 1826 corresponding to inner output ports 1828
2000: Occupancy-tracking matrix maintained by a controller of a switch module 1860
2002: Entry in matrix 2000 indicating available capacity in an internal channel 1850
2100: Switch module using a rotating-access shared memory device
2108: Ingress channel
2109: Egress channel
2112: Temporal multiplexer
2114: Temporal demultiplexer
2115: Memory device
2116: input switch unit
2137: Input rotator
2139: Output rotator
2140: Rotating-access shared-memory device
2141: Link from input switch unit 2116 to input rotator 2137
2143: Link from output rotator 2139 to temporal demultiplexer 2114
2200: Switch module using a rotating-access shared memory device
2208: Ingress channel
2209: Egress channel
2220: Switch unit
2237: Input rotator
2239: Output rotator
2240: Rotating-access shared-memory device
2241: Link from input switch unit 2116 to input rotator 2137
2243: Link from output rotator 2139 to switch unit 2220
2300: Switch configuration as a temporal-spatial mesh with internal expansion comprising contention-free switch modules 2360
2320: Switch unit
2308/2309: Dual ingress-egress access channel
2324: Dual inner link including two dual channels
2326: Outer consolidation unit
2328: Dual-input consolidation unit
2360: Contention-free switch module
2400: Switch configuration as a temporal-spatial mesh with internal expansion and comprising contention-free switch modules 2360 with diverse inner connectivity 2500: Alternate representation of mesh switch 2400
2600: Mesh switch with internal expansion and configured to maximum dimension
2700: Scalable flexible switch
2720: Switch unit in switch 2700
2725/2726: Combination of switch units
2730: Temporal multiplexer-demultiplexer
2740: Inner memory device in switch 2700
2745: Group of inner memory devices 2740
2746/2748: Channel from temporal-multiplexer-demultiplexer 2730 to an inner memory device
2800: Scalable flexible switch similar to switch 2700 but using a third group of inner memory devices
2820: Switch unit in switch 2800
2825/2826/2827: Combination of switch units
2830: Temporal multiplexer-demultiplexer
2840: Inner memory device in switch 2800
2845: Group of inner memory devices 2840
2848: Channel from temporal-multiplexer-demultiplexer 2830 to an inner memory device
2930: Temporal multiplexer-demultiplexer for a diagonal combination
3000: Scalable flexible switch similar to switch 2800 but with different connectivity of inner memory devices to increase switch dimension (increase number of outer memory devices)
3020: Outer memory device in switch 3000
3040: inner memory device in switch 3000
3045: Group of inner memory devices 2840
3225: Combination of outer memory devices in switch 3000
3600: Data-block format
3612: Data-unit payload
3614: Data-unit header
3624: Data-block header
3720: Outer memory device
3780: Outer controller of outer memory device 3720
3790: Combination controller coupled to multiple outer controllers 3780
3880: Outer controller of an outer memory device 2720
3890: Combination controller coupled to a combination of outer controllers 3880
3980: Outer controller of switch unit 2820 or 3020
3990: Combination controller coupled to a combination of outer controllers 3980
4002: Message for Path reservation
4004: Message for data forwarding
4011: Message type
4012: Cyclical message number
4013: Message direction (towards egress or returning to ingress)
4014: Required flow-rate allocation
4015: Reservation status (progressing or denied)
4016: Counter of outer controllers traversed by message
4017: Identifier of ingress port—start of a path to be reserved
4018: Identifier of egress port—end of the path to be reserved
4021: Type of message 4004
4022: Identifier of message source (ingress port)
4023: Cyclical message number
4024: Number of outer-memory devices still to be traversed
4025: Identifiers of switch units to be traversed by a data block from ingress to egress
4106: Input interfaces
4108: Output interfaces
4200: Table used by a combination controller 3790, 3890, or 3990 to track the occupancy of inner dual channels in respective switch modules
4220: Index of outer memory device (or outer switch unit)
4222: Current vacancy of inner channel from outer-memory device
4224: Current vacancy of inner channel to outer memory device
4312: First group of logical queues in outer memory 2800 or 3000
4314: Second group of logical queues in outer memory 2800 or 3000
4316: Third group of logical queues in outer memory 2800 or 3000
4400: Scalable switch similar to switch 2700 with each inner memory device 2740 replaced with an interleaved-access bank of memory devices
4420: Outer memory device in switch 4400
4425: Combination of outer-memory devices 4420
4440: Shared-memory using interleaved-access bank of memory devices
4445: Group shared memory devices 4440
4500: Scalable switch comprising intersecting combinations of memory devices each combination interconnected via a dual rotator to form a temporal mesh
4520: Switch unit in switch 4500
4525/4526: Combinations of switch units 4520
4535: Dual rotator for combination 4525
4545: Group of dual rotators 4535
5000: Network employing scalable router-switches and passive spectral multiplexers-demultiplexers
5030/5032: Passive spectral multiplexer-demultiplexer
5050: Scalable router-switch
5052: link connecting router-switches 5050
5102: Access device
5112: Group of access devices
5114: Channel from an access device 5102 to a temporal multiplexer
5115: Channel from a temporal demultiplexer to an access device 5102
5116: temporal multiplexer
5117: temporal demultiplexer
5120: Passive spectral multiplexer
5121: Passive spectral demultiplexer
5122: Single-channel or multi-channel link from a temporal multiplexer 5116 to a passive spectral multiplexer 5120
5123: Single-channel or multi-channel link from a passive spectral demultiplexer 5121 to a temporal demultiplexer 5117.
5124: Multi-channel link from a passive spectral multiplexer 5120 to a scalable router-switch 5050
5125: Multi-channel link from a scalable router-switch 5050 to a passive spectral demultiplexer 5121
5180: Hypothetical line defining an interface of a passive access network to network 5000
5226: Input port of temporal multiplexer 5116
5227: Output port of temporal multiplexer 5117
5236: Output port of temporal multiplexer 5116
5237: Input port of temporal demultiplexer 5117
5246: Control port connecting temporal multiplexer 5116 to controller 5250
5247: Control port connecting temporal demultiplexer 5117 to controller 5250
5250: Controller of a group 5112 of access devices
5256: Optical-Electrical-Optical converter
5257: Optical-Electrical-Optical converter
5322: Channel in an upstream link 5124
5323: downstream channel originating from an egress port of a router-switch 5050
5340: Spectral demultiplexer at a router-switch 5050
5341: Spectral multiplexer multiplexing channels 5323

5342: Optical-to-Electrical converter
5343: Electrical-to-Optical converter
5350: Ingress port of a router-switch 5050
5351: Egress port sharing control with ingress port 5350
5355: Controller ingress port 5350 and egress port 5351

DETAILED DESCRIPTION

A switching device used in a telecommunication network comprises a number of input ports for receiving signals from local or remote sources, a number of output ports for transmitting signals, received from the input ports, to local or remote sinks, and a switch fabric for directing each received signal to an output port leading to a designated destination. It is highly desirable that the switch fabric be non-blocking. It is even more desirable that the switch fabric be contention free. A non-blocking switch fabric guarantees the availability of a path of appropriate capacity from any input port having a sufficient free capacity to any output port also having a sufficient free capacity. A switch fabric may have to examine several paths from the designated input port to the designated output port before finding an available path or a number of spatially or temporally distinct paths that may collectively have the required capacity. Finding a path may require temporal or spatial matching processes which can be processing intensive. A contention-free switch fabric has the significant advantage of direct path allocation without the need for resolving contention. A contention-free switch fabric typically has a rather limited dimension and capacity and has been conventionally used as a switch module in a large-dimension switch, whether blocking or non-blocking. The process of finding an internal path from an input port to an output port in the large-dimension switch then requires examining the occupancy states of links connecting the contention-free switch modules.

It is known to construct a high-capacity large-dimension switch having a large number of input ports and a large number of output ports using switch modules of smaller dimension arranged in a canonical multi-stage structure. By providing sufficient inner expansion, also called dilation, a multi-stage switch can be made strictly non-blocking so that a free internal connection can always be found from any input port to any output port during any interval of time where the input and output ports in question are both free. The dimension, and capacity, of a canonical multi-stage switch can grow virtually indefinitely by increasing the number of stages. There are, however, several drawbacks of canonical multi-stage structures including hardware inefficiency, complexity of scheduling, and difficulty of handling variable-flow-rate streams.

The contention-free switch modules of a multi-stage switch fabric are arranged in cascaded arrays, each array constituting a 'switching stage'. The number of stages is the number of switch modules traversed by a signal from an input port to an output port. In an 'unfolded' k-stage structure, k>1, such as the classical Clos-type structures, each path from input to output traverses the same number, k, of switch modules and k is typically an odd number.

The contention-free switch modules may also be arranged in a mesh structure of order k>1, where a path from ingress to egress may traverse a number of switch modules that varies from 1 to k.

The dimension of a multi-stage structure is determined by the dimensions of the switch modules and the number of stages. Using uniform switch modules, each of dimension m×m, the dimension of an unfolded k-stage structure is $m^{(k+1)/2}$. With m=32, for example, the maximum dimension of a three-stage (k=3) switch is 1024×1024 and the maximum dimension of a five-stage switch (k=5) is 32768×32768.

Contention-free Switch Module

A contention-free switch module facilitates flow-rate control and simplifies control by replacing contention-resolution processes within the module with a simple memory-address assignment process. A contention-free switch module may either be constructed as a shared wide memory accessed cyclically, as in switch module 100 of FIG. 1 or switch module 200 of FIG. 2, where each input port or output port has exclusive access to the shared memory during a designated time slot in a predefined time frame.

Figure 2:
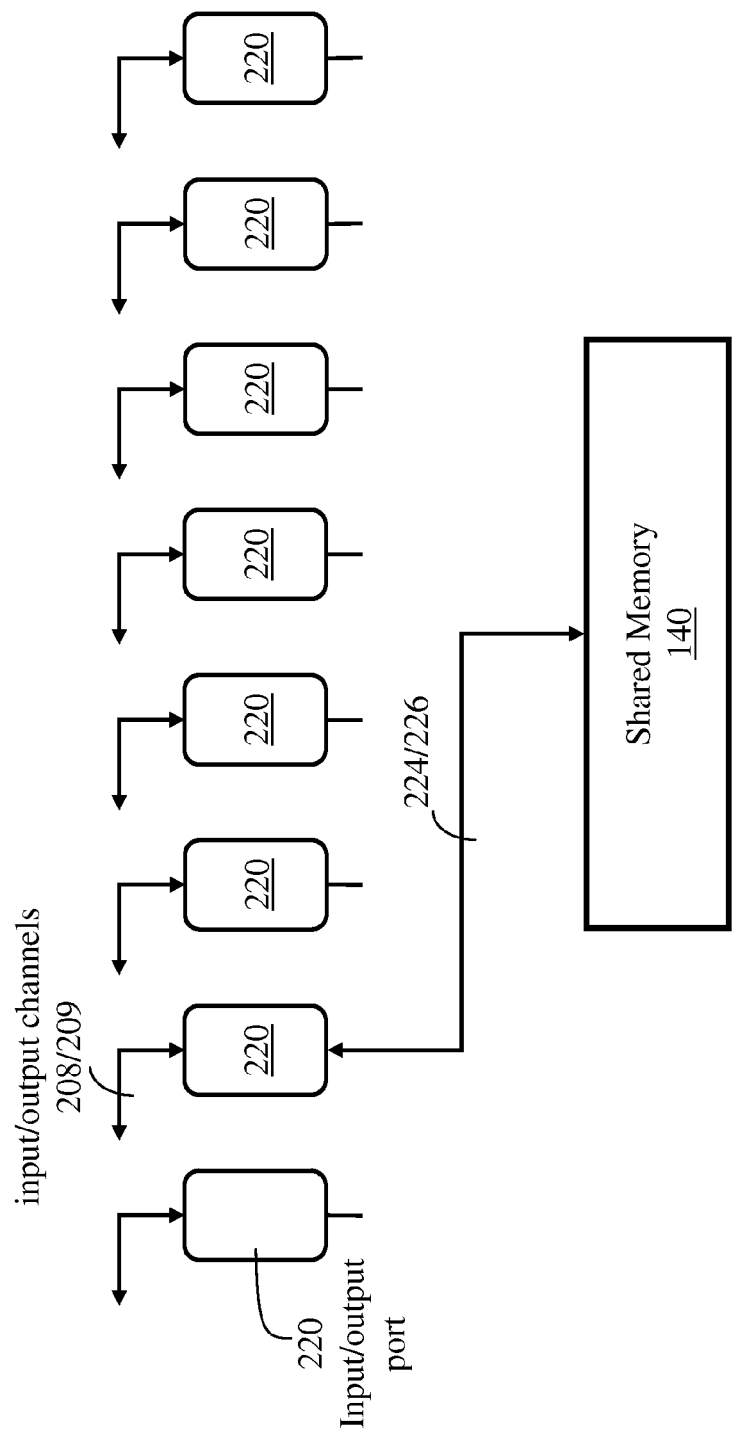
FIG. 2 illustrates a contention-free common-memory switch similar to the switch of FIG. 1 with the input and output ports paired so that each input port is integrated with an output port with which it shares memory and control.

FIG. 1 illustrates a known shared-memory switch 100 comprising a shared memory device 140, input ports 116 receiving data from data sources through input channels 108 and cyclically writing data in the shared memory device 140 during designated WRITE intervals in a predefined time frame, and output ports 118 cyclically reading data from the shared memory device 140 during designated READ intervals in the time frame. Output ports 118 transmit data to sinks over channels 109. Each input port 116 has an input memory device for storing data received from subtending sources and each output port 118 has an output memory device for storing data to be transmitted to subtending sinks. Each input port 116 is designated a time interval per time frame for writing a data block formed during a preceding frame period in the shared memory 140 through a channel 124. Each output port 118 is designated a time interval per frame for reading a data block from the shared memory 140 through a channel 126. With approximately equal memory-access times for all memory devices in all input ports 116 and output ports 118, the ratio of the width of the shared memory 140 to the width of an input memory or an output memory is at least equal the number of input or output memory devices. Data received at an input memory from data sources may be sorted in logical queues each logical queue corresponding to a destination output port 118 to facilitate the formation of data blocks at input. An input port 116 and an output port 118 may be combined into a dual port 220 sharing a single memory device as illustrated in FIG. 2. Thus, the memory device of a dual port 220 holds data received from data sources through input channel 208 to be logically aggregated into data blocks and written in the shared memory 140 through a channel 224. The memory device of dual port 220 also holds data blocks read from the shared memory 140 through a channel 226 to be parsed into data segments (data units) and transmitted to subtending data sinks through an output channel 209. Data received at a dual port 220 from data sources may be sorted in logical queues each of which corresponding to a destination dual 220. A data block comprises data segments of smaller size and is transferred to a corresponding destination switch unit.

Figure 3:
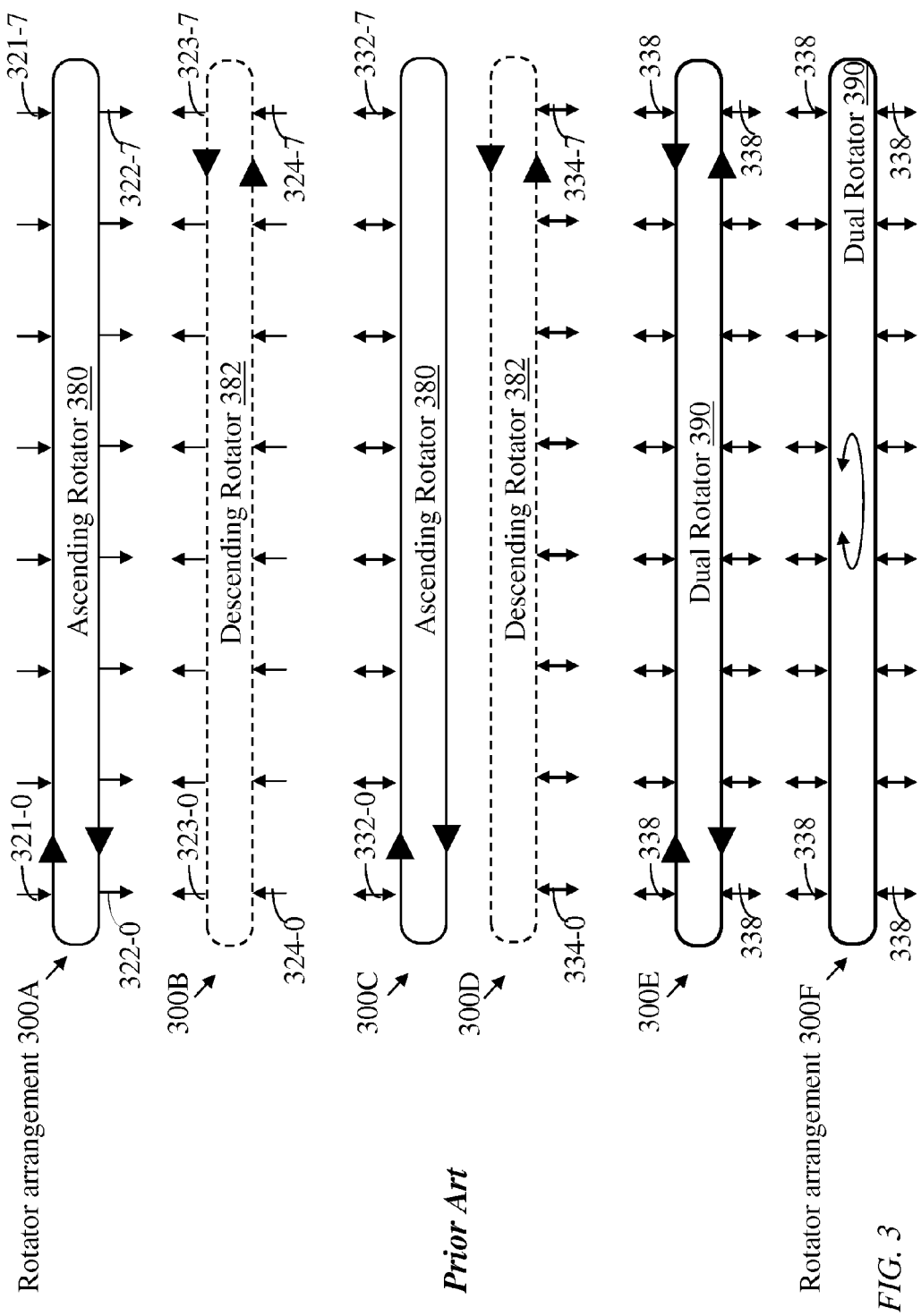
FIG. 3 illustrates a representation of prior-art ascending and descending rotators for use with an embodiment of the present invention.

A contention-free switch module may also be constructed by time-interleaving input data units received simultaneously from several input ports in a bank of transit memory devices. Time-interleaving-access may be performed using temporal rotators. Temporal rotators are illustrated in FIG. 3. FIGS. 4 to 7 illustrate switch modules based on contention-free interleaved access.

FIG. 3 illustrates an ascending rotator 380 connecting input channels 321 to output channels 322 and a descending rotator 382 connecting input channels 324 to output channels 323. The input channels 321 and output channels 322 may be represented as dual channels 332. Similarly, the input channels 324 and output channels 323 may be represented as dual channels 334. An ascending rotator has a number of input ports each connecting to an input channel 321 and an equal number of output ports each connecting to an output channel 322. The rotator cyclically connects each input port to each output port during a time slot within a rotation cycle. A time slot is selected to at least equal a period during which an input port connects to an output port. The duration of a rotation cycle, herein called a rotation period, equals the number of input ports times the time-slot duration. For example, a rotator having 1024 input ports, and an equal number of output ports, where the duration of each time-slot period is 40 nanoseconds would have a rotation period of 40.96 microseconds. The input ports and output ports in an m×m rotator may be indexed according to sequential numbers, 0 to (m−1) and an ascending rotator 380 connects each input port j to output port $\{j+\tau\}_{modulo\ m}$ during a time slot τ of a time frame having m time slots indexed as 0 to (m−1). A descending rotator 382 connects each input port j to output $\{j-\tau\}_{modulo\ m}$ during a time slot τ of the time frame. An ascending rotator 380 and a descending rotator 382 may be represented as a dual rotator 390 interconnecting dual input-output channels 338. The rotators' representations are referenced in FIG. 3 as 300A to 300F.

The ascending and descending rotators of FIG. 3 may be used in realizing a contention-free rotating-access switch module, to be described below with reference to FIGS. 4 to 7 or a contention-free circulating switch module to be described with reference to FIGS. 8 and 9.

Figure 4:
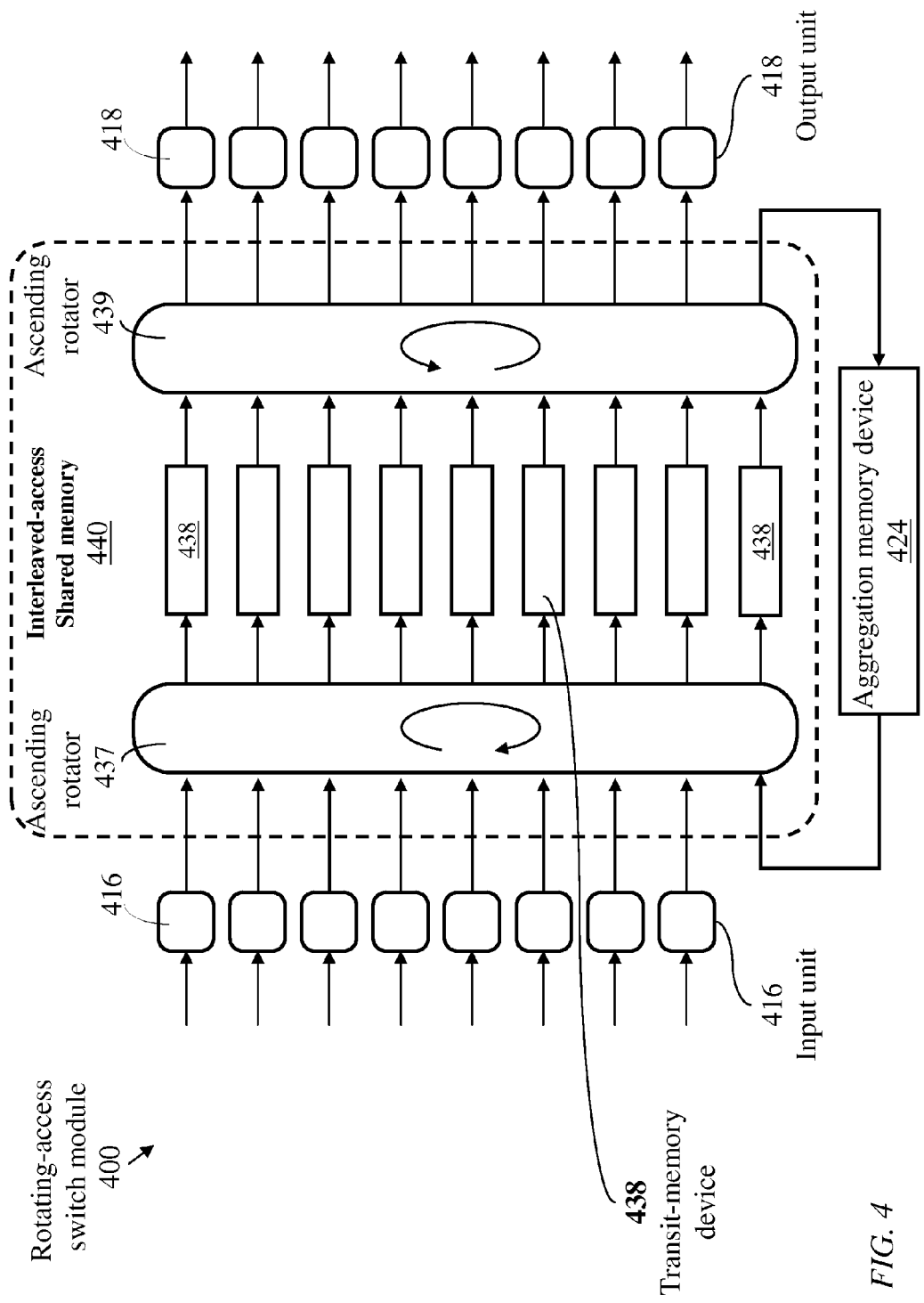
FIG. 4 illustrates a contention-free rotating-access switch module having separate input and output switch units, and an aggregation switch unit, cyclically connected to a bank of transit memory devices according to the present invention.

FIG. 4 illustrates an unfolded rotating-access switch 400 that can be operated in a contention-free mode. The switch comprises input units 416 and a rotating-access shared memory device 440 (also referenced below as a rotating-access memory device) that comprises an input rotator 437, a bank of transit memory devices 438 and an output rotator 439. Each transit memory device 438 is logically organized into a number of storage cells each sufficient to hold a data unit. Output units 418 may also be provided to facilitate data transfer to a subsequent switch unit or to data sinks. During a rotation cycle, a sequence of data units forming a data block may be consecutively transferred from an input unit 416 to consecutive transit memory devices 438 to be written in free storage cells in the transit memory devices. If the data units of a data block are written in corresponding cells in transit memory devices 438, contention would be entirely avoided. Thus, unlike the shared wide memory of switch modules 100 or 200, the data units comprising a given data block are not written simultaneously in the array of transit memory devices 438. However, the transfer, from an input unit 416 to the array of transit memory devices 438, preferably begins when there is a sufficient number of waiting data units that may form a data block destined to an output unit 418. As in shared-memory switch modules 100 and 200 (FIGS. 1 and 2), the dimension of switch-module 400 is limited by the delay in accumulating a sufficient number of data units per data block. To avoid excessive delay in forming data blocks, the number of inputs in switch modules 100, 200, or 400 need be limited. Additionally, to limit the delay for data streams having low flow rates, a number of switch units may be dedicated to aggregate low-rate data streams and form full, or near full, data blocks. Switch module 400 includes one aggregation input-output unit 424.

Figure 5:
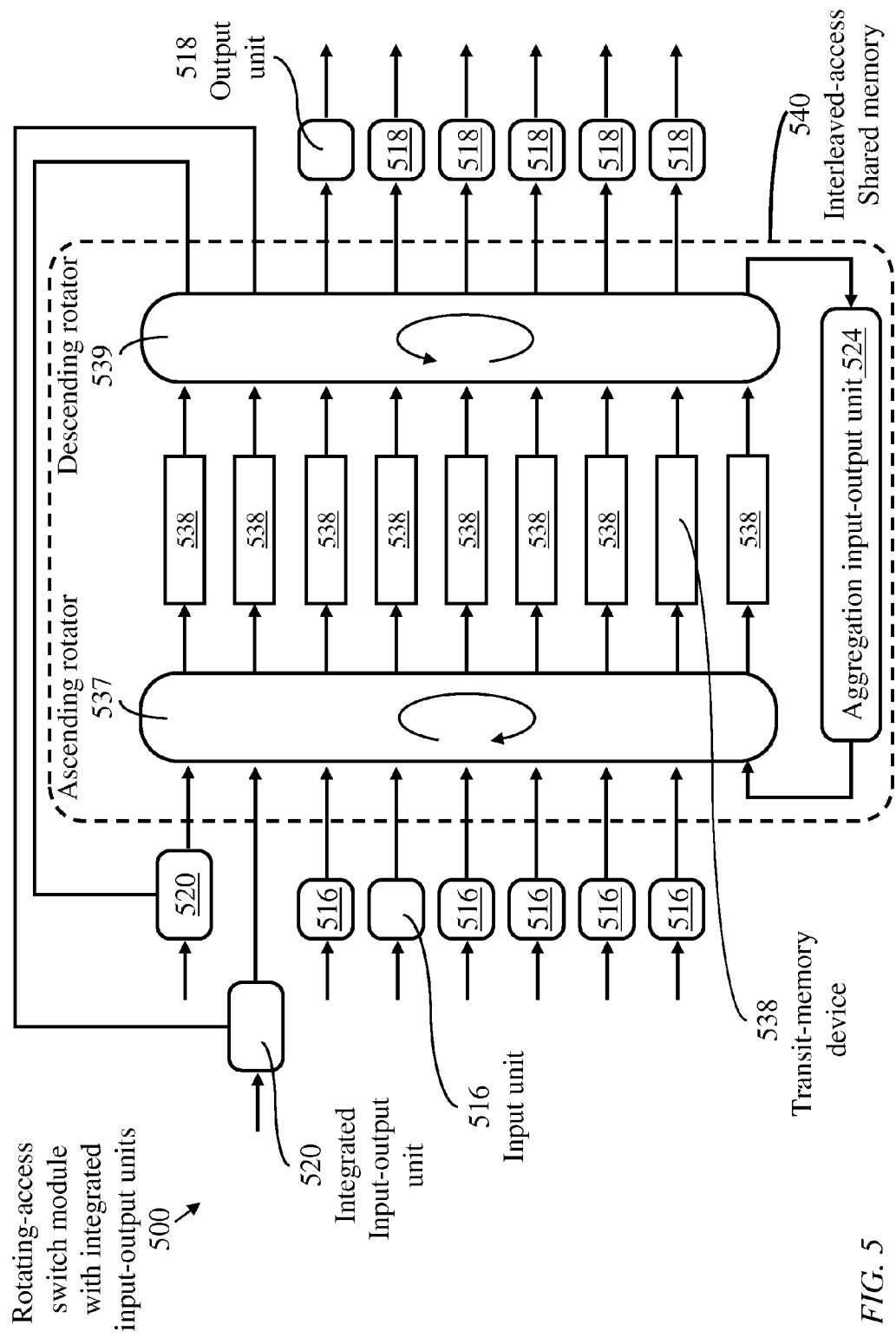
FIG. 5 illustrates a contention-free rotating-access switch module having both separate and integrated input-output switch units, and using an aggregation switch unit, for use in an embodiment of the present invention.

The input and output units 416 and 418 may have separate memory devices. Alternatively, an integrated input-output unit may have a shared memory device. FIG. 5 illustrates a contention-free rotating-access switch module 500 using both integrated and segregated input-output units. The core of switch module 500 is a rotating-access shared memory device 540 comprising an ascending rotator 537, a bank of transit-memory devices 538, and a descending rotator 539. The rotation directions of rotators 537 and 539 may be reversed. The exemplary configuration of FIG. 5 comprises two integrated input-output units 520, six input units 516, and six output units 518. In general, the number of segregated input and output units 516, 518, and the number of integrated input-output units 520 are selected according to various design considerations. For example, all the input-output units may be of the integrated type 520.

Preferably, the number of transit memory devices equals the number of input units 516, input-output units 520, and aggregation input-output units 524. However, variants of switch module 500 where the number of transit memory devices may differ from the combined number of input units 516 and input-output units 520 may be devised.

An optional aggregation input-output unit 524 connects to an input port of the input rotator 537 and an output port of the output rotator.

Figure 6:
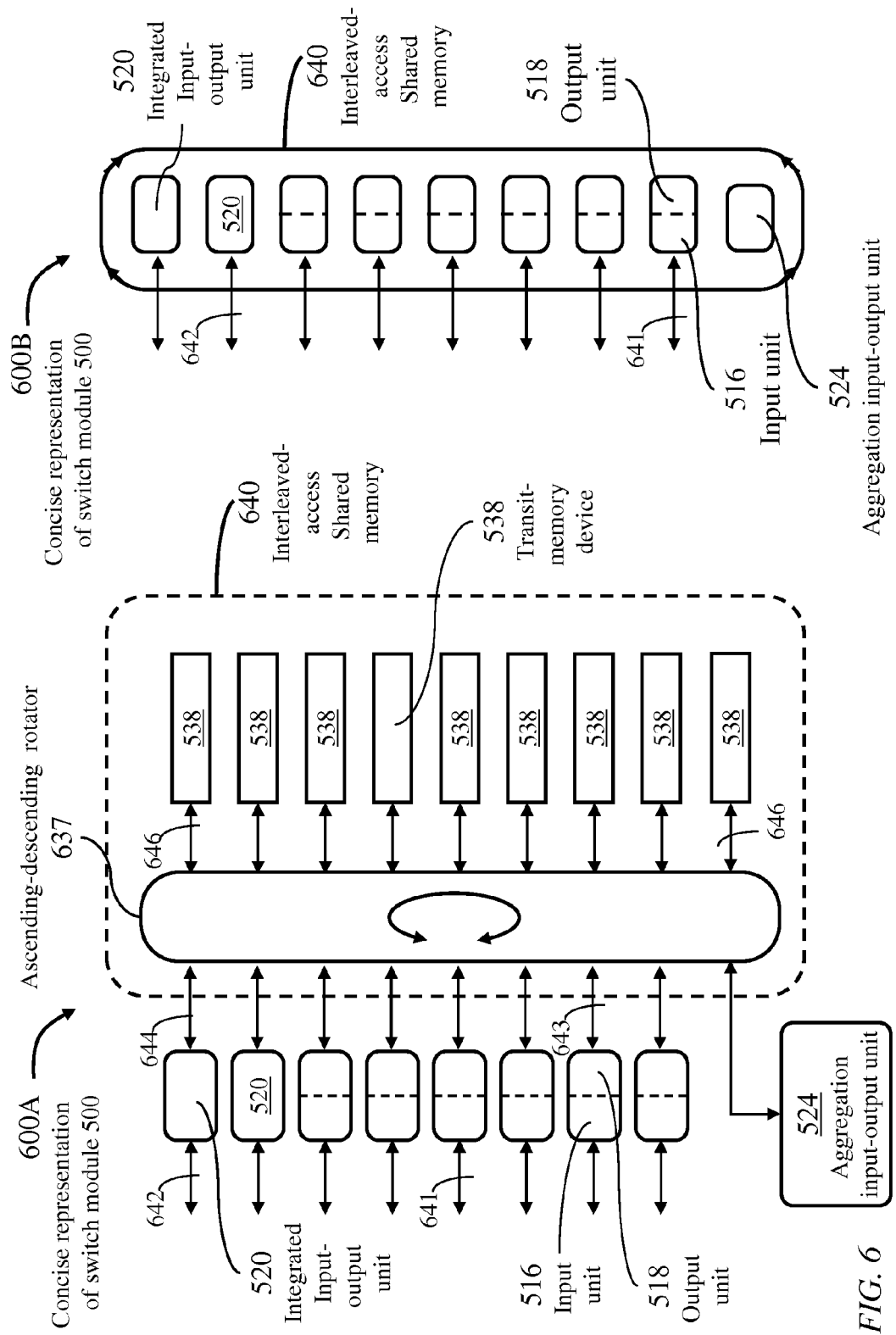
FIG. 6 illustrates two concise representations of the contention-free rotating-access switch module of FIG. 5.

FIG. 6 illustrates two concise representations 600A and 600B of switch module 500 of FIG. 5 to be used throughout the present disclosure. A rotator pair including a rotator 537 and a rotator 539 is illustrated as a dual rotator 637. A segregated input-output unit 516/518 has a dual channel 641, connecting to sources and sinks and a dual channel 643 to dual rotator 637. An integrated input-output unit 520 has a dual channel 642, connecting to sources and sinks and a dual channel 644 to dual rotator 637. Input units 516 and output units 518 use separate memory devices but a pair of input unit 516 and an output unit 518 may have common control. A bank of transit memory devices 538 connect to dual rotator 637 through dual channels 646. Aggregation unit 524 receives data units belonging to data streams of low flow rates from any input unit 516 or integrated input-output unit 520 and forms data blocks each to be transferred through a rotating-access memory device 640 to a single output unit 518 or to an integrated input-output unit 520.

Figure 7:
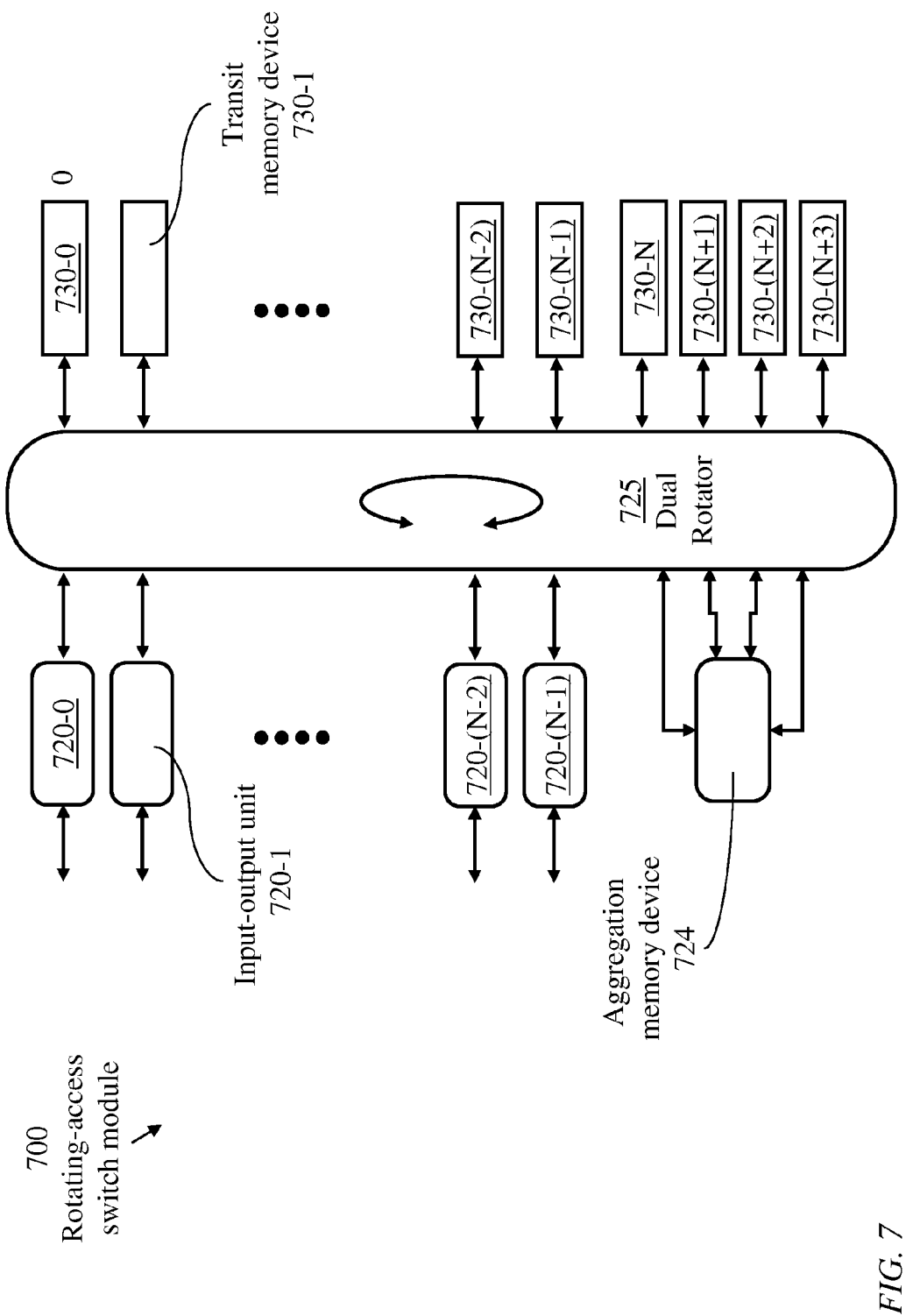
FIG. 7 illustrates a contention-free rotating-access switch module of the configuration illustrated in FIG. 5 but using a higher-capacity aggregation switch unit.

FIG. 7 illustrates a contention-free rotating-access switch module 700 similar to switch module 600 having a number N>1 of input-output units 720, individually identified as 720-0 to 720-(N−1), and an aggregation unit 724. A switch unit 720 may be a segregated input-output switch unit or an integrated input-output switch unit. When N is relatively large, 64 for example, aggregation unit 724 may be of higher capacity. In the exemplary configuration of FIG. 7, aggregation unit 724 has four dual channels to the dual rotator 725 (four channels to an ascending rotator and four channels from a descending rotator constituting dual rotator 725). The number of transit memory devices 730 equals the number of payload input-output units 720 plus four.

Figure 8:
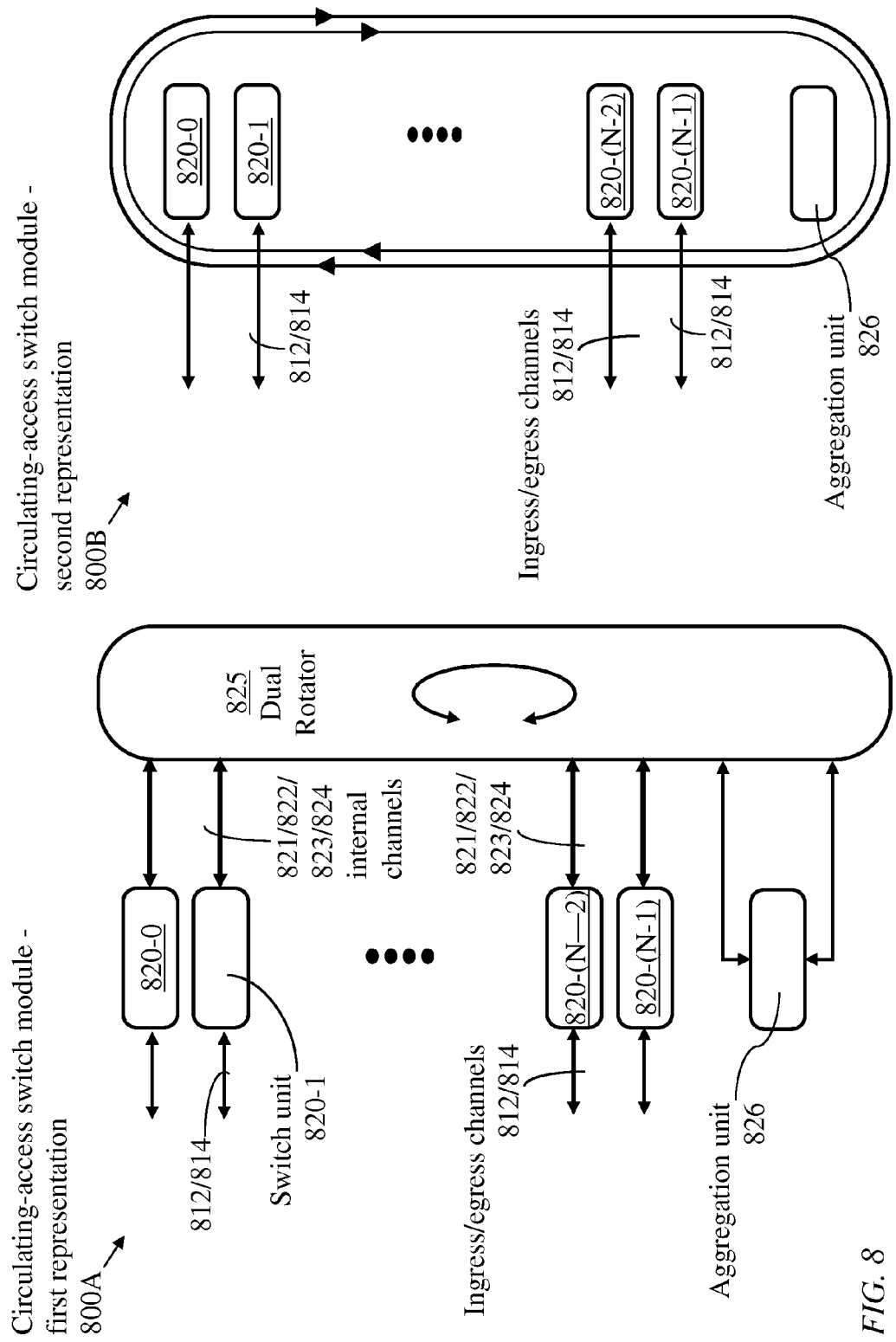
FIG. 8 illustrates a contention-free circulating switch, interfacing with outer channels connecting to external nodes, and comprising switch units directly interconnected through a dual rotator, according to an embodiment of the present invention.

FIG. 8 illustrates a contention-free circulating switch module 800A, according to the present invention, comprising N>1 switch units 820, individually identified as 820-0 to 820-(N−1) interconnected in a temporal mesh through a dual rotator 825. An optional aggregation unit 826, functionally similar to aggregation units 524 (FIG. 5) or 724 (FIG. 7) may be provided.

Each switch unit 820 may have a memory device for storing data units received from sources, data units in transit to other switch units 820, and data units to be transmitted to data sinks. During a rotation cycle, data units received at a switch 820 from an incoming channel 812 and destined to an outgoing channel 814 of another switch unit 820 are written in corresponding addresses in all switch units 820. Null data units are written if, during a rotation cycle, the number of data units of a common output destination is less than the number of memory devices 820. A switch unit 820 connects to an internal input channel 821 from a first rotator of dual rotator 825, an internal channel 822 to the first rotator, an internal channel 823 from a second rotator of dual rotator 825, and an internal channel 824 to the second rotator. Switch module 800A may be represented in the concise form 800B which hides the connections of switch units 820 and aggregation unit 826 to the dual rotator 825.

Switch module 800A may be used in a larger-scale switch configured as a temporal-spatial mesh, as will be described with reference to FIG. 25 and FIG. 45.

Data-unit Aggregation

A contention-free switch module, whether based on cyclic exclusive access, as in switch modules 100 and 200, or interleaving access, as in switch module 400, switches data blocks and the size of each data block is determined by the number of input ports and the size of a data unit. The dimension of the switch module is therefore limited by the delay in forming a data block. For example, if the number of input ports is 64, and if the memory access interval (read plus write) is 20 nanoseconds, the time frame during which each input port accesses the memory is 1.28 microseconds. When the spatial distribution of traffic is almost uniform, i.e., when the traffic received at each input port is equitably directed to the output ports, the switching delay may be equal to the frame duration times the number of input ports; approximately 82 microseconds in the above example. However, if the spatial distribution of traffic is non-uniform, which is typically the case, the block-formation delay may vary significantly according to the flow-rate of different input-output data streams; for a data stream of low flow rate, it may take an input port an excessively large number of time frames to form a data block of a reasonable fill, i.e., including a number of payload bits that is not much smaller than the shared-memory width. In order to ensure high service quality regardless of the spatial traffic distribution, it is reasonable to impose a delay upper bound (a permissible delay) beyond which data accumulated at a given input port and destined to a specific output port must be written in the shared memory. If most of the traffic received at an input port is directed to a relatively small number of output ports, and consequently a small proportion of the traffic is directed to the larger number of the output ports, then several access intervals of the input port would be wasted in writing data blocks of low fill. Recall that a data block in an exclusive-access contention-free switch must be directed to a single output port. In an extreme case, where an input port receives traffic at the full rate of the input port and the traffic is almost entirely directed to a single output port, with an insignificant—but non-zero—amount directed to each of the other output ports, the delay upper bound must be substantially higher than the number of input ports (and output ports) multiplied by the frame duration in order to avoid excessive capacity waste. Conversely, since the delay upper bound is independent of the switch-structure, the number of input ports (or output ports) must be reduced to satisfy the acceptable delay tolerance while maintaining high efficiency. Denoting the permissible delay as D, the number of dual ports as N (a dual port comprises an input port and an output port), and the access interval as $\delta$, then the frame duration would be $N \times \delta$, the maximum relative waste $\beta$ due to extreme non-uniform spatial distribution is determined as $\beta = (N-1) \times N \times \delta / D$. The maximum number N of dual ports would then be determined from $(N-1) \times N \leq \beta \times D/\delta$. For example, with D=200 microseconds, $\delta$=20 nanoseconds, and $\beta$=0.2, then $N \leq 45.2$, and the switch module may have a maximum of 45 dual ports.

To offset the capacity waste due to incomplete data blocks, one of two methods may be employed. According to the first method, an appropriate internal expansion may be provided so that the outer capacity of the switch module is lower than the inner capacity. According to the second method, at least one dual port would be used exclusively for aggregating data units, belonging to data streams originating from any of the input ports and having a flow rate lower than a predefined threshold, into data blocks each destined to a specific output port.

Consider a contention-free switch module 100 (FIG. 1) having m input ports 116. Each input port 116 gains access to the wide shared memory 140 during one time slot in a time frame of at least m time slots. If the traffic is spatially and temporally balanced, where during a sufficiently small observation period each input unit receives data that are distributed equally among the output units, then each input unit would be able to direct a data block, which is at most m data-units wide, to a given output unit every $m^2$ time slots. With a time-slot duration of $\delta$, the period between successive deliveries for an input-output pair would be $\delta m^2$. With $\delta$=40 nanoseconds, for example, and with a delay tolerance of 100 microseconds, the number of input units, under perfect-balance assumption, would be 50. With violent spatial-temporal traffic variation, an individual input-output stream may not have sufficient data to form a data block within m time frames and data may have to wait at input for an unacceptable period of time. To provide acceptable service quality, an upper bound of data-block-formation delay may be enforced. This, however, may result in switching data blocks with a high proportion of null data which, in turn, requires providing a significant internal expansion. The internal expansion would be determined according to the delay tolerance, the number of input units, and the shared-memory speed. If, in the above example, the delay tolerance is increased to 500 microseconds, then an internal expansion of 0.2, i.e., the internal capacity is 1.2 times the external capacity, would be adequate to handle extreme traffic variations in a switch having m input units. An alternate approach to handling extreme traffic variation, while limiting the delay to acceptable levels, is to dedicate a number of input-output units for traffic aggregation. For example, a contention-free switch of 64 input-output units (an input-output unit may be integrated or may comprise an input unit and an output unit) may use two integrated input-output units for aggregation.

Figure 9:
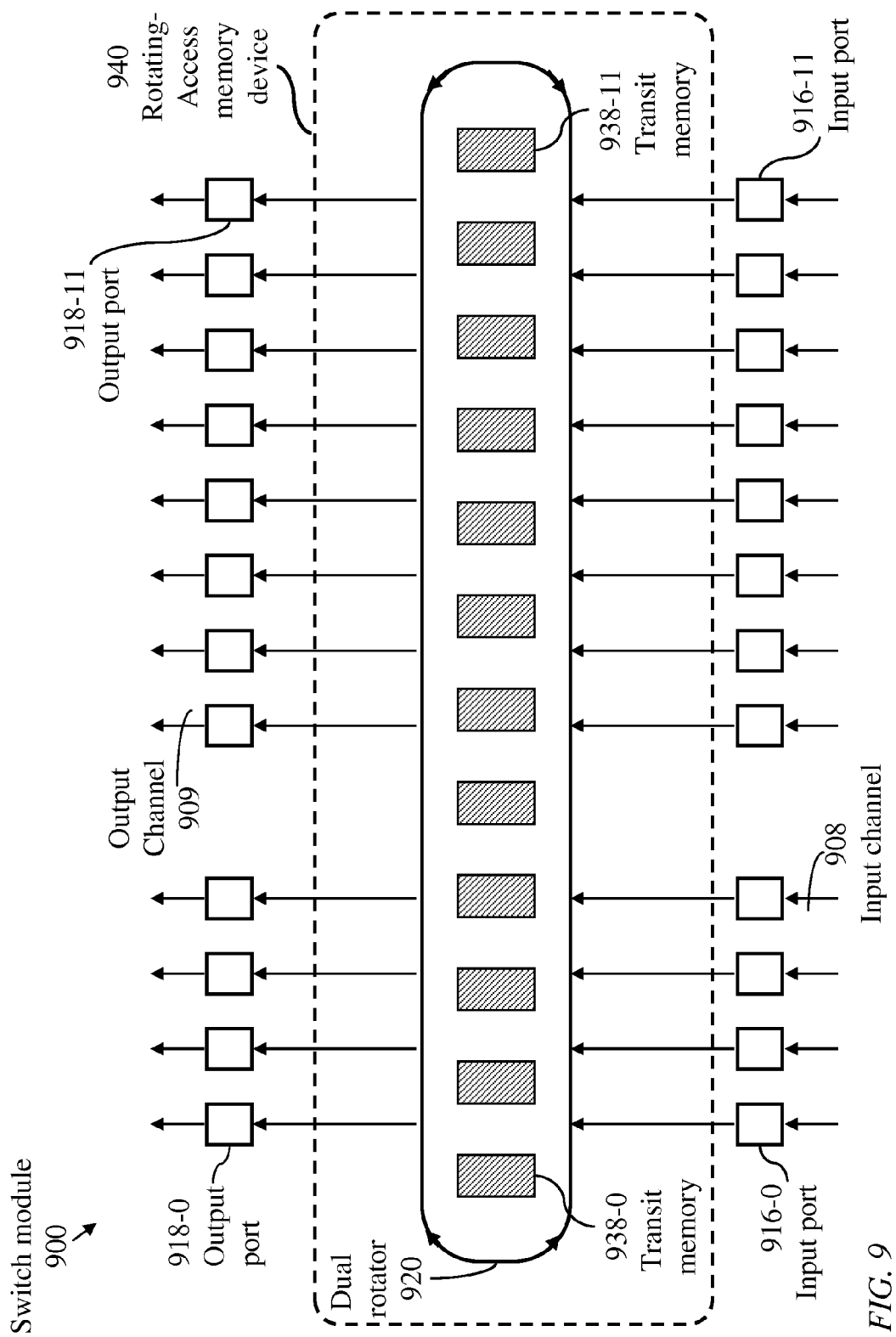
FIG. 9 illustrates a shared-memory switch module having input and output ports with rotating access to a plurality of transit memory devices, for use with an embodiment of the present invention.

FIG. 9 illustrates an exemplary switch module 900 comprising twelve transit memory devices 938 individually identified as 938-0 to 938-11, twelve input ports 916 individually identified as 916-0 to 916-11, twelve output ports 918 individually identified as 918-0 to 918-11, and a dual rotator 920. Input ports 916 receive data from input channels 908 and output ports 918 transmit data over output channels 909. The twelve transit memory devices 938 and the dual rotator 920 collectively constitute a rotating-access shared memory device 940. Each input port 916 gains WRITE-access to all the memory devices 938 during a designated time slot in a time frame organized in a number of time slots. The number of time slots per time frame at least equals the number of input ports 916. Likewise, each output port 918 gains READ-access to all the memory devices during a designated time slot in the time frame. The switch module 900 may be operated as a contention-free switching device or a contention-based switching device. The switch module 900 may also provide both contention-free and contention-based switching.

To provide contention-free switching, data received at each input port 916 from data sources is organized in data segments and a number (12 in this example) of data segments form a data block. The data received at each input port 916 is organized in data segments and each transit memory device 938 is organized into a number of cells each cell for holding one data segment. The number of data segments per data block may not exceed the number of transit memory devices 938 (12 in switch module 940) and a data block may include null data segments. An input port 916 transfers a data block to the memory devices 938 during a designated time slot where each memory device 938 holds one of the data segments of the data block. A data segment may be written at any free address in a memory device; however, it is convenient to write all the data segments of at data block at corresponding addresses in the memory devices. It is assumed that each memory device has a sufficient storage capacity to hold data segments waiting for transfer and, hence, the process of writing a data block is contention free. Subsequently, any output port, during its designated time slot, may read any data block. If a data block is destined to only one output port, the corresponding memory locations in the memory devices 938 may be overwritten after being read. Otherwise, if the data block is destined to multiple output ports, the corresponding memory locations in memory devices 938 may be overwritten only after being copied to each of the multiple output ports, as determined by a counter for example. Thus, in the contention-free scheme, a data segment may be written in any free memory location. However, for contention-free switching to be manageable, the data segments of a data block are written in corresponding memory addresses of the transit memory devices 938-0 to 938-11.

To operate the switch module 940 in a contention-based scheme, the data received at each input port is organized in data segments and each memory device is organized into a number of cells equal to the number of output ports, with each cell corresponding to an output port and having a sufficient capacity to hold a data segment. Each input port 916, during its designated access time slot, may write a number of data segments, not exceeding the number of memory devices 938, where at most one segment may be written in a memory device 938. A data segment destined to a specific output port may be written only in a cell of a memory device 938 corresponding to the specific output port. The data segments remains in the cell until it is read by its designated output, or all its designated outputs in the case of multicast switching. Thus, an input port may fail to write a data segment because a corresponding cell is still occupied.

Contention-free switching significantly simplifies scheduling but requires arranging data into relatively large data blocks. Contention-based switching, as described above, provides fine granularity but requires a somewhat elaborate vacancy-matching process. To exploit the advantages of the two schemes, contention-free switching may be used for data destined to specific output ports of the switch module 940 while the contention-based scheme may apply to data destined to the remaining output ports. The specific output ports are judicially selected as will be described with reference to the configurations of FIG. 18.

Figure 10:
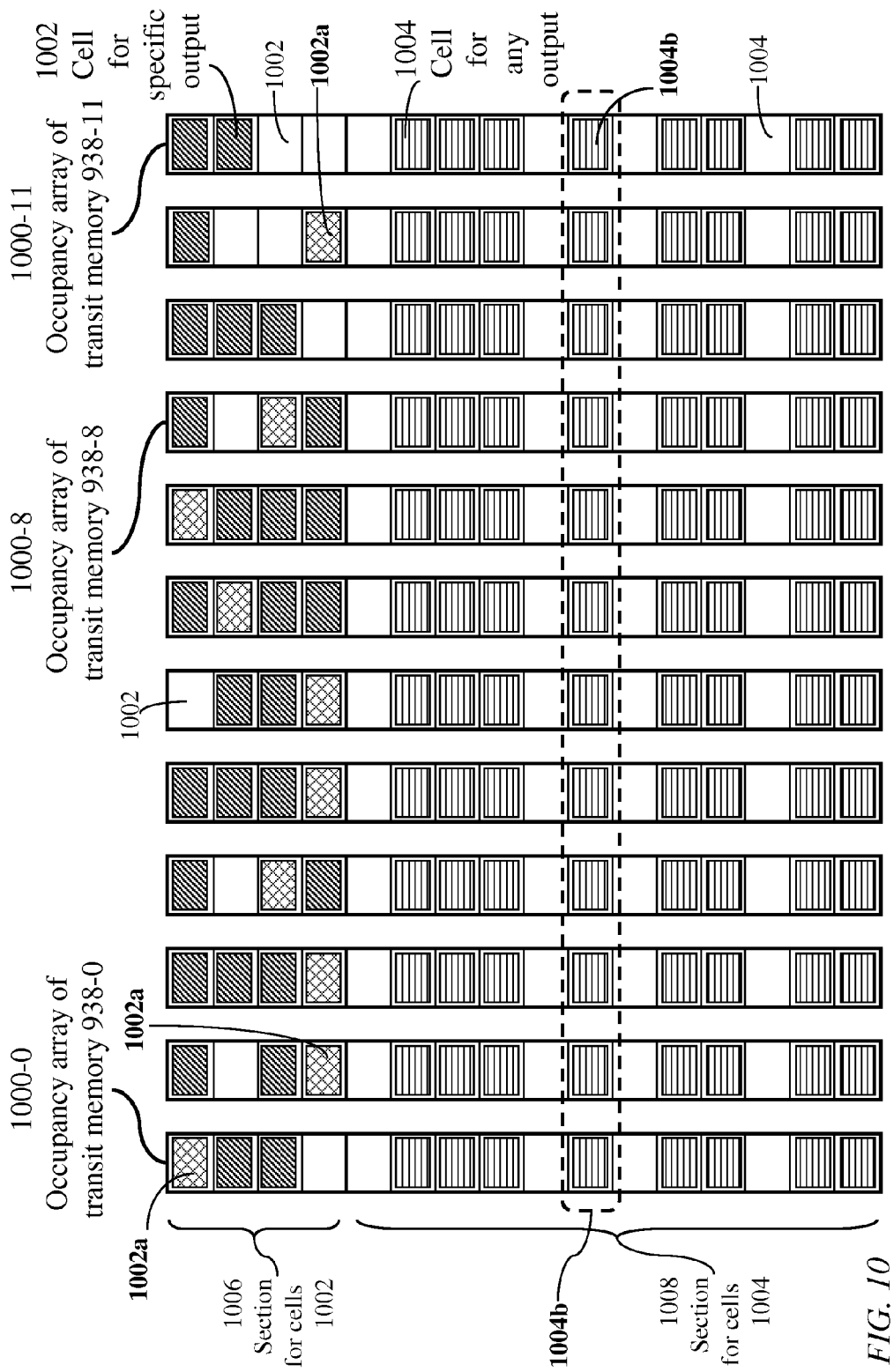
FIG. 10 illustrates data organization of the shared memory device of the shared-memory switch module of FIG. 9 providing both contention-free switching of data-blocks and contention-based switching of finer data segments in accordance with an embodiment of the present invention.

FIG. 10 illustrates data organization in a switch module 900 providing both contention-free and contention-based switching. Each memory device 938 is organized into a number of cells; 16 in the example of FIG. 10. The cell-occupancy of each memory device 938-x is represented by a respective array 1000-x having 16 entries, each entry corresponding to a cell in memory device 938-x. A shaded entry indicates that a corresponding memory cell is holding a data segment. Specific cells 1002, each corresponding to an output port 918, are used exclusively for contention-based switching. The remaining cells, 1004, are used freely to store a data segment of any data block regardless of the target output port. In the example of FIG. 10, four cells 1002 in each memory device 938 are dedicated to specific output ports 918. An input port 916 may transfer individual data segments to memory devices 938 to be written in cells 1002 or data blocks, each comprising a number of data segments not exceeding 12 in this example, to be written in cells 1004 of similar addresses in memory devices 838. For example, during an access time slot, an input port 916a may simultaneously write data segments, which may include null segments, in memory devices 938 at cells 1002 indicated as 1002a. The twelve data segments include 10 payload data segments of which two are directed to output port 918-0, one to output-port 918-1, two to output-port 918-2, and four to output-port 918-3. The input port may also simultaneously write twelve data segments directed to a single output port, 918-5 for example, at cells 1004 indicated as 1004b. The data blocks are not necessarily read in the same order in which they were written and, hence, they may not occupy contiguous memory cells. A convenient way to keep track of vacant memory cells is to use a multi-threaded linked list well known in the art.

Figure 11:
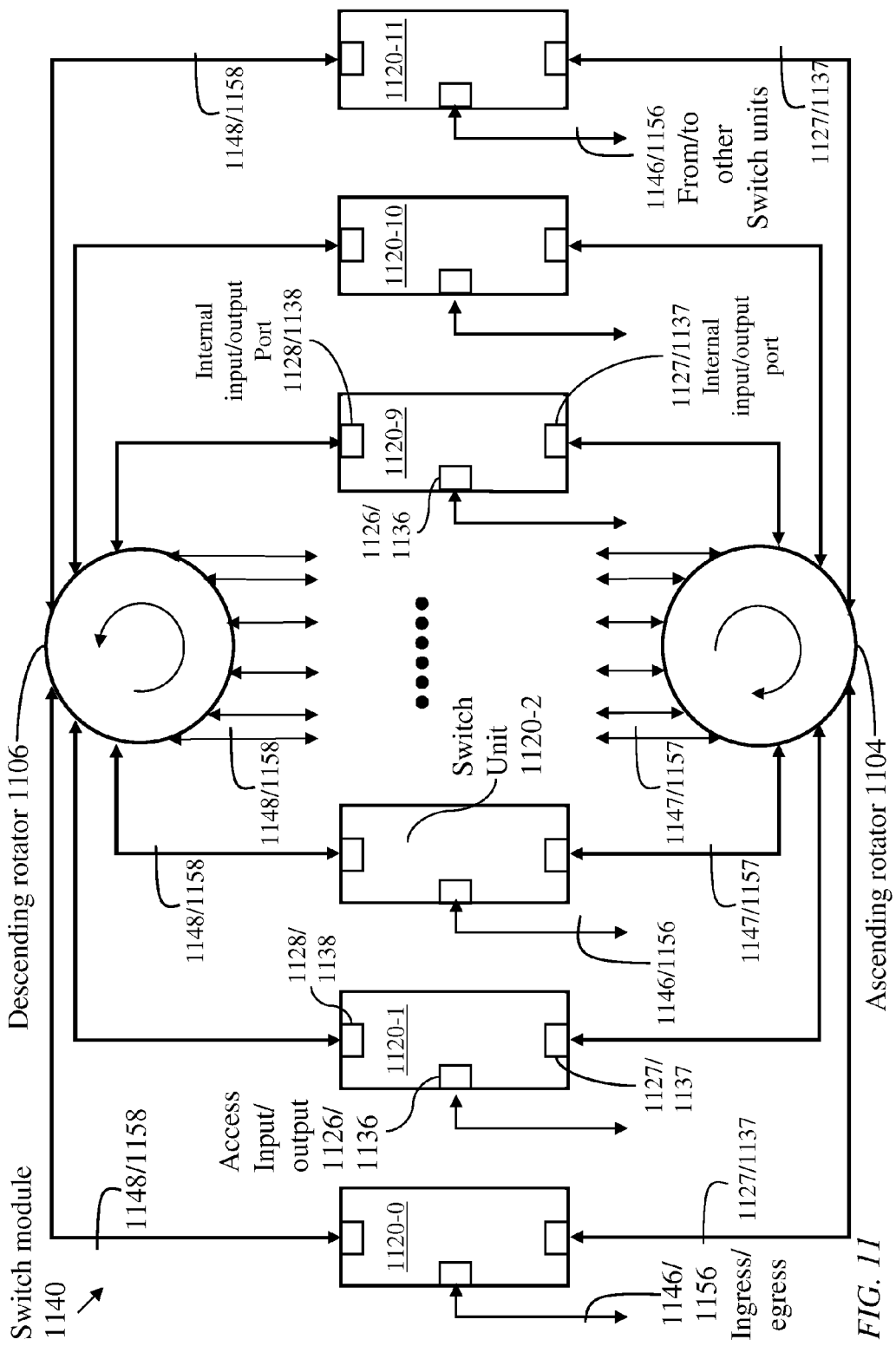
FIG. 11 illustrates an exemplary switch module comprising an array of switch units connecting to a rotator pair and providing both contention-free and contention-based switching in accordance with an embodiment of the present invention.

FIG. 11 illustrates an exemplary switch module 1140, according to the present invention. Switch module 1140 comprises a bank of switch units 1120, individually identified as 1120-0 to 1120-11, a clockwise rotator (ascending rotator) 1104 and a counterclockwise rotator (descending rotator) 1106. Each of the two rotators 1104 or 1106 has a number of rotator input ports at least equal to the number of switch units 1120 and a number of rotator output ports at least equal to the number of switch units 1120. Each switch unit 1120 has three input ports and three output ports. An access input port 1126 connects to a channel 1146 from data sources or other switch modules, an internal input port 1127 connects to a channel 1147 from clockwise rotator 1104, and an internal input port 1128 connects to a channel 1148 from counterclockwise rotator 1106. An access output port 1136 connects to a channel 1156 to data sinks or other switch modules, an internal output port 1137 connects to channel 1157 to clockwise rotator 1104, and an internal output port 1138 connects to a channel 1158 to counterclockwise rotator 1106.

Switch module 1140 may provide contention-free switching, contention-based switching, or a combined contention-free and contention-based switching. A switch module 1140 operated as a contention-based switching device is disclosed in United States Patent Application titled "Circulating Switch", publication no. 2004/0165887, issued as U.S. Pat. No. 7,567,556.

Switch modules 1140 may be arranged in a cascaded structure, as will be described with reference to FIG. 16, a mesh structure, as will be described with reference to FIG. 18, or in other structures requiring interconnection of switch modules as will be described with reference to FIGS. 27-29 and 44-45.

When used in a cascade multi-stage structure, all the access input ports 1126 of a switch module in a first stage may be ingress ports 1126A receiving data from data sources and all output ports 1136 of a switch module in a last stage may be egress ports 1136A transmitting data to data sinks. All access input ports 1126 of a switch module in a middle stage are inbound ports 1126B receiving data from a switch module of a preceding stage and all access output ports of a switch module of a middle stage are outbound ports 1136B transmitting data to switch modules of a succeeding stage. In a cascaded structure, each switch module 1140 may be operated as a contention-free switching device providing contention-free switching from each access input port 1126 to each access output port 1136.

When used in a mesh structure, the access input ports 1126 of any switch module 1140 may be divided into ingress ports 1126A receiving data from data sources and inbound ports 1126B receiving data from other switch modules. Likewise, the access output ports 1136 may be divided into egress ports 1136A transmitting data to data sinks and outbound ports 1136B transmitting data to other switch modules. Preferably, each switch module 1140 may provide contention-free switching from any access input port 1126 to outbound ports 1136B and contention-based switching from any access input port to egress ports 1136A.

Figure 12:
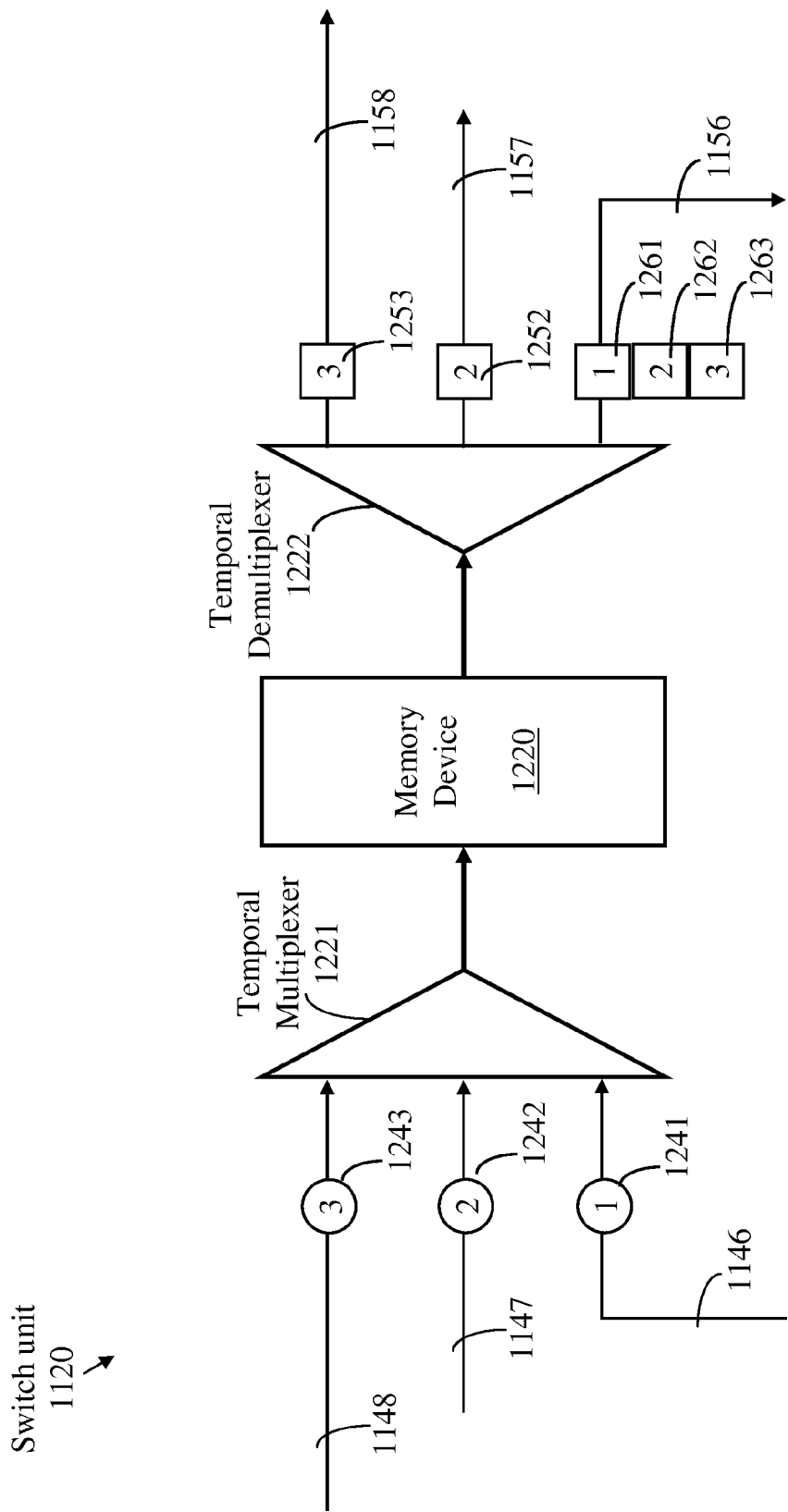
FIG. 12 illustrates a switch unit in the switch module of FIG. 11, the switch unit having a temporal multiplexer, a memory device, and a temporal demultiplexer.

FIG. 12 further illustrates switch units 1120 comprising a memory device 1220 connecting to a multiplexer 1221 and a demultiplexer 1222. Multiplexer 1221 connects to an ingress channel 1146 from data sources, an internal input channel 1147 from the clockwise rotator 1104, and an internal input channel 1148 from the counterclockwise rotator 1106. Data segments from channels 1146, 1147, and 1148 are cyclically transferred through multiplexer 1221 to the memory device 1220. Demultiplexer 1222 connects to an egress channel 1156, an internal output channel 1157 to the clockwise rotator 1104, and an internal output channel 1158 to counterclockwise rotator 1106. Demultiplexer 1222 cyclically transfers data from the memory device 1220 to channels 1156, 1157, and 1158.

A fresh data segment 1241 received at a given switch unit is marked as being in state "1", a data segment 1242 received from a data source connecting to a different switch unit through one of the two rotators, 1104 and 1106, is marked as being in state "2", and a data segment 1243 received from a data source connecting to another switch unit through an intermediate switch unit is marked as being in state "3". The data segment state ("1", "2", or "3") is indicated in a circle at input and in a square at output. An input data segment 1241 directed to a data sink connecting to the given switch unit may be directly transferred to egress channel 1156 and is referenced as output data segment 1261 in FIG. 12. An input data segment 1241 directed to a data sink connected to a destination switch unit 1120 is transferred through internal output channel 1257 leading to the clockwise rotator 1104 or internal output channel 1158 leading to the counterclockwise rotator 1106, and is referenced as output data segment 1252. Either of the two rotators 1104 or 1106 may transfer the data segment directly to the destination switch unit or deliver the data segment to an intermediate switch unit.

An input data segment 1242 may be directed to a local data sink (indicated as output data segment 1262) or directed to one of the two rotators (referenced as output data segment 1253) for delivery to the switch unit connecting to the destination data sink.

An input data segment 1243 may only be directed to a local data sink (referenced as output data segment 1263) and is transferred through egress channel 1256.

Figure 13:
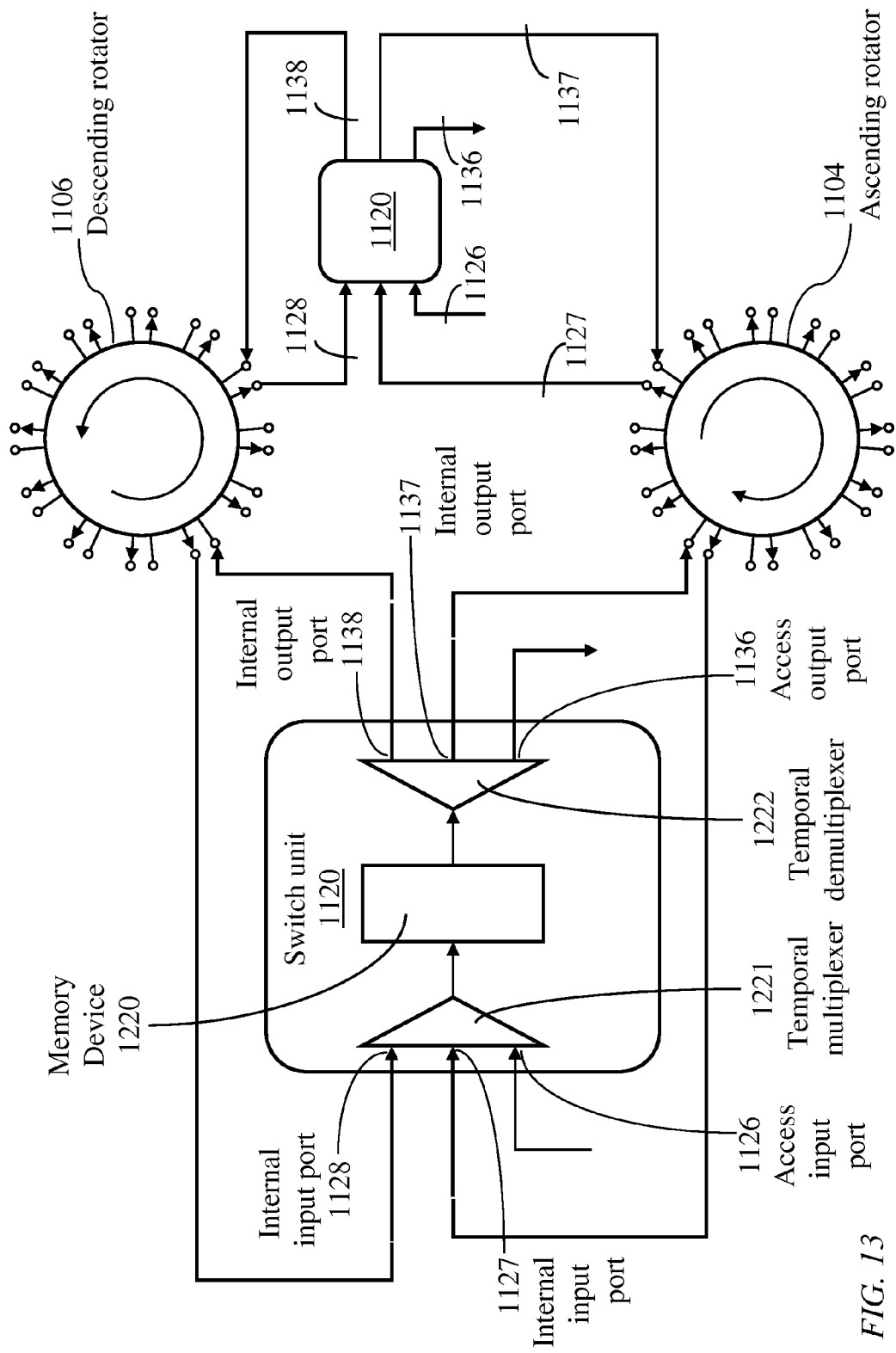
FIG. 13 further details the exemplary switch module of FIG. 11 using the switch unit of FIG. 12.

FIG. 13 further details the interconnection of switch units through the two rotators 1104/1106 using the switch unit of FIG. 12.

Exemplary switch module 1140 comprises twelve switch units 1120 individually identified as 1120-0, 1120-1, . . . , 1120-11. Each switch unit 1120 includes a memory device 1220 which stores data segments received from data sources, data segments to be transmitted to data sinks, data segments individually addressed to egress ports, and data segments organized in data blocks where each data block is addressed to an inner output port.

Figure 14:
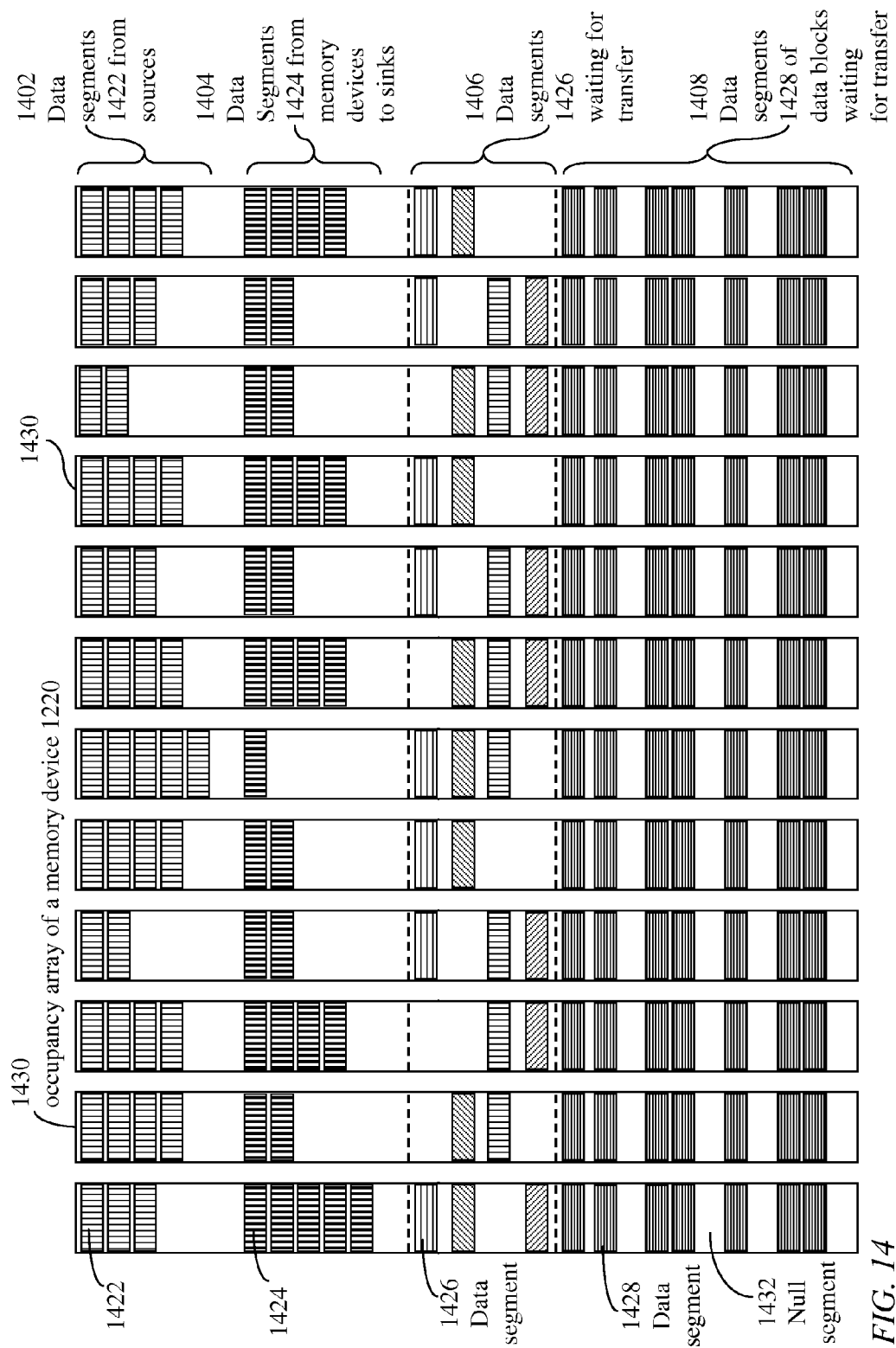
FIG. 14 illustrates data organization in the switch units of the switch module of FIG. 13.

FIG. 14 illustrates memory organization in exemplary switch module 1140 in which four of the twelve switch units interface with data sources and sinks, and are herein called "outer switch units 1120A". The remaining eight switch units are "inner switch units" each having an outbound channel from an outbound port 1136B to an inbound port 1126A of another switch module 11409. Fresh data received from data sources are arranged into data segments of a moderate size; 1024 bits each, for example.

Each column 1430 represents a memory device 1220 of a switch unit 1120. The memory device 1220 is logically divided into four sections. A first section 1402 contains data segments 1422 received from data sources connecting to the switch unit 1120. A second section 1404 contains data segments 1424 for delivery to respective data sinks connecting to the switch unit 1120. A third section 1406 contains data segments 1426 waiting for transfer through the switch module 1140 to any of the outer switch units 1120A. A fourth section 1408 contains data segments 1428 waiting for transfer through switch module 1140 to an inner switch unit 1120B. A data segment 1428 belongs to a data block and the data segments of the data block occupy corresponding cells in the twelve columns 1430. A data block may include a null data segment 1432. It is noted that sections 1406 and 1408 of columns 1430 are similar to sections 1006 and 1008 of a column 1030 (FIG. 10) representing a memory device 938 (FIG. 9). A memory device 938 stores only data in transit while a memory device 1220 stores data in transit as well as fresh data from sources and terminating data for transfer to data sinks.

Cascaded Multi-Stage Switch

Figure 15:
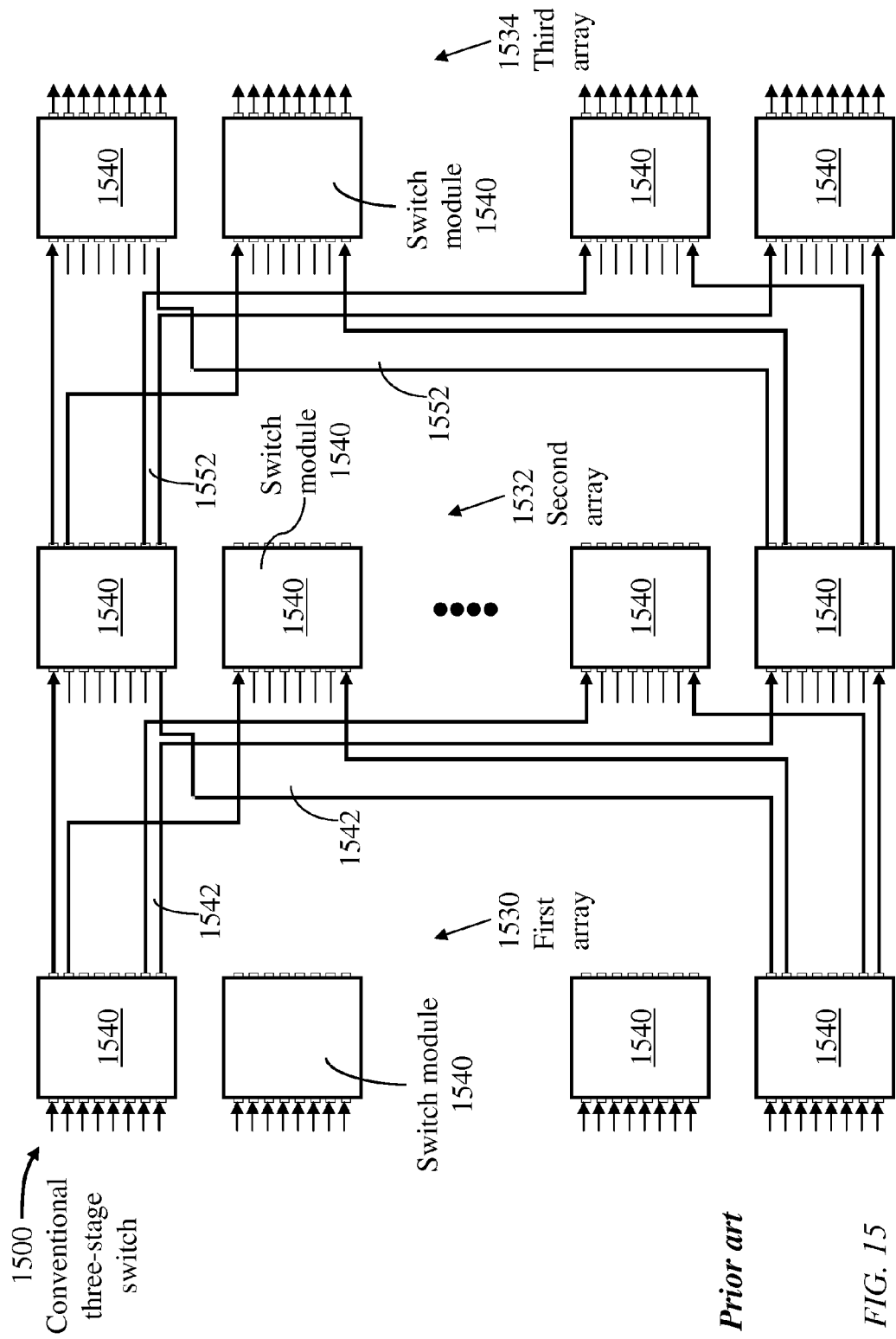
FIG. 15 illustrates a conventional three-stage switch.

FIG. 15 illustrates a conventional three-stage switch 1500 comprising three arrays 1530, 1532, 1534 of switch modules 1540. Each switch module 1540 has m input ports and m output ports, and the three-stage switch 1500 has $m^2$ input ports and $m^2$ output ports. A switch module 1540 may be a single-stage time-multiplexed space switch or a shared-memory switch. In general, an input buffer is needed at each input port of each switch module 1540 of the first array 1530, regardless of the type of switch module, in order to enable packet segmentation into data segments of a predefined size.

If each switch module 1540 is a time-multiplexed space switch module, then data segments may be held in an input buffer to be switched according to a schedule determined by a controller of the switch 1500. A path through switch 1500 traverses three time-multiplexed switch modules 1540. Allocating a path requires a complex third-order time-slot-matching process to find four contemporaneous vacant time slots, in a predefined time frame, at a first input port (an ingress port) of a first switch module 1540 in the first array 1530, a second input port of a second switch module 1540 in the second array 1532, a third input port of a third switch module 1540 in the third array 1534, and an egress port of the third switch module. In order to facilitate path-search through the switch 1500, an intermediate buffer may be placed at each input port of each switch module 1540 in the second array 1532 and the third array 1534. Such intermediate buffers provide temporal decoupling of the three arrays 1530, 1532, 1534 and, hence, decomposes the path-search process to three first-order time-slot-matching processes. Thus, the use of intermediate buffers reduces a third-order time-slot-matching process to three independent first-order time-slot-matching processes which are still elaborate but require less search effort and yield a better utilization of the switch modules 1540 in comparison with a third-order time-slot-matching process.

To further simplify the operation of switch 1500, contention-free switch modules 1540 may be used. This significantly reduces the path search effort. Instead of elaborate time-slot-matching processes which require examining port-occupancy states during individual time slots of a time frame, the path finding process is reduced to examining the occupancy states of the ingress port, the egress port, the second input port, and the third input port to determine if each has a sufficient vacancy to accommodate a connection.

A contention-free switch module 1540 may be implemented as conventional shared-memory switching device as described with reference to FIGS. 1 and 2, or a rotating-access shared-memory switching device as described with reference to FIGS. 5 and 11. A shared-memory switching device switches data blocks of a relatively large size. A data segment formed at ingress may be of size 1024 bits and a data block may comprise m data segments, m being the number of input ports per switch module 1540 as defined above. With m=64, for example, the size of a data block would be 64 kilobits. Switching large data blocks requires that data of a given data stream be held at an ingress port until sufficient data is accumulated to form a data block. The delay at an ingress port can be excessive for a data stream of relatively low flow rate, and this may force forming incomplete data blocks with possible significant capacity waste that would, in turn, force the use of a large internal expansion. To circumvent this difficulty, according to an embodiment of the present invention, a consolidation process is introduced at each input port of each switch module 1540 as will be described below with reference to FIG. 16.

Figure 16:
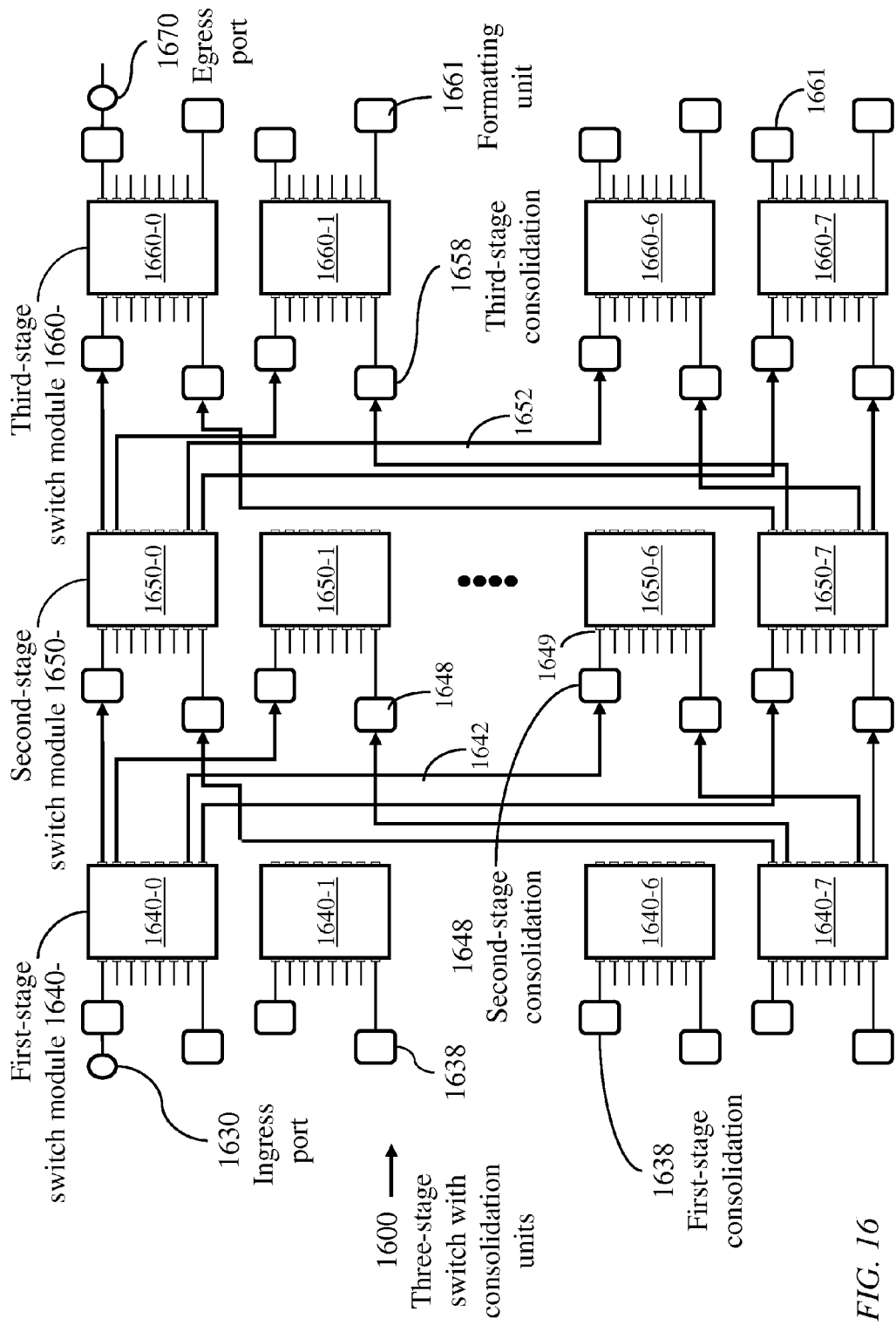
FIG. 16 illustrates a three-stage switch using high-capacity contention-free switch modules each employing consolidation memory devices at input to enable high scalability according to an embodiment of the present invention.

FIG. 16 illustrates a three-stage switch 1600 comprising three arrays of contention-free switch modules. A first array comprises contention-free switch modules 1640, identified individually as 1640-0 to 1640-7. A second array comprises contention-free switch modules 1650 (individually 1650-0 to 1650-7). A third array comprises contention-free switch modules 1660 (individually 1660-0 to 1660-7). Each switch module 1640 has eight ingress ports 1630 and each switch module 1660 has eight egress ports 1670. A contention-free switch module 1640, 1650, or 1660 may be a conventional shared-memory switch module, such as switch 100, a rotating-access switch module 540, or a circulating switch module 1140. When a switch module 540 is used as a switch module 1640, 1650, or 1660 in switch 1600, aggregation unit 524 may not be needed in switch modules 1640, 1650 because consolidation units 1638 and 1648 already aggregate traffic streams destined to a large number of output ports, thus reducing the formation delay of data blocks.

To facilitate path allocation, each ingress port may be identified by indices u and v, where u is an identifier of a first-array switch module 1640 and v is an identifier of the input port within the switch module 1640. Likewise, each egress port may be identified by indices x and y, where x is an identifier of a third-array switch module 1660 and y is an identifier of the egress port within the switch module 1660. At an ingress port 1630, data packets are received and segmented into data units of equal size in a manner well known in the art. A consolidation unit 1638 associated with each ingress port sorts the data units according to their destination egress ports and holds the sorted data in a consolidation memory device within the consolidation unit 1638. The data units are aggregated into data blocks, each containing a number of data units preferably equal to the number of ingress ports per switch module 1640. A data blocked formed at a consolidation unit 1638 may contain data blocks destined to any egress port 1670. A data block may contain null data units.

Data blocks switched through a contention-free switch module 1640 are directed through channels 1642 to consolidation units 1648. At a consolidation unit 1648 associated with a switch module 1650, data blocks received from a switch module 1640 are disassembled into its constituent data units which may be destined to any egress ports 1670 and the data units are sorted according to their destination switch modules 1660. Data blocks are formed, with each data block containing data units destined to egress ports belonging to the same switch module 1660.

Likewise, data blocks switched through a contention-free switch module 1650 are directed through channels 1652 to consolidation units 1658. At a consolidation unit 1658 associated with a specific switch module 1660, data blocks received from a switch module 1650 are disassembled into its constituent data units which may be destined to egress ports 1670 belonging to the specific switch module 1660. At consolidation unit 1658, the data units are sorted according to their destination egress ports 1670 and data blocks are formed, each containing data units destined to an egress port of the specific switch module 1660.

A data block formed at a consolidation unit 1648 has a number of data units preferably equal to the number of internal input ports per switch module 1650 and, likewise, a data block formed at a consolidation unit 1658 has a number of data units preferably equal to the number of internal input ports per switch module 1660. The purpose of consolidation units 1638, 1648, and 1658 is to facilitate the formation of large data blocks of high fill without incurring excessive delay. Egress units 1661 disassemble data blocks into data units and reassemble the data units into data packets in a manner well known in the art.

The dimension of each switch module 1640, 1650, or 1660 is limited primarily by the delay in forming data blocks and the consolidation units 1638, 1648, and 1658 are introduced in order to reduce data-block-formation delay. The illustrated switch 1600 uses modules of dimension 8×8 each and has 64 ingress ports (input ports of the first array) and 64 egress ports (output ports of the third array). Using contention-free switch modules, each dimension 64×64, would enable the construction of a switch 1600 of dimension 4096×4096.

Figure 17:
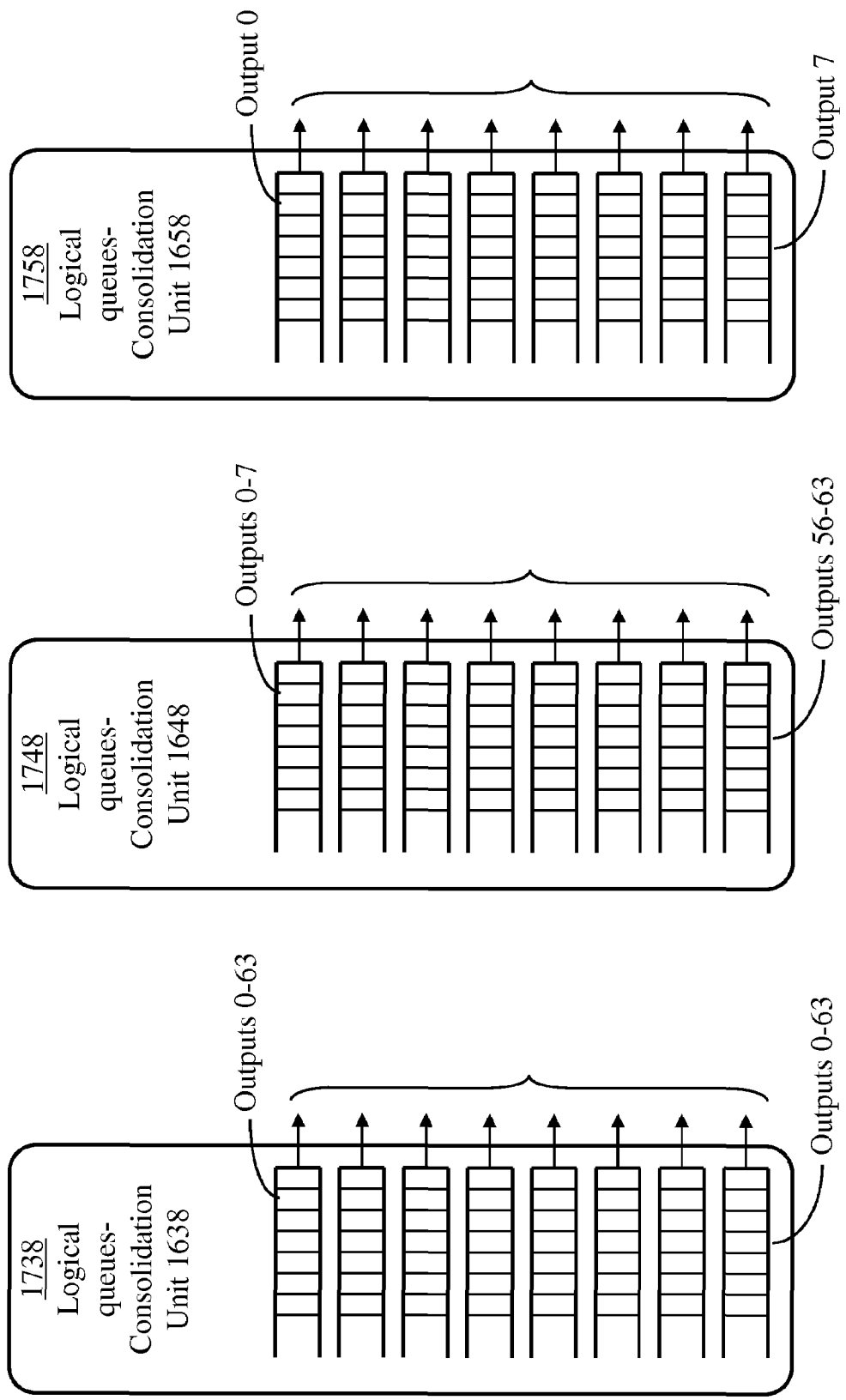
FIG. 17 illustrates a logical organization of consolidation memory devices in the switch of FIG. 16.

Each consolidation unit 1638, 1648, or 1658 has a memory device logically partitioned into eight queues; one queue per output port of the consolidation unit as illustrated in FIG. 17. Each queue 1738 of consolidation unit 1638 may hold data units belonging to any of the 64 egress ports. Data units of a specific connection are assigned to a same queue in order to guarantee proper order of delivery. Connections may be assigned to the queues 1738 in a manner that realizes load equalization. Each queue 1748 of consolidation unit 1648 may hold data units belonging to any of eight egress ports of a switch module 1660; for example a first queue may hold data units directed to egress ports 0-7 and a last queues may hold data destined to egress ports 56 to 63. Each queue 1758 of consolidation unit 1658 may hold data destined to a single egress port.

Simple Mesh Structures

Figure 18:
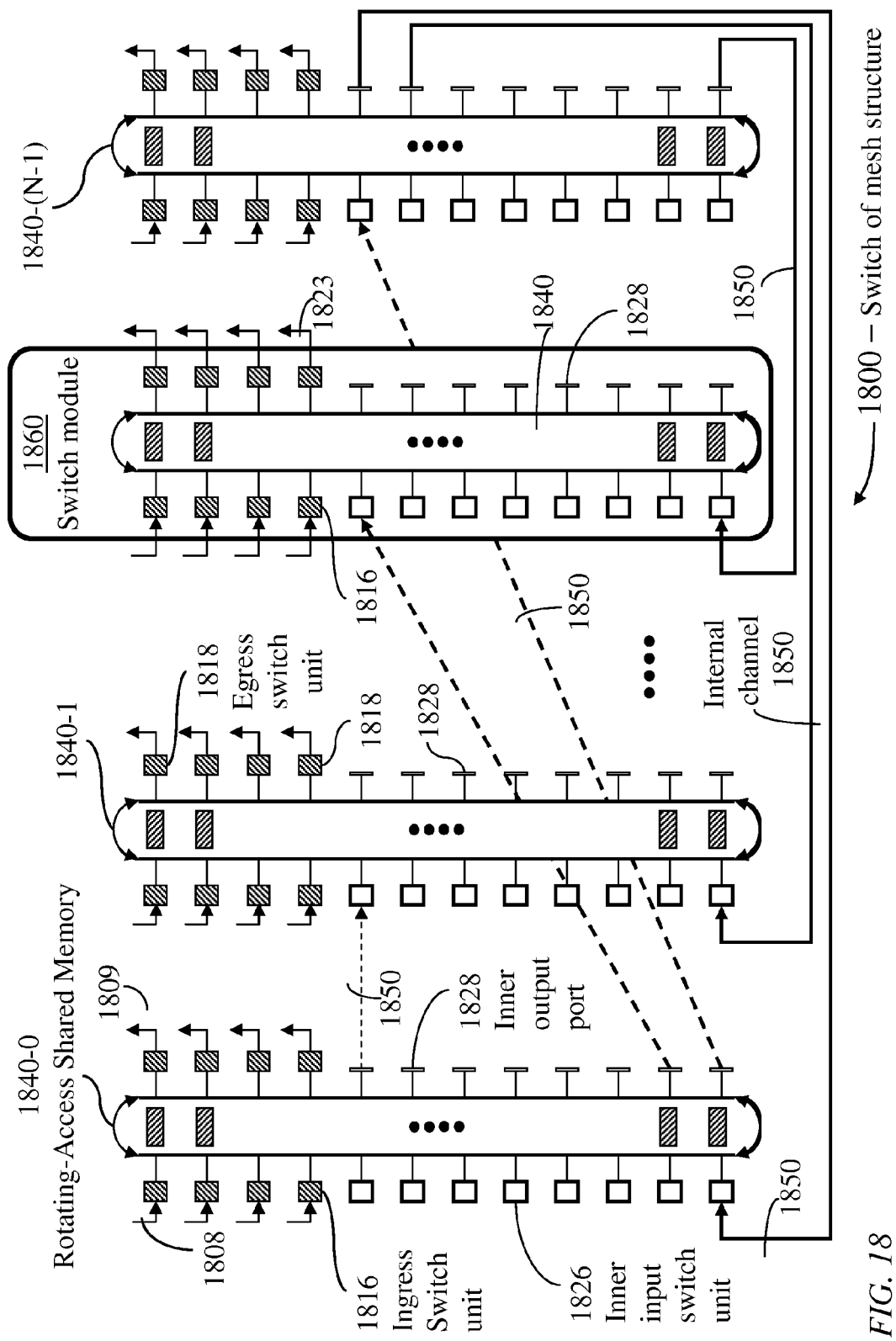
FIG. 18 illustrates a switch having mesh-structure of switch modules operating in a dual contention-free and contention based modes according to an embodiment of the present invention.

FIG. 18 illustrates an exemplary mesh structure 1800 of nine switch modules 1860, each having a rotating-access shared memory 1840. Each of the rotating-access shared-memory devices 1840-0, 1840-1, . . . , 1840-8, has 12 input ports and 12 output ports. Each switch module 1860-x, 0≦x<9, has twelve input switch units connect to the input ports of a respective shared-memory device 1840-x and four egress switch units 1818 each connecting to one of the output ports. Each of the remaining output ports, 1828, is an "inner output port" which connects through an internal channel 1850 to input switch units of other switch modules 1860. The input switch units include four ingress switch units 1816 and eight internal input switch units 1826. Preferably, each ingress switch unit 1816 is paired with an egress switch unit 1818 to share memory and control. Each ingress switch unit 1816 receives data from subtending data sources, or from an external node, through an ingress channel 1808. Each inner input switch unit 1826 receives data from an inner output port 1828 of another switch module 1860-y, 0≦x<9, y≠x, through an internal channel 1850. Each egress switch unit 1818 transmits data to subtending data sinks, or to an external node, through an egress channel 1809. In the exemplary switching node 1800, the internal channels 1850 of each switch module 1860 connect to inner switch units 1826 of eight other switch modules 1860 thus forming a spatial mesh of nine switch modules 1860.

Each switch module 1860 may be operated as a contention-free shared switching device. A switch module 1860 is preferably devised to provide contention-free switching of data blocks, where each data block comprises a number of finer data segments, and contention-based switching of individual data segments. The dimension of a switch module 1860 is the number switch units; 12 in the example of FIG. 18.

A switch module 1860 may provide contention-free switching to all its output ports or to a subset of output ports. The main purpose of employing contention-free switching of data blocks is to simplify the connection set-up through the switching node 1800. If the switch modules 1860 are configured as contention-based structures, a time-slot-matching process would be needed to set-up a connection. Using contention-free switch modules reduces the connection set-up process to a simple process of tracking the total vacancy of internal channels 1824. If a switch module 1840 provides contention-free switching to each of its output ports (egress ports and inner output ports), all the data segments of a data block formed at an ingress switch unit 1816 have to be directed to a single destination egress switch unit. This restriction may result in some delay in forming data blocks and may force formation of data blocks that include null data segments. A preferred alternative, in accordance with the present invention, is to provide contention-free switching of data blocks from the input ports to the inner output ports and contention-based switching of data segments from the input ports to the egress ports of each switch module 1860. Data blocks formed at an ingress switch unit 1816 may contain finer data segments directed to many egress ports of a destination switch module 1860. After a data block comprising finer data segments destined to egress ports of a destination switch module 1860 has been switched to an inner switch unit 1826 of the destination switch module, the data segments may be individually switched according to a contention-based process to respective egress switch units 1818.

A path from an ingress port of a switch module 1860 to an egress port of the same switch module traverses one shared memory 1840. A path from an ingress port of a first switch module 1860 to an egress port of a second switch module 1860 may traverse only the first switch module and the second switch module. However, with spatial traffic imbalance, the path may traverse an intermediate switch module 1860. Therefore, in order to accommodate severe traffic imbalance, the number of inner input switch units 1826 is preferably selected to be approximately twice the number of ingress switch units. Thus, using switch modules 1860 of 160 input switch units each, and dividing the input switch units into 60 ingress switch units and 100 inner switch units 1826, 101 switch modules 1860 may be interconnected in a full mesh structure yielding a total number of ingress switch units of 60×101. With each ingress channel 1808 having a capacity of 10 Gb/s (10 Gigabits per second), the total capacity of the mesh structure exceeds 60 Tb/s (60 terabits per second).

Figure 19:
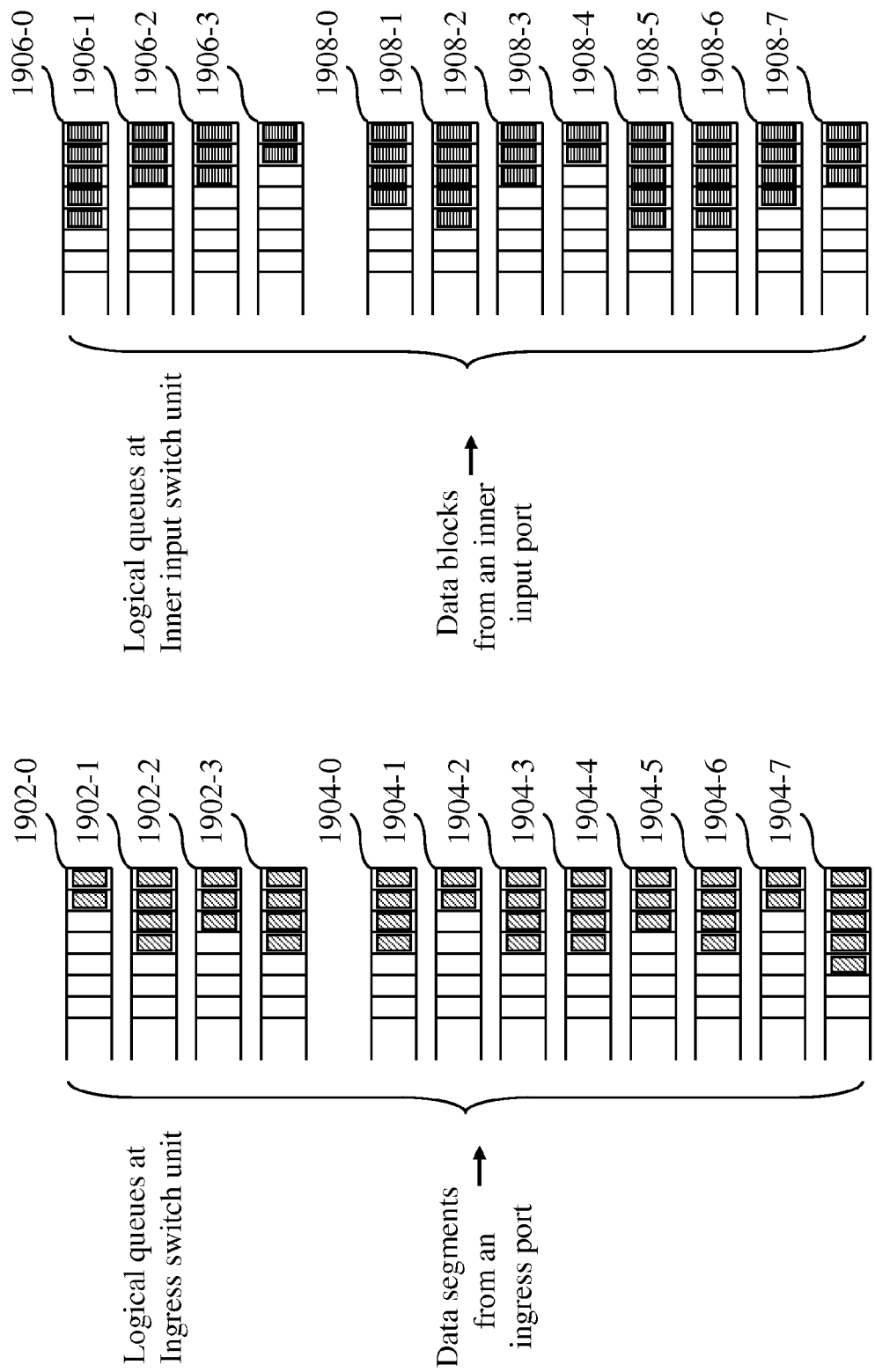
FIG. 19 illustrates logical queues at an ingress port and an inner port of the switch of FIG. 18.

FIG. 19 illustrates data handling at input of each switch module 1840 in switch 1800.

Each ingress switch unit 1816 of a switch module 1860 receives data packets of arbitrary sizes and organizes the data into data segments (data units) of a predetermined size. The data segments are placed in logical queues each corresponding to an output port of the switch module 1840. The logical queues include queues 1902 corresponding to egress ports (queues 1902-0 to 1902-3) and logical queues 1904 corresponding to inner output ports (queues 1904-0 to 1904-7). Data segments placed in queues 1902 are switched as such to respective egress ports. Data segments placed in queues 1904 are aggregated into data blocks for contention-free switching to respective output ports of the switch module.

Each internal input switch unit 1826 receives data blocks each data block comprising a number of data segments which may be destined to different output ports. Each data block is disassembled into its constituent data segments and the resulting data segments are placed in logical queues each corresponding to an output port of the switch module 1840. The logical queues include queues 1906 corresponding to egress ports (queues 1906-0 to 1906-3) and logical queues 1908 corresponding to inner output ports (queues 1908-0 to 1908-7). Data segments placed in queues 1906 are switched as such to respective egress ports. Data segments placed in queues 1904 are aggregated into data blocks for contention-free switching to respective output ports of the switch module.

Figure 20:
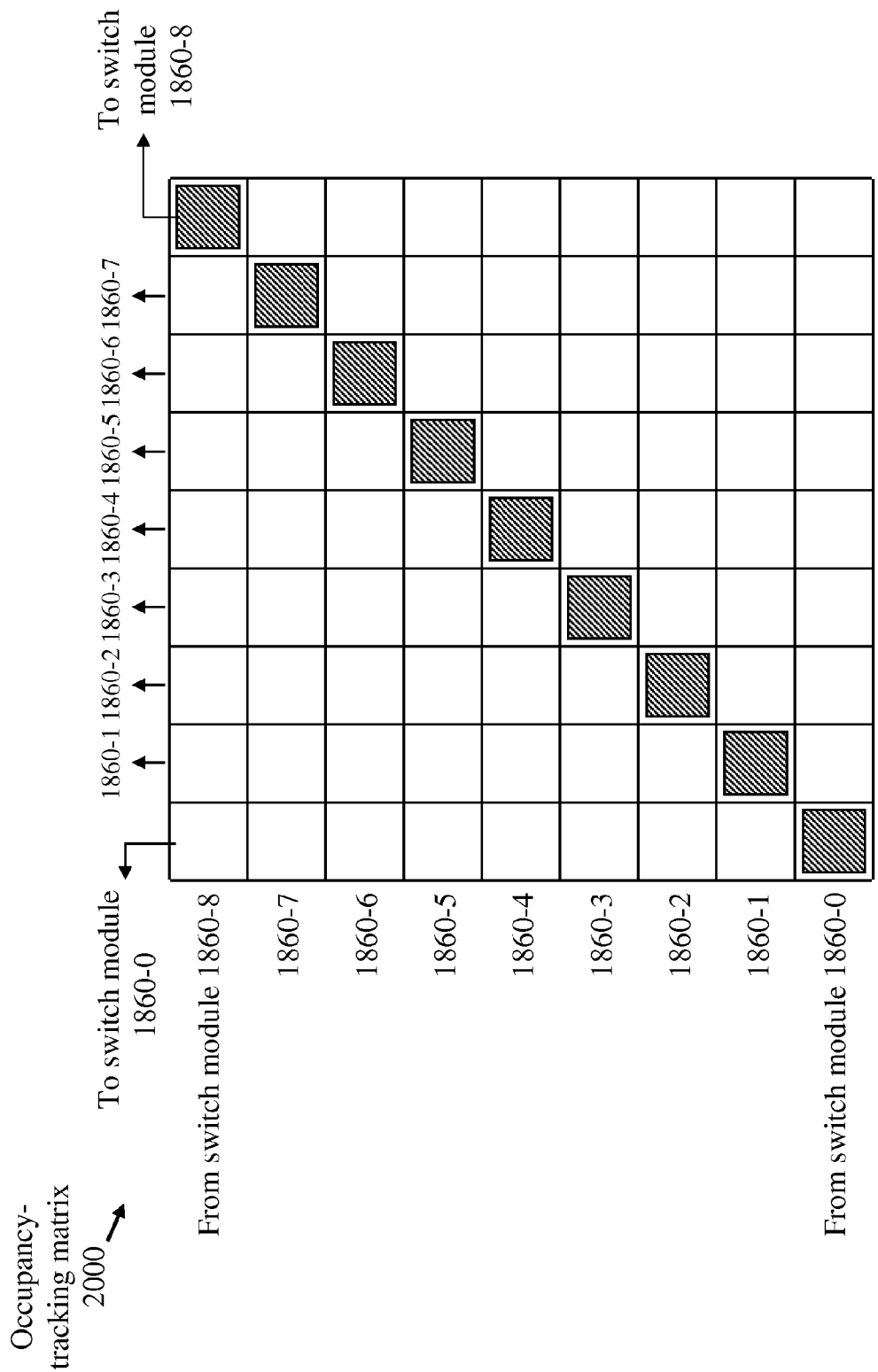
FIG. 20 illustrates an occupancy-tracking matrix for use by a controller in setting up connections in the switch of FIG. 18.

FIG. 20 illustrates an exemplary occupancy-tracking matrix 2000 used by a controller of each switch module 1860 to determine the acceptance or otherwise of a connection request, and reserve a path for an accepted connection. Each entry 2002 of a matrix 2000 of a switch module 1860 indicates the vacancy (available capacity) along each internal channel 1850 in the direction from an inner output port of the switch module to an inner switch unit 1816 of another switch module 1860. A connection request may originate from a source connecting to an ingress switch unit 1816 of a given switch module 1860 or may be forwarded from an inner output port of another switch module 1860 of switch 1800. In the former case, a controller of the given switch module 1860 determines whether the connection specifies an egress switch unit 1818 of the same switch modules or an egress switch unit of another switch module 1860. A connection to an egress switch unit within the same switch module 1860 is established according to a conventional unit 1818 of another switch module 1860 may be routed directly through an internal channel 1850 or may traverse an intermediate switch module 1860. The controller of the given switch module 1860 determines a candidate route and a controller of each switch module 1860 traversed by the candidate route employs a matrix 2000.

A controller of a switch module may store an occupancy-tracking matrix 2000 in an occupancy-state memory for tracking the occupancy of inter-module channels to facilitate admission and routing of connections. The occupancy of a channel may be determined on the basis of admission and release of connections. The controller of a switch module includes a scheduler, and a process of capacity reservation may be based on distributed control.

Figure 21:
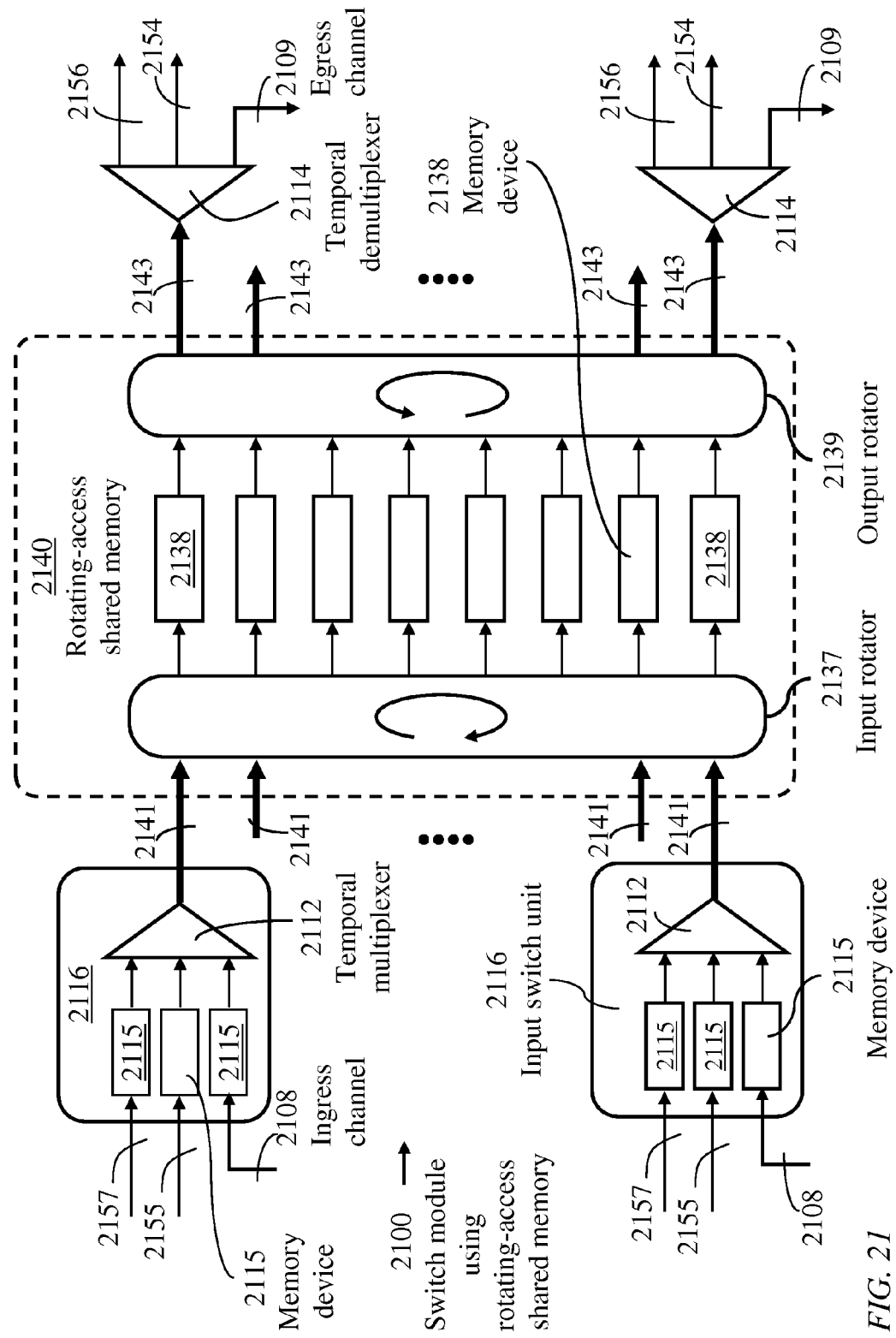
FIG. 21 illustrates a switch module comprising a rotating-access shared memory, a plurality of nonblocking input switch units, and a plurality of output units each including a demultiplexer and a memory device in according to an embodiment of the present invention.

FIG. 21 illustrates a switch module 2100 configured for use in a mesh structure as will be described with reference to FIGS. 23 and 24. Switch module 2100 comprises a rotating-access shared memory 2140, a plurality of nonblocking input switch units 2116, and a plurality of demultiplexers 2114. An input switch unit 2116 receives data from subtending data sources, or from an external node, through an ingress channel 2108. Each input switch unit 2116 includes three memory devices 2115 each connecting to an input channel and a temporal input multiplexer 2112. The input channels include an ingress channel 2108 and two other channels 2155 and 2157 from other switch modules in a mesh structure. The rotating-access shared memory 2140 comprises an input rotator 2137, a bank of memory devices 2138, and an output rotator 2139. The input rotator 2137 and the output rotator 2139 rotate in opposite directions as indicated. Input rotator 2137 has a number of input ports each connecting to a link 2141 from an input switch unit 2116 and an equal number of output ports each connecting to a memory device 2138. Output rotator 2139 has a number of input ports each connecting to a memory device 2138 and a number of output ports each connected to a link 2143 connecting to a demultiplexer 2114. The outputs of the demultiplexer 2114 include egress channel 2109 and two output channels 2154 and 2156 directed to other switch modules in a mesh structure. An input switch unit 2116 is associated with a respective demultiplexer 2114.

The switch module 2100 may be operated as a contention-free switching device, or a combined contention-free and contention-based switching device as will be described with reference to FIGS. 23-26.

Figure 22:
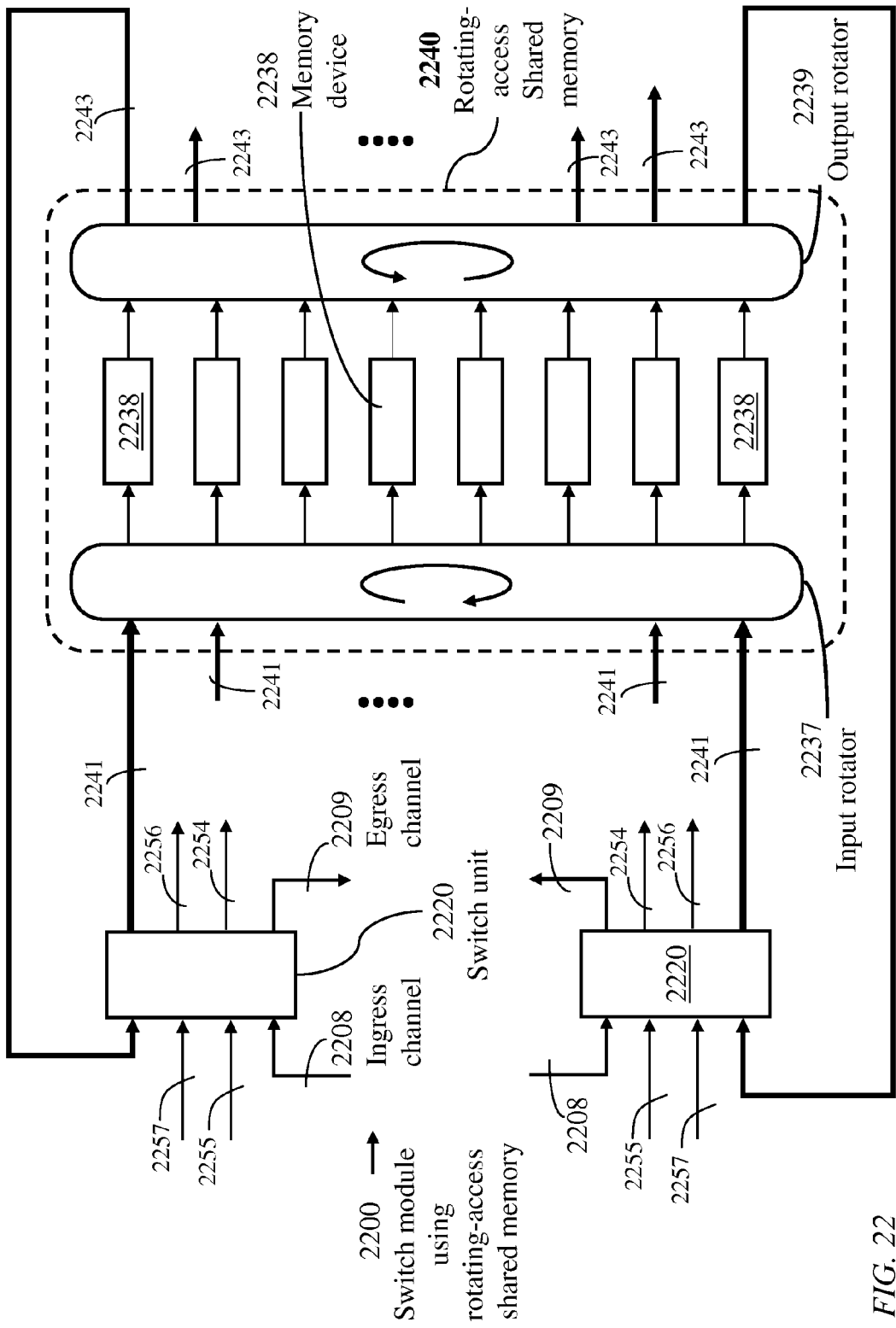
FIG. 22 illustrates a switch module comprising a rotating-access shared memory, a plurality of nonblocking input switch units, and a plurality of output units each including a demultiplexer in according to an embodiment of the present invention.

FIG. 22 illustrates a switch module 2200 configured for use in a mesh structure. Switch module 2200 comprises a rotating-access shared memory 2240, a plurality of nonblocking switch units 2220, and a plurality of output units 2217. A switch unit 2220 receives data from subtending data sources, or from an external node, through an ingress channel 2208. The inputs to a switch unit 2220 include a link 2243 from output rotator 2239, an ingress channel 2208, two channels 2155 and 2157 from other switch modules in a mesh structure. The outputs of a switch unit 2220 include a link 2241 to input rotator 2237, an egress channel 2209, and two channels 2254 and 2256 directed to other switch modules 2200 in a mesh structure.

The rotating-access shared memory 2240 comprises an input rotator 2237, a bank of memory devices 2238, and an output rotator 2239. The input rotator 2237 and the output rotator 2239 rotate in opposite directions as indicated. Input rotator 2237 has a number of input ports each connecting to a link 2241 from a switch unit 2220 and an equal number of output ports each connecting to a memory device 2238. Output rotator 2239 has a number of input ports each connecting to a memory device 2238 and a number of output ports each connected to a link 2243 directed to a switch unit 2220.

The switch module 2100 or 2200 may be operated as a contention-free switching device, or a combined contention-free and contention-based switching device. A switch module may also be configured to comprise input switch units 2116 with associated demultiplexers 2114, and switch units 2220.

Figure 23:
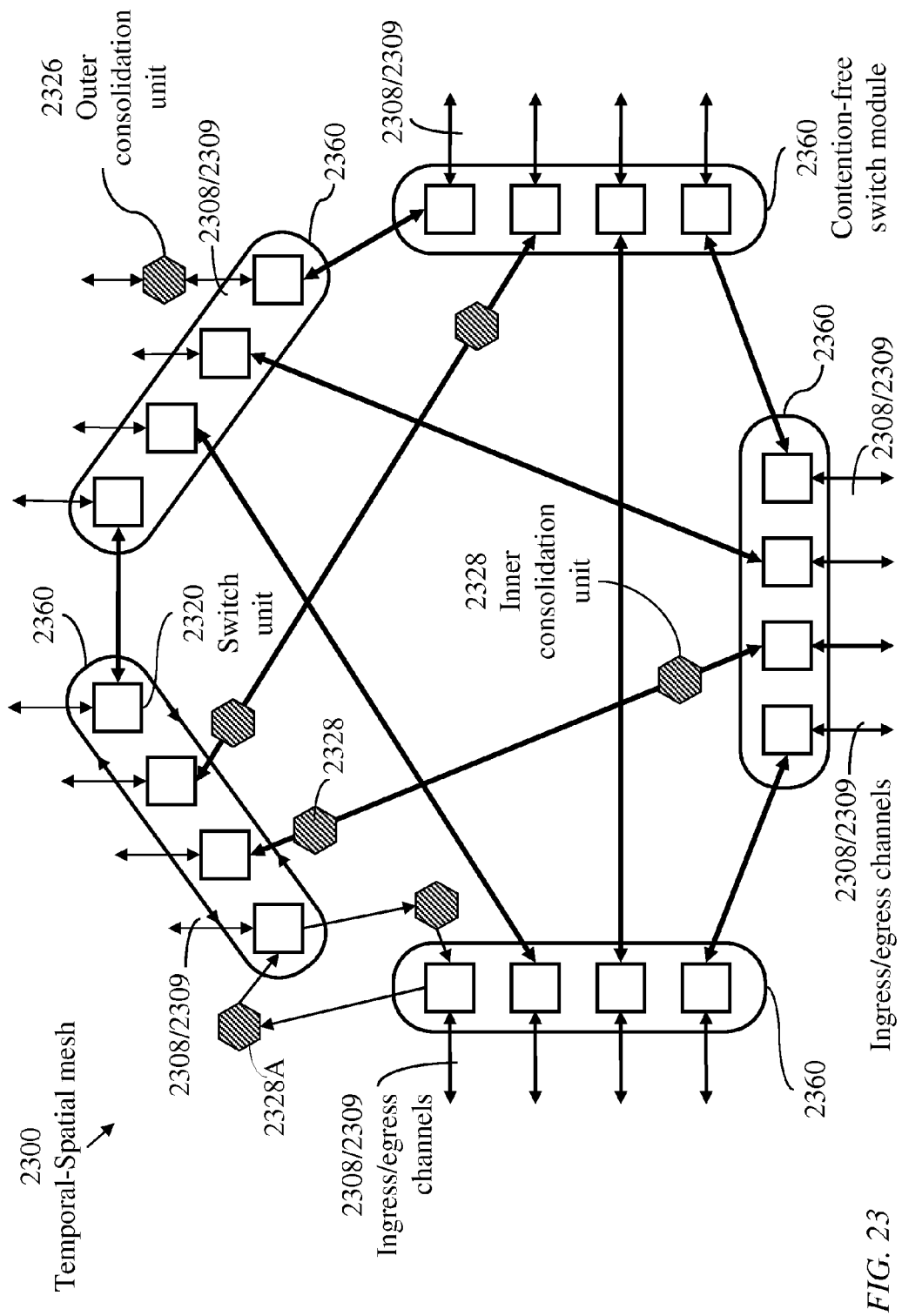
FIG. 23 illustrates a full mesh structure of contention-free switch modules with an internal expansion, each switch module comprising a specified number of switch units, each switch unit having a memory device, in accordance with an embodiment of the present invention.

FIG. 23 illustrates a spatial mesh structure 2300 of contention-free switch modules 2360. Switch module 2360 comprises a number of switch units 2320. Each switch unit 2320 interfaces with an outer dual channel 2308/2309 that connects to data sources and sinks, two dual channels that connect to a switch unit of another switch module 2360 to form a spatial mesh, and a number of inner dual channels (not illustrated) that connect to a number of dual rotators to form a temporal mesh. The outer channel and the inner channels have time-multiplexed access to a memory device in each switch unit 2320. As in switch 1600 of FIG. 16, a consolidation unit 2326 at ingress may be used to form large data blocks, each comprising a number of data segments, to be switched without contention within any switch module 2360. Consolidation units 2328 each preceding an inner input port of a switch module 2360 may also be used to disassemble and reassemble data blocks according to their egress-port destinations. Data consolidation performed in the consolidation units in switch 2300 may take place within the switch units 2320 without the need for separate consolidation units.

Figure 24:
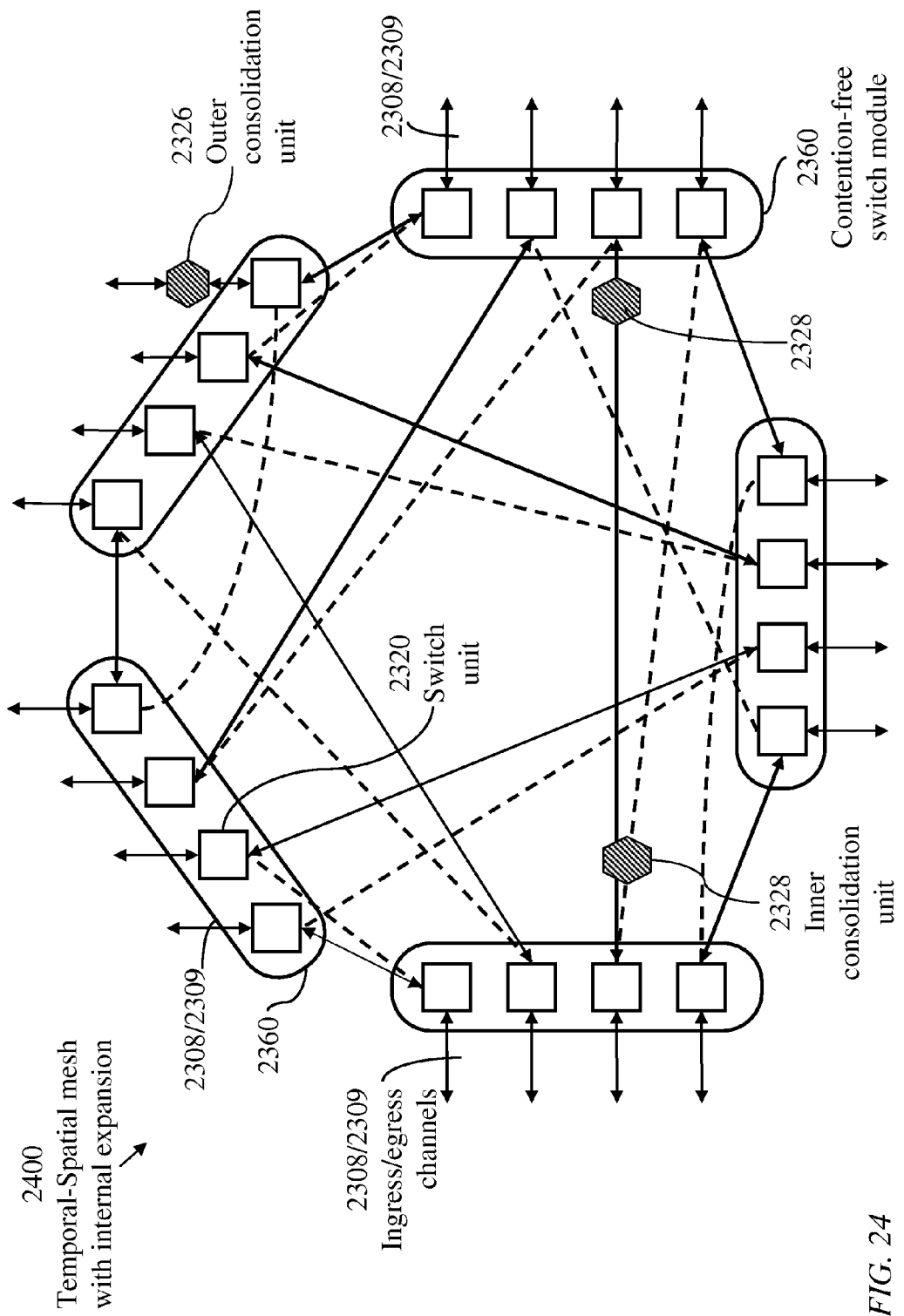
FIG. 24 illustrates the mesh structure of FIG. 23 with a different inner connectivity of the memory devices.

FIG. 24 illustrates a switch configured as a temporal-spatial mesh structure 2400 similar to that of FIG. 23 but with two channels from each switch unit 2320 in a switch module 2360 connecting to different switch units 2320 in another switch module 2360. A consolidation unit may be provided at the inner input ports of a switch unit 2320 in order disassemble data blocks into their constituent data segments and reassemble the data segments into data blocks according to their destinations. The consolidation function may also be performed within switch units 2320.

Figure 25:
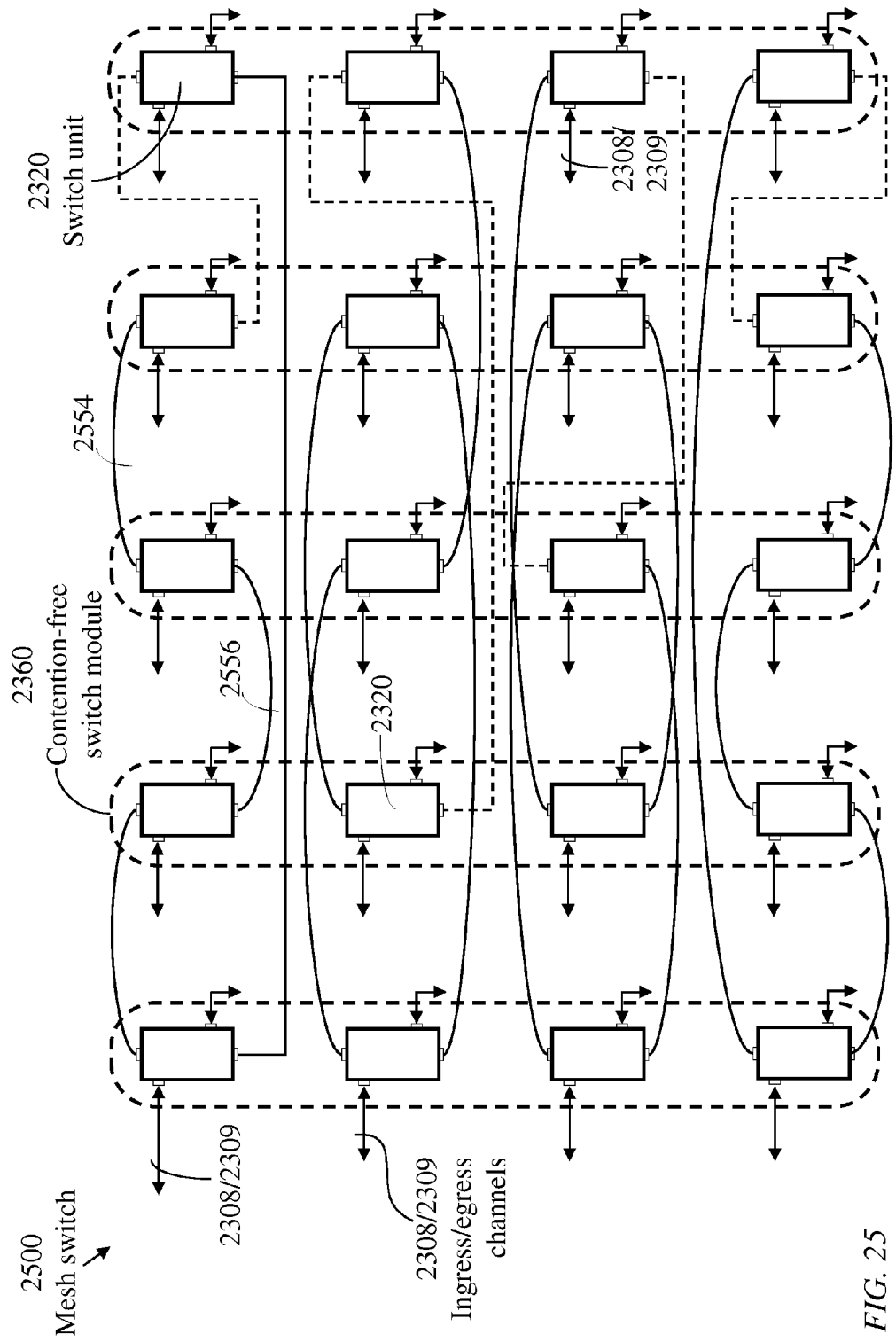
FIG. 25 illustrates an alternate representation of the switch of FIG. 24.

FIG. 25 illustrates an alternate structure 2500 of the mesh structure of FIG. 24 where each switch unit 2320 of a switch module 2360 has two dual channels to switch units 2320 of different switch modules 2360. A consolidation unit may precede each ingress port to consolidate data segments it receives from external sources into data blocks to be switched without contention. A consolidation unit may also precede an inner input port of a switch unit 2320 to disassemble and reassemble data blocks according to constituent data-segments destinations.

Figure 26:
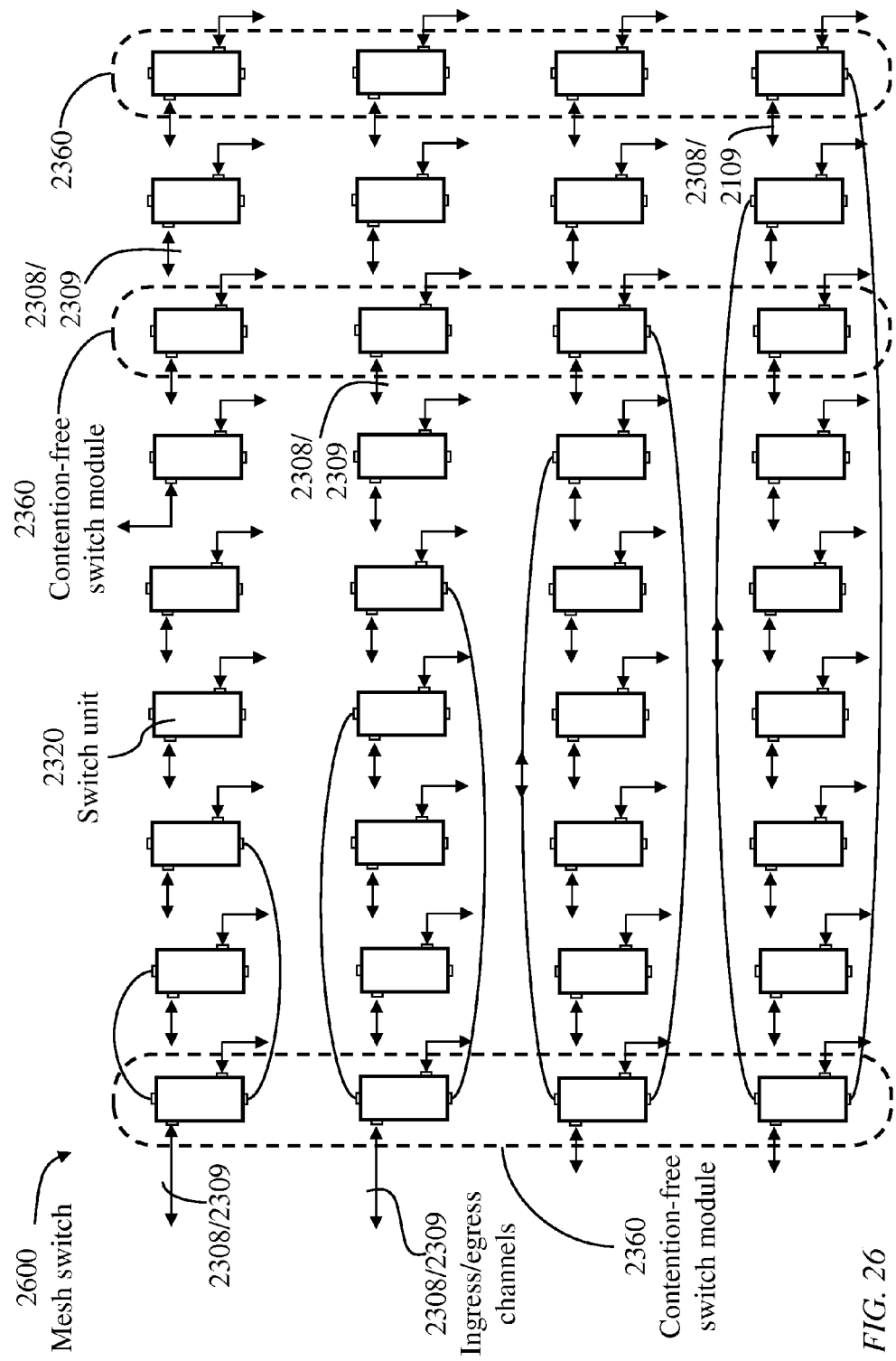
FIG. 26 illustrates a variation of the switch of FIG. 25, where the internal expansion is exploited to connect a larger number of switch modules according to an embodiment of the present invention.

In the mesh structures of FIGS. 23 and 24, the number of switch modules equals the number of switch units per switch module plus one. More switch modules can be added to such a structure to a maximum of one plus double the number of switch units per switch module. FIG. 26 illustrates a structure 2600 using the upper limit of the number of switch modules. Consolidation units may be used at each ingress port of a switch unit 2320 and consolidation units may also be used at each inner input port of a switch unit 2320. In general, each switch unit of a switch module may have a number $\kappa \geq 1$ of dual channels to switch units of $\kappa$ different switch modules thus permitting up to (m×κ+1) switch modules to be connected in a full spatial mesh, where m is the number of switch units per switch module.

Switching Method

The operation of switches 1600, 1800, 2300, and 2400 is based on a method, according to the present invention, of assembling data segments (data units) into large data blocks to enable contention-free switching in one stage of switching, then disassembling switched data blocks into constituent data segments and forming new data blocks for contention-free switching in a subsequent stage of switching. In a switch having a plurality of switch modules, the method comprises steps of receiving data segments from external sources, assembling the data segments into primary data blocks, according to a first criterion, switching the primary data blocks through a first switch module, disassembling switched primary data blocks into primary constituent data segments, reassembling the primary constituent data segments from different primary data blocks into secondary data blocks according to a second criterion, and switching the secondary data blocks through a second switch module. A switched path may traverse a single switch module, two switch modules, or three switch modules. With two switch modules traversed, secondary data blocks are disassembled at each egress port of the second switch module into constituent data segments for transmission to an external node or to local data sinks. With three switch modules traversed, switched secondary data blocks are disassembled at each input port of a third switch module into secondary constituent data segments and ternary data blocks are formed from secondary constituent data segments of different secondary data blocks according to a third criterion. The ternary data blocks are switched through a third switch module and disassembled at each output port of the third switch module into ternary constituent data segments for transmission to an external node or local data sinks. The method may be adapted to different switch structures, and is also used in switches 2700, 2800, 3000, 4400, and 4500 of FIGS. 27, 28, 30, 44, and 45, respectively.

Consolidation units for forming data blocks are illustrated explicitly in FIGS. 16, 23, and 24. However, the formation of data blocks may conveniently be integrated within the switch units of the respective switches. Exemplary arrangements for performing this function within switch units are illustrated in FIGS. 17 and 19.

Lattice Structure of Contention-Free Switch Modules

Figure 27:
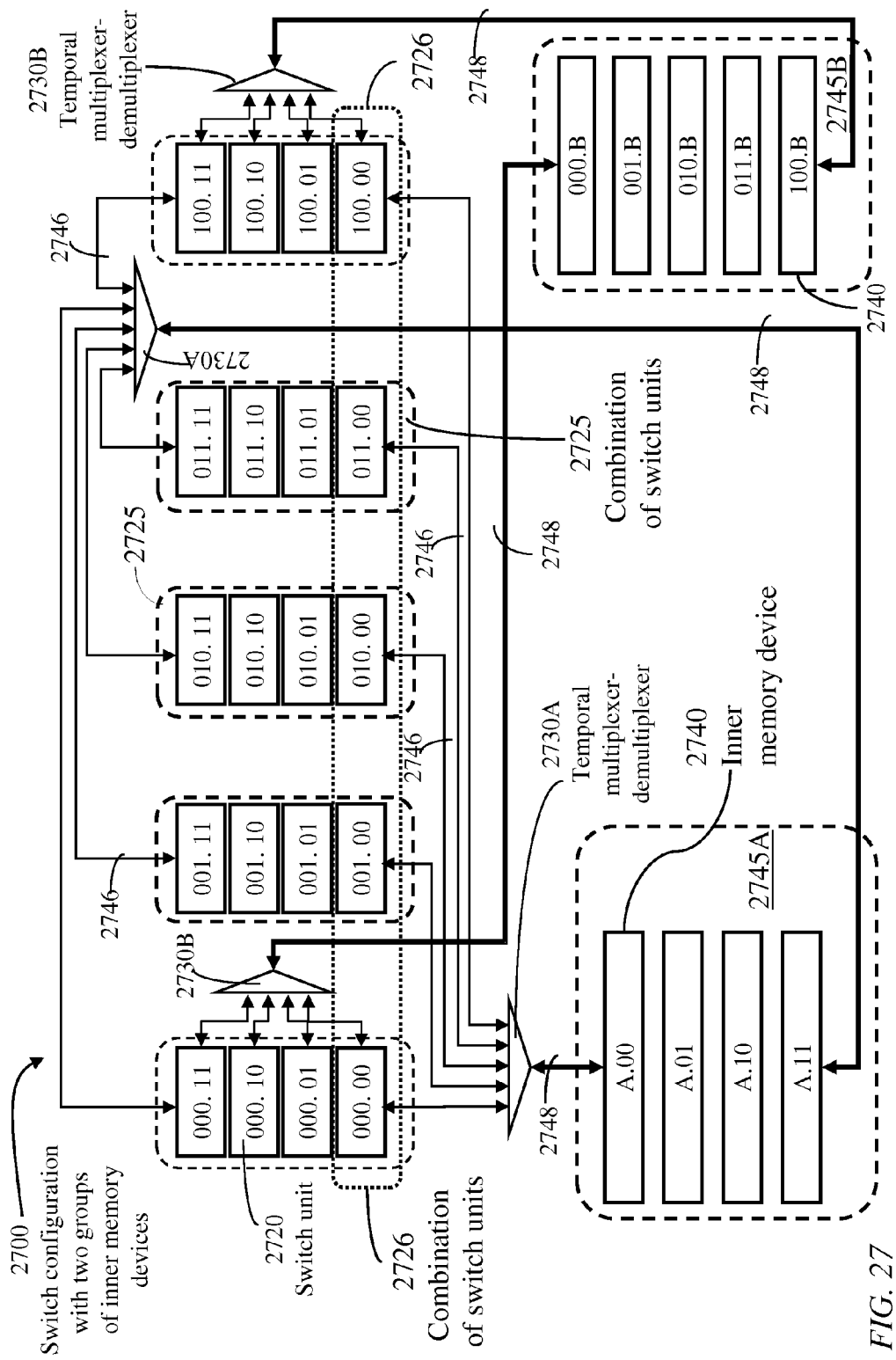
FIG. 27 illustrates a switch according to the present invention comprising two groups of inner memory devices, a plurality of switch units arranged according to two sets of combinations, and multiplexer-demultiplexer units each connecting a combination of switch units to a respective inner memory device.

FIG. 27 illustrates a switch configuration 2700 according to the present invention comprising a plurality of switch units 2720 and a plurality of inner memory devices 2740. Each switch unit 2720 comprises a memory device, hereinafter called an outer memory device, and a switch-unit controller (not illustrated in FIG. 27). The switch units 2720 are logically arranged into a first set of non-intersecting combinations 2725 each combination 2725 containing four switch units 2720. The switch units 2720 are also logically arranged into a second set of non-intersecting combinations 2726 each combination 2726 containing five switch units 2720. Each switch unit 2720 is a member of a combination 2725 and a combination 2726. Thus, any combination 2725 intersects each combination 2726, and vice versa, i.e., any two combinations of different sets have one switch unit 2720 in common. The inner memory devices 2740 are arranged into two groups 2745A and 2745B. A switch unit 2720 includes a memory device, herein called "outer memory device" for holding data received from data sources, or from an external node, to be either sent directly to data sinks accessing the same switch unit (an internal path) or transferred to an inner memory device 2740. A switch unit 2720 also holds data read out from an inner memory device 2740 either for transfer to a data sink accessing the switch unit, or for transfer to another inner memory device 2740 that has a path to a destination switch unit.

To simplify control, each switch unit 2720 is identified by a position number in each of the two combinations 2725, 2726 to which it belongs and is labeled as a concatenation of the two position numbers. The position numbers used in FIG. 27 and subsequent figures are expressed as binary numbers. The five combinations 2725 are indexed as 000, 001, 010, 011, and 100. The four combinations 2726 are indexed as 00, 01, 10, and 11. A switch unit 2720 is identified according to the indices of combination 2725 and 2726 to which the switch unit belongs. Switch units 2720 belonging to a combination 2726 of index 00, for example, connect to an inner memory device 2740 of index A.00 in group 2745A, where "A" denotes all the five indices of combinations 2725. Likewise, switch units 2720 belonging to a combination 2725 of index 000, for example, connect to an inner memory device 2740 of index 000.B in group 2745B, where "B" denotes all the four indices of combinations 2726.

The number of inner memory devices 2740 and their widths are determined according to the combinations of the switch units 2720 each supports. In switch configuration 2700 of FIG. 27, there are 20 switch units 2720 arranged into a first set of four combinations each having five switch units and a second set of five combinations of four switch units each. Each combination of the first set of combinations has dual channels 2723/2724 from/to a temporal multiplexer-demultiplexer 2730A which cyclically connects the switch units of the combination to one of the inner memory devices 2740 in the first group 2745A of inner memory devices through a dual channel 2728. Likewise, each combination of the second set of combinations has dual channels 2733/2734 from/to a temporal multiplexer-demultiplexer 2730B to cyclically connect the switch units of the combination to one of the inner memory devices 2740 in the second group 2745B of inner memory devices through a dual channel 2738.

Thus, combinations 2725-0, 2725-1, 2725-2, 2725-3, and 2735-4 connect to inner memory devices 000.B, 001.B, 010.B, 011.B, and 100.B, respectively, through multiplexer-demultiplexers 2730B. Combination 2726-0 connects to inner memory device A.00, and similarly each of the remaining three combinations 2726 connects to a respective inner memory device A.01, A.10, or A.11, through a multiplexer-demultiplexer 2730A.

Each switch unit 2720 is coupled to a switch-unit controller, herein called an "outer controller" and each combination of switch units 2720 is associated with a combination controller. Thus, in the configuration of FIG. 27, there are 20 outer controllers and 9 combination controllers. The outer controllers of each combination are coupled to the respective combination controller as will be described with reference to FIGS. 37 and 38.

Figure 28:
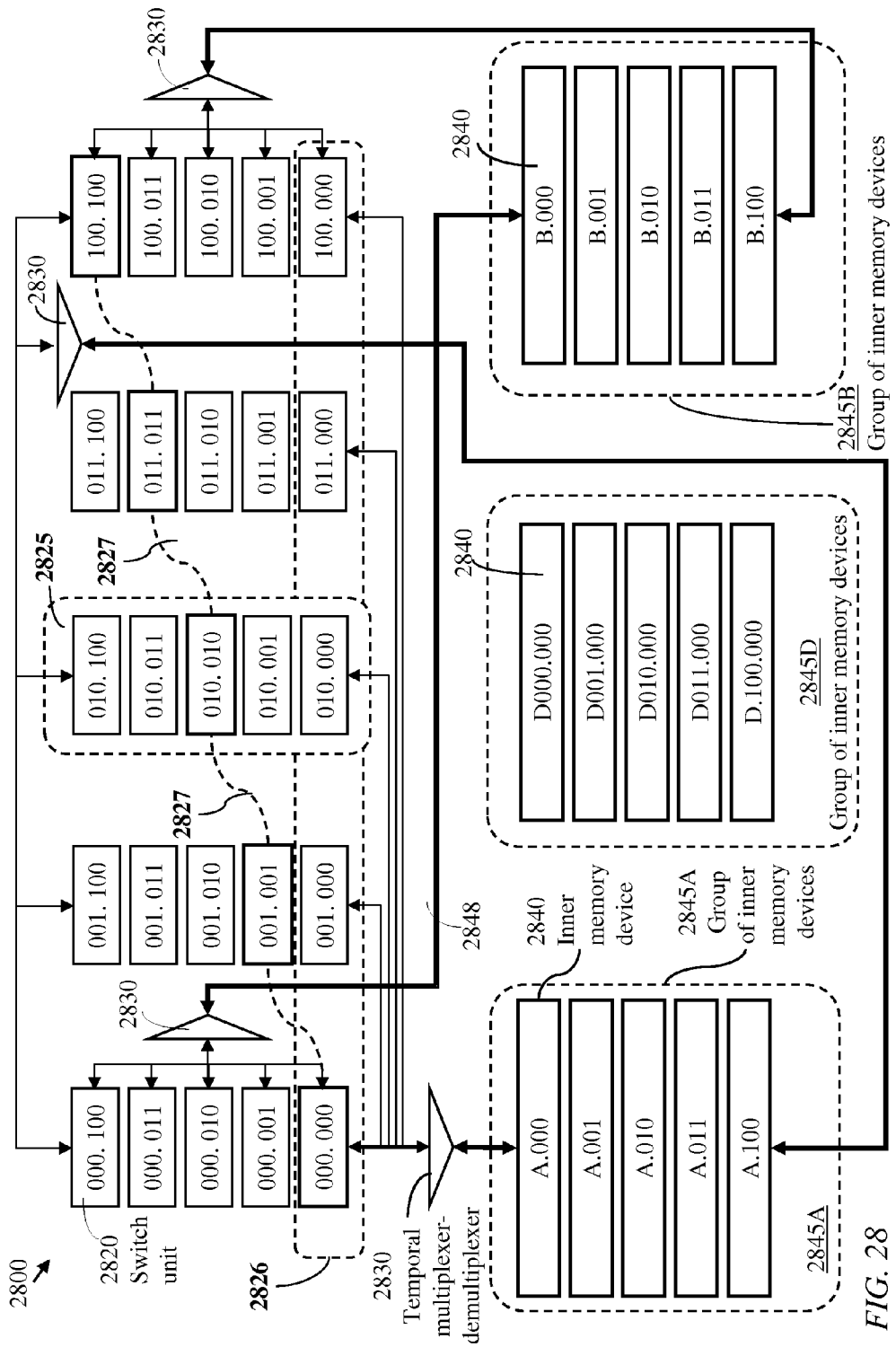
FIG. 28 illustrates a switch according to the present invention comprising three groups of inner memory devices, a plurality of switch units arranged according to three sets of combinations, and multiplexer-demultiplexer units each connecting a combination of switch units to a respective inner memory device where each combination in any of the three sets of combinations intersects each combination of the other two sets.

FIG. 28 illustrates a switch configuration 2800 similar to switch configuration 2700 of FIG. 27 but comprising three groups 2845 of inner memory devices 2840, individually identified as 2845A, 2845B, and 2845D, a plurality of switch units 2820 arranged according to three sets of combinations, 2825, 2826, and 2827, and temporal multiplexer-demultiplexer units 2830. Each temporal multiplexer-demultiplexer cyclically connect a combination of switch units to one of the inner memory devices 2840 in a group 2845. Each combination 2825, 2826, or 2827 comprises five switch units 2820 which connect to a respective inner memory device 2840 in one of the three groups 2845. All the switch units 2820 of switch 2800 are fully interconnected through groups 2845A and 2845B of inner-memory devices. A connection from an originating switch unit 2820-x to a destination switch unit 2820-y is contention-free if the two switch units 2820-x and 2820-y belong to the same combination. If the two switch units 2820-x and 2820-y belong to different combinations, the connection traverses an intermediate switch unit 2820-w. The additional combination set 2827 and the additional group 2845D of inner memory devices may be provided to increase the proportion of connections which may be established without traversing intermediate switch units.

As in configuration 2700 of FIG. 27, each switch unit 2820 is fully identified by a position number in each of the two combinations 2825, 2826 to which it belongs and is labeled as a concatenation of the two position numbers. As described above, the additional combination set is optional and is not required for identifying a switch unit 2820. The position numbers used in FIG. 28 are expressed as binary numbers. The five combinations 2825 are indexed as 000, 001, 010, 011, 100, and the five combinations 2726 are similarly indexed as 000, 001, 010, 011, 100. A switch unit 2820 is identified according to the indices of combination 2825 and 2826 to which the switch unit belongs. Switch units 2820 belonging to a combination 2826 of index 010, for example, connect to an inner memory device 2845A of index A.010, where "A" denotes all the five indices of combinations 2825. Likewise, switch units 2820 belonging to a combination 2825 of index 010, for example, connect to an inner memory device 2845B of index 010.B, where "B" denotes all the five indices of combinations 2826.

A "diagonal" combination of switch units is defined herein as a collection of switch units 2820 of indices determined as a dot product of a vector "A" of consecutive indices of combinations 2825 and a base vector {000, 001, 010, 011, 100}. For example, consecutive indices {010, 011, 100, 000, 001}, yield a diagonal combination {010.000, 011.001, 100.010, 000.11, 001.100}. A diagonal combination connects to an inner memory device identified as D.A.000. As illustrated in FIG. 28, the third group 2845D includes four inner memory devices 2840 identified as D.000.000 to D.100.000. A diagonal combination may also be defines as a collection of switch units 2820 of indices determined as a dot product of a vector "B" of consecutive indices of combinations 2826 and base vector {000, 001, 010, 011, 100}. In general, a diagonal combination includes one switch unit 2820 from each combination of the first-group of combinations where the switch units of the diagonal combination belong to different combinations of the second group of combinations.

Each temporal multiplexer-demultiplexer unit 2830 cyclically connects a combination of switch units 2820 to a respective inner memory device 2840 where each combination in any of the three sets of combinations 2825, 2826, 2827 intersects each combination of the other two sets. Creating the third set of combinations reduces the mean number of switch units 2820 traversed per connection.

Figure 29:
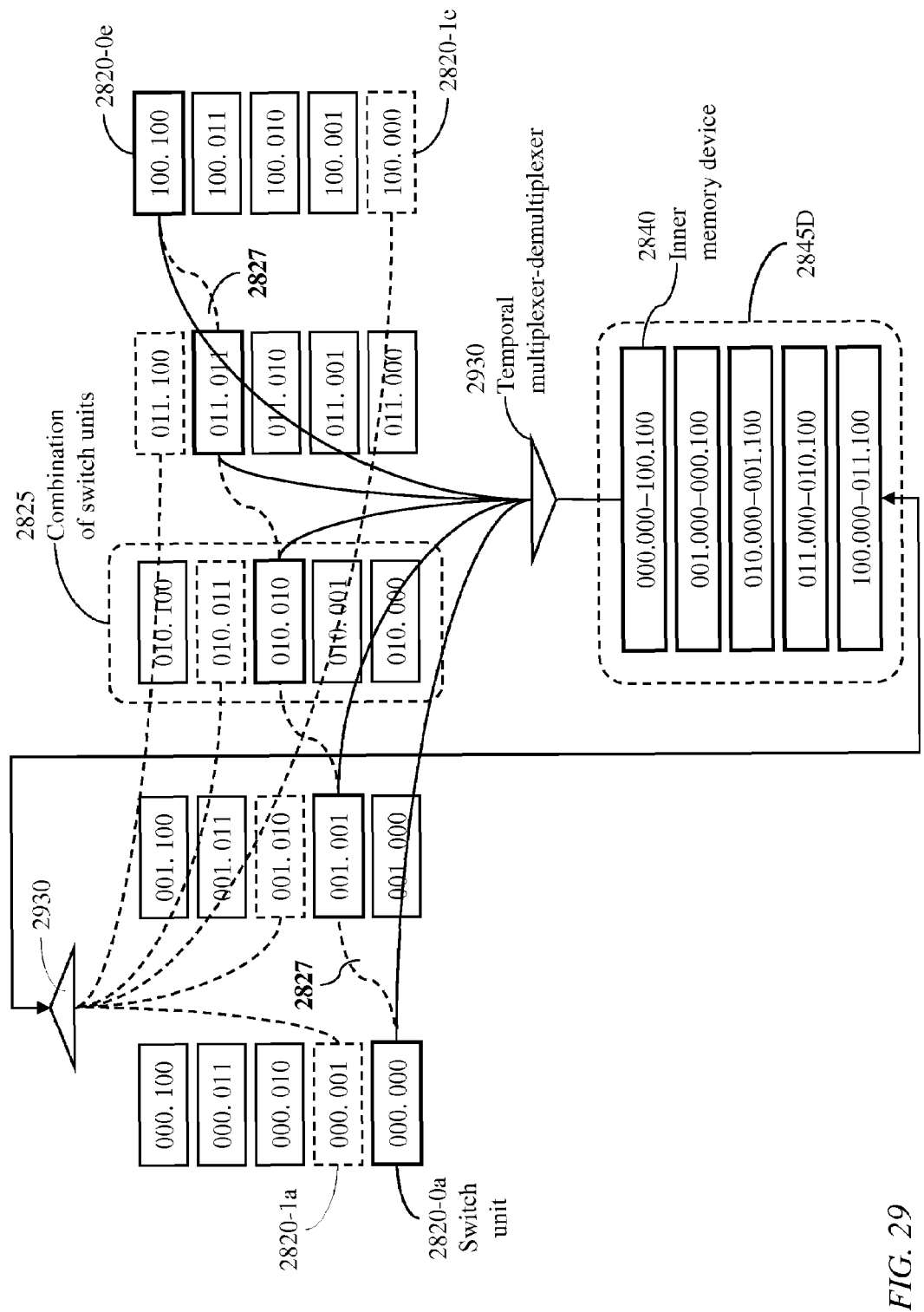
FIG. 29 illustrates the connectivity of diagonal combinations of switch units to an inner-memory group in the switch of FIG. 28.

FIG. 29 illustrates the additional connectivity in switch 2800 of FIG. 28, over the connectivity of switch 2700 FIG. 27. In switch 2800, each added combination comprises a diagonal combination of switch units 2820. A first diagonal combination comprises switch units 2820 of indices {000.000, 001.001, 010.010, 011.011, 100.00} which connect to a respective inner memory device 2840 in group 2845D through temporal multiplexer 2930-0. A second diagonal combination comprises switch units {000.001, 001.010, 010.011, 011.100, 100.000} which connect to a respective inner memory device 2840 in group 2845D through temporal multiplexer 2930-1.

An inner memory device 2740 or 2840 may be a conventional shared memory device or, preferably, a rotating-access shared memory device as described with reference to FIG. 4.

Figure 30:
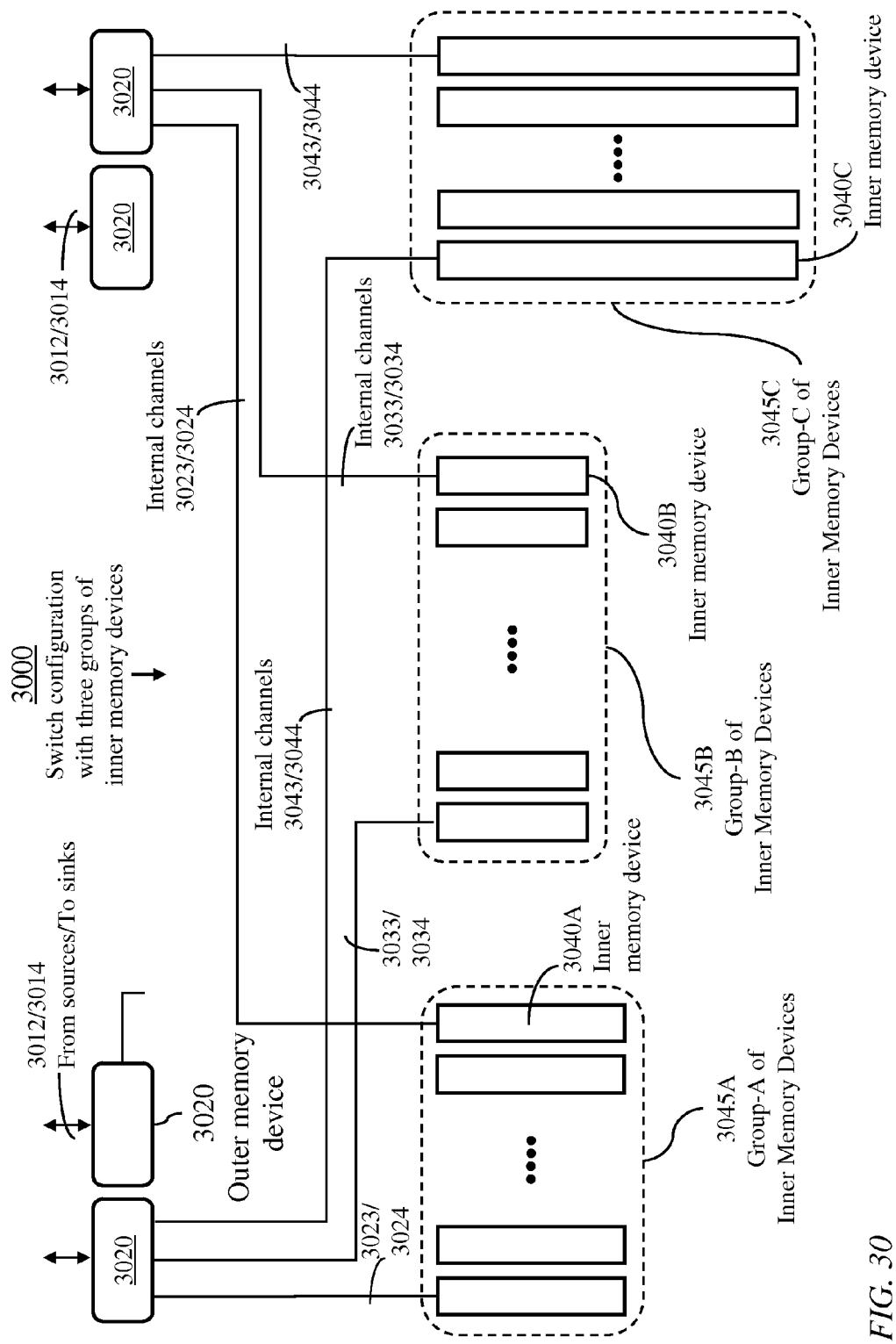
FIG. 30 illustrates a switch according to the present invention comprising a plurality of switch units arranged into three sets of combinations with each connecting to an inner memory device.

FIG. 30 illustrates a switch 3000 comprising switch units 3020 and inner memory devices 3040 arranged in three groups 3045A, 3045B, and 3045C. An inner memory device 3040 may be configured as a rotating-access shared memory device. The switch units 3020 are arranged into three sets of combinations (not illustrated), herein referenced as a first, second, and third set. Switch units of each combination connect to a respective inner memory device 3040 in a respective group 3045A, 3045B, or 3045C. Switch units 3020 of a combination of the first set connect to an inner memory device 3040 of group 3045A. Switch units 3020 of a combination of the second set connect to an inner memory device 3040 of group 3045B. Switch units 3020 of a combination of the third set connect to an inner memory device 3040 of group 3045C.

The structure of switch 3000 is distinctly different from the structure of switch 2800. In switch 2800, each combination in any of the three groups of combinations intersects each combination of the other two groups. In switch 3000 each combination in any of the three groups of combinations intersects only one combination of the other two groups. Switch 3000 may comprise a significantly higher number of switch units. It is noted, however, that switch 2800 provides shorter paths, in terms of the number of memory devices traversed, in comparison with switch 3000.

Figure 31:
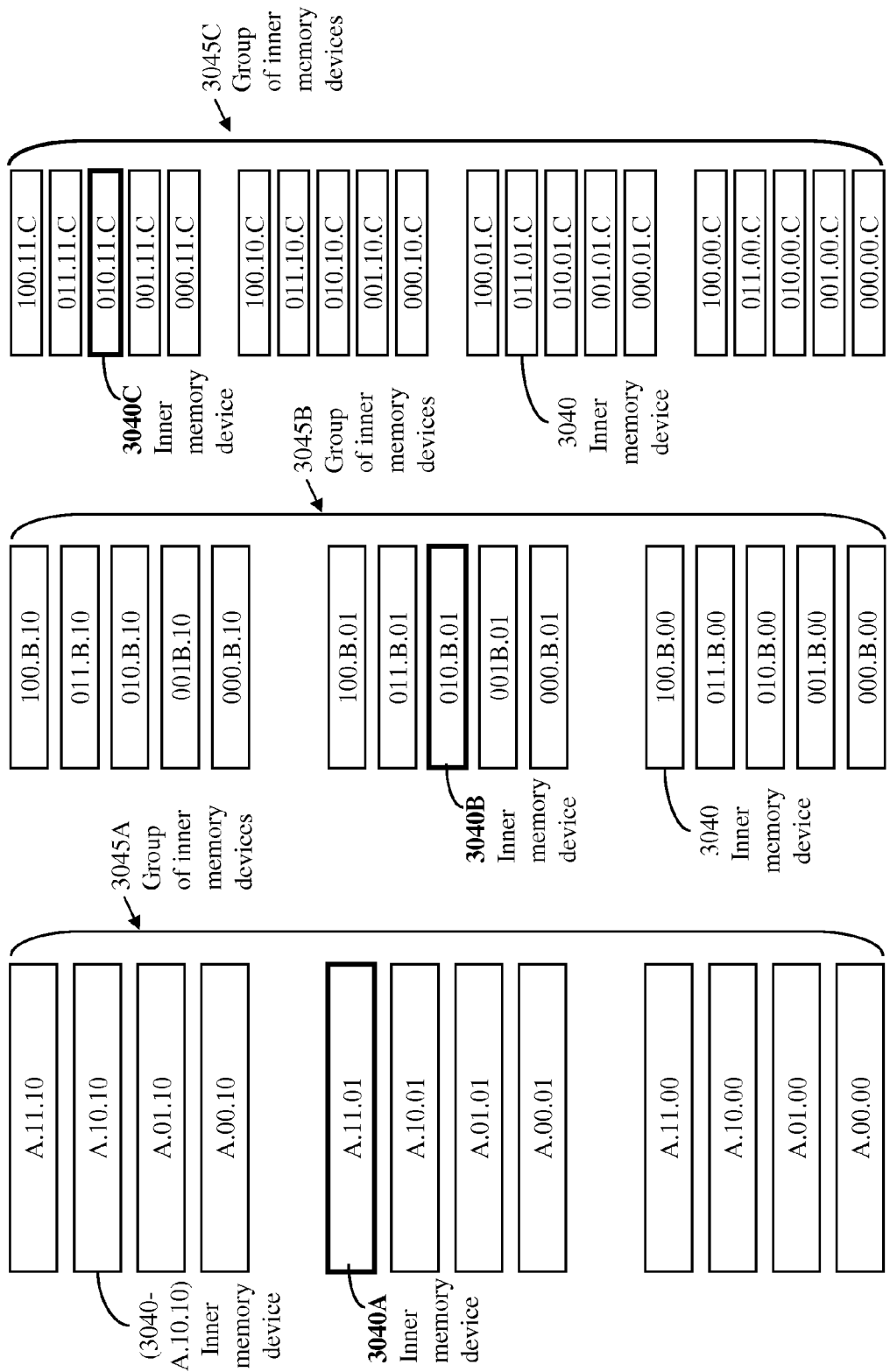
FIG. 31 illustrates an arrangement of the inner-memory devices into three inner-memory groups in the switch of FIG. 30.

FIG. 31 illustrates an exemplary arrangement of switch units 3020 in a switch configuration where each combination of the first set includes five switch units 3020, each combination of the second set includes three switch units 300 and each combination of the third set includes four switch units 3020. The total number of switch units 3020 in the exemplary arrangement is then 60.

Each switch module 3020 belongs to three combinations of different sets and is identified by a position number in each of the three combinations and is labeled as a concatenation of the three position numbers. The position numbers used in FIG. 31 and subsequent figures are expressed as binary numbers. Thus, each inner memory is identified as a tuple indicating its logical position in the arrangement.

The first group of inner memory devices 3040 comprises 12 inner memory devices each connecting to five switch units 3020 and identified as A.b.c, where b is an index of a second-set combination (00, 01, 10, or 11), and c is an index of a third-set combination (00, 01, or 10). The index A represent an index of a first-set combination and takes values of 000, 001, 010, 011, or 100.

The second group of inner memory devices 3040 comprises 15 inner memory devices each connecting to four switch units 3020 and identified as a.B.c, where a is an index of a first-set combination (000, 001, 010, 011, or 100), and c is an index of a third-set combination (00, 01, or 10). The index B is an index of a second-set combination and takes values of 000, 001, 010, 011, or 100.

The third group of inner memory devices comprises 20 inner memory devices 3020 each connecting to three switch units 3020 and identified as A.b.c, where b is an index of a second-set combination (00, 01, 10, or 11), and c is an index of a third-set combination (00, 01, or 10). The index A represent an index of a first-set combination and takes values of 000, 001, 010, 011, or 100.

Figure 32:
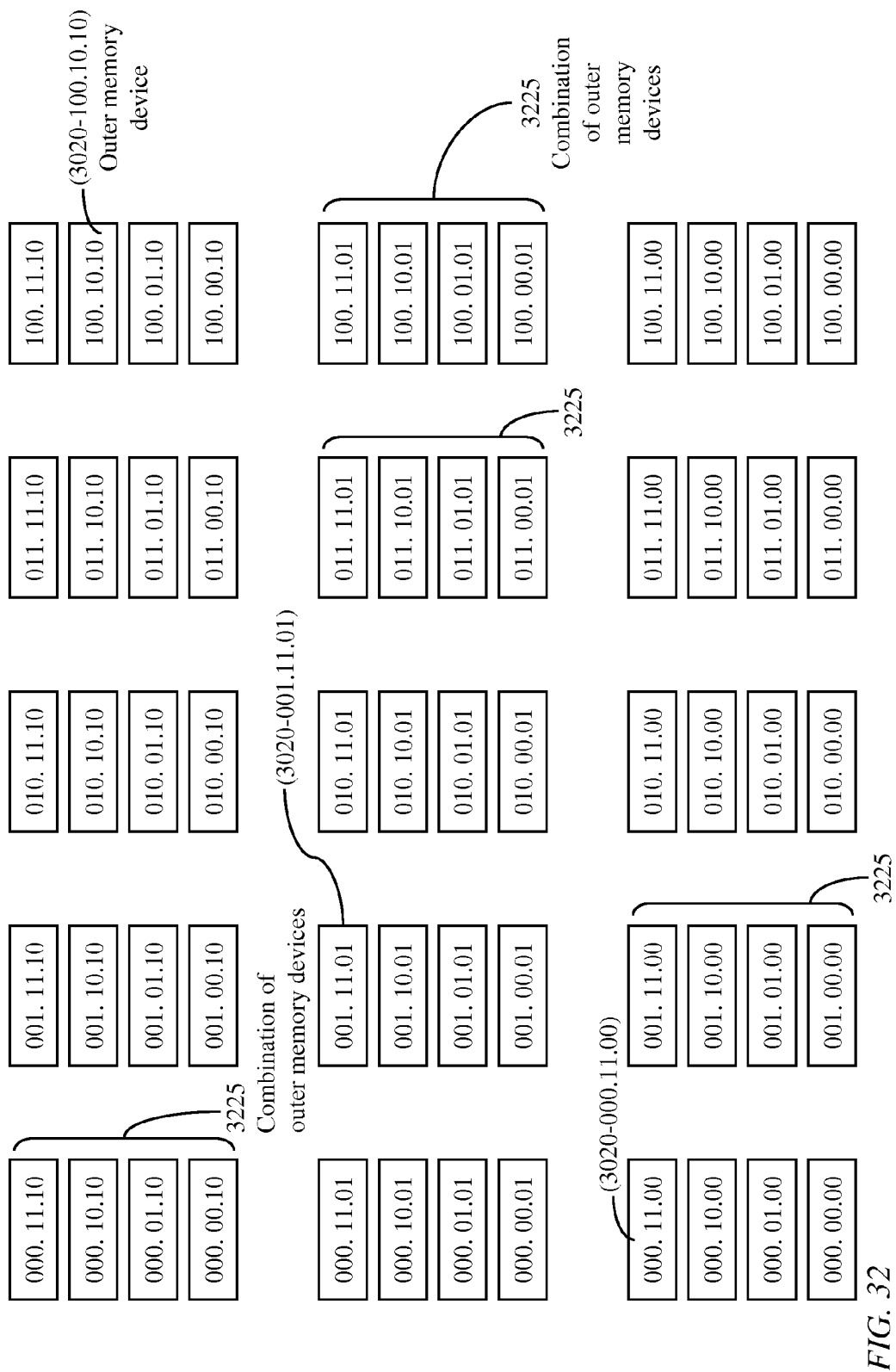
FIG. 32 illustrates combinations of the switch units in the switch of FIG. 30 indicating the association of each switch unit with three inner memory devices.

FIG. 32 illustrates a labeling scheme of the switch units 3020 that reflects the connectivity of each switch unit to three of the inner memory devices. Each label comprises three fields; a first field indicates an index of the switch unit in a first-set combination, the second field indicates an index of the switch unit in a second-set combination, and a third field indicates an index of the switch unit in a third-set combination. For example, a switch unit 3020 labeled 010.11.01 connects to inner memory devices 3040 labeled A.11.01, 010.B.01, and 010.11.C, which are identified as 3040A, 3040B, and 3040C in FIG. 31.

Figure 33:
FIG. 33 illustrates an intersection of three combinations of outer memory devices in the switch of FIG. 30 having the inner and outer memory arrangements of FIGS. 31 and 32.

FIG. 33 illustrates three combinations of switch units 3020 having a switch unit 011.01.01. As illustrated in FIG. 32, the switch units 3020 are arranged into combinations each of five switch units 3020 (such as switch units 3020 of indices 000.00.00 to 100.00.00 and 000.11.10 to 100.11.10), combinations each of four switch units 3020 (such as switch units 3020 of indices 000.00.00 to 000.11.00 to 000.11.00 and 000.00.10 to 000.11.10), and combinations each of three outer memory devices (such as 000.00.00, 000.00.01, 000.00.10 and 000.11.00, 000.11.01, 000.11.10). All indices are in binary-number representation. Combinations of size five are considered to belong to a first group of combinations, combinations of size four are considered to belong to a second group of combinations, and combinations of size three are considered to belong to a third group of combinations.

Figure 34:
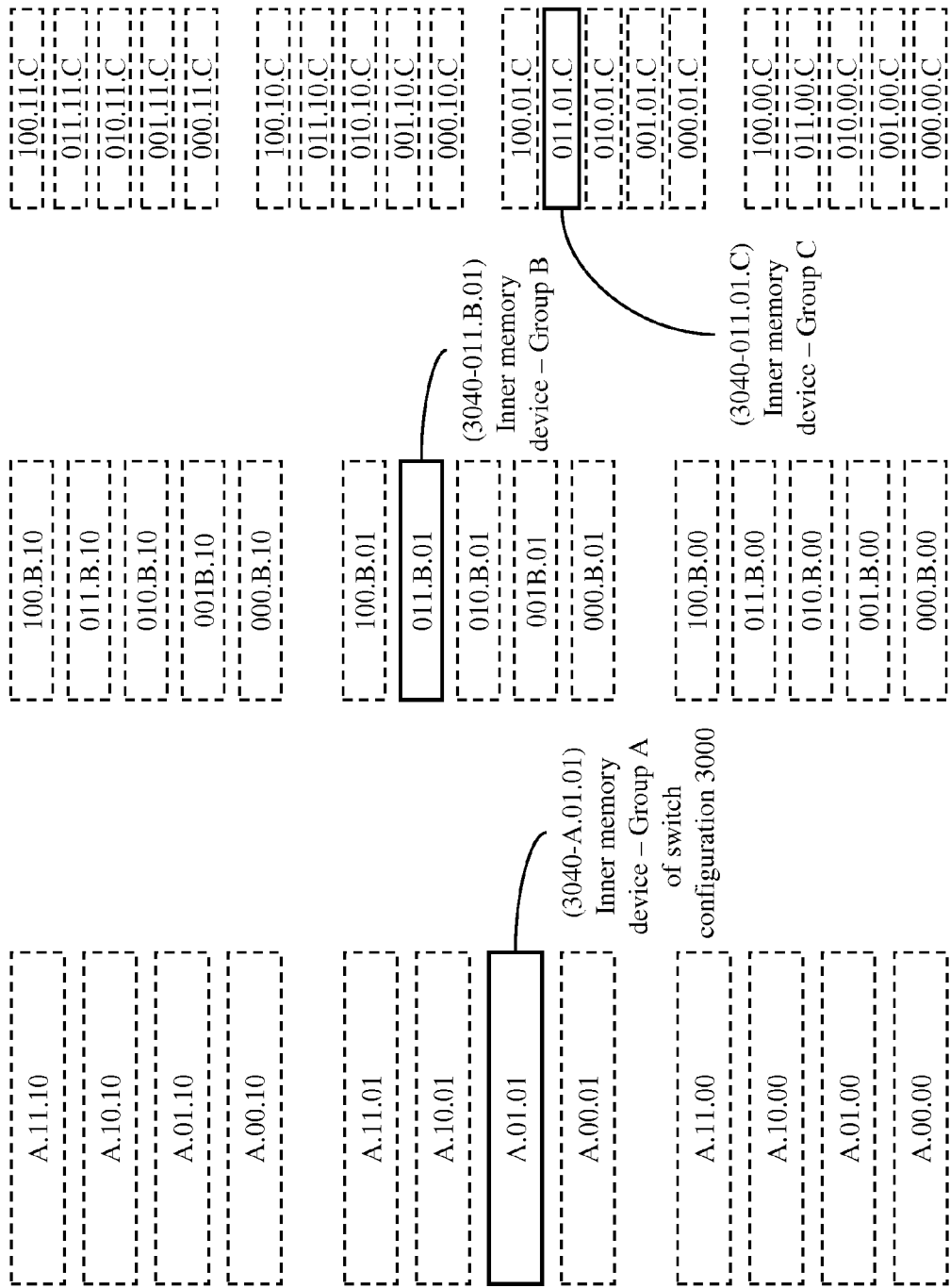
FIG. 34 illustrates the inner memory devices corresponding to the three combinations of FIG. 33.

FIG. 34 illustrates the inner memory devices corresponding to the three combinations of FIG. 33. Inner memory device A.01.01 connects to switch units 000.01.01, 001.0.01, 010.0.01, 011.01.01, and 100.01.01. Inner memory device 011.B.01 connects to switch units 011.00.01, 011.01.01, 011.10.01, and 011.11.01. Inner memory device 011.01.C connects to switch units 011.01.00, 011.01.01, and 011.01.10.

Figure 35:
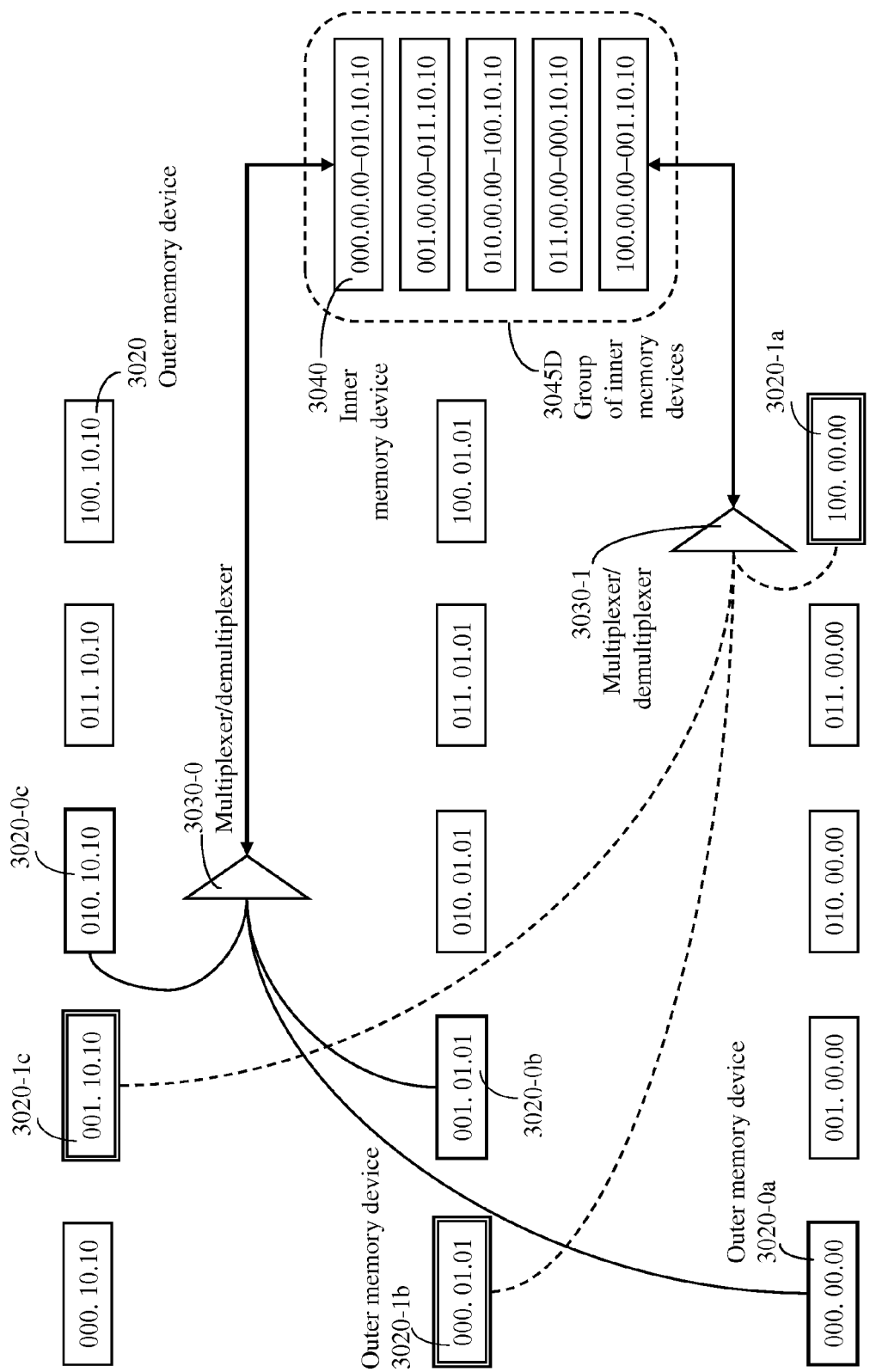
FIG. 35 illustrates the connectivity of a fourth group of diagonal combinations in the switch of FIG. 30 to an added group of inner memory devices according to an embodiment of the present invention.

To shorten the mean path length (the mean number of switch units 3020 traversed within switch 3000, a fourth group 3045D of inner memory devices 3040 may be formed, and a fourth set of combinations of switch units 3020 would be formed. FIG. 35 illustrates the connectivity of the fourth set of diagonal combinations 3045D in the switch of FIG. 30 to the added group of inner memory devices. Each added combination comprises a diagonal combination of switch units 3020. A diagonal combination includes one switch unit 3020 from each combination of the first-group of combinations where the switch units of the diagonal combination belong to different combinations of the second group of combinations and belong to different combinations of the third group of combinations. As indicated, a first diagonal combination comprises switch units 3020-0$a$, 3020-0$b$, and 3020-0$c$ which connect through a temporal multiplexer-demultiplexer 3030-0 to a first inner memory device in group 3045D. A second diagonal combination comprises switch units 3020-1$a$, 3020-1$b$, and 3020-1$c$ connecting through temporal multiplexer-demultiplexer 3030-1 to another inner-memory device 3040 in group 3045D.

Data Format

Figure 36:
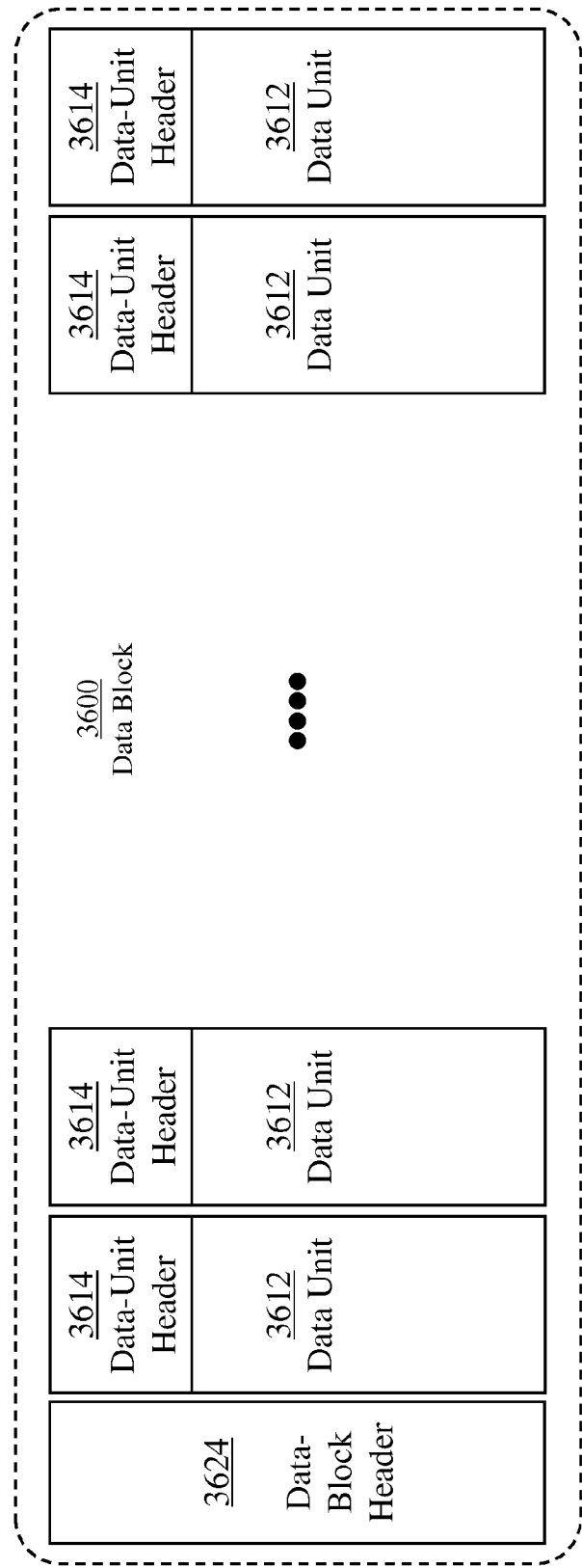
FIG. 36 illustrates a format of data formed at the outer switch units in the switches of FIGS. 27 and 30 according to an embodiment of the present invention.

FIG. 36 illustrates a format 3600 of data blocks formed at the switch units in the switches of FIGS. 28 and 30. A data-block header 3624 includes information regarding the length of the data block. The data block header is followed by data units each having a header 3614 and a payload 3612.

Control System

Figure 37:
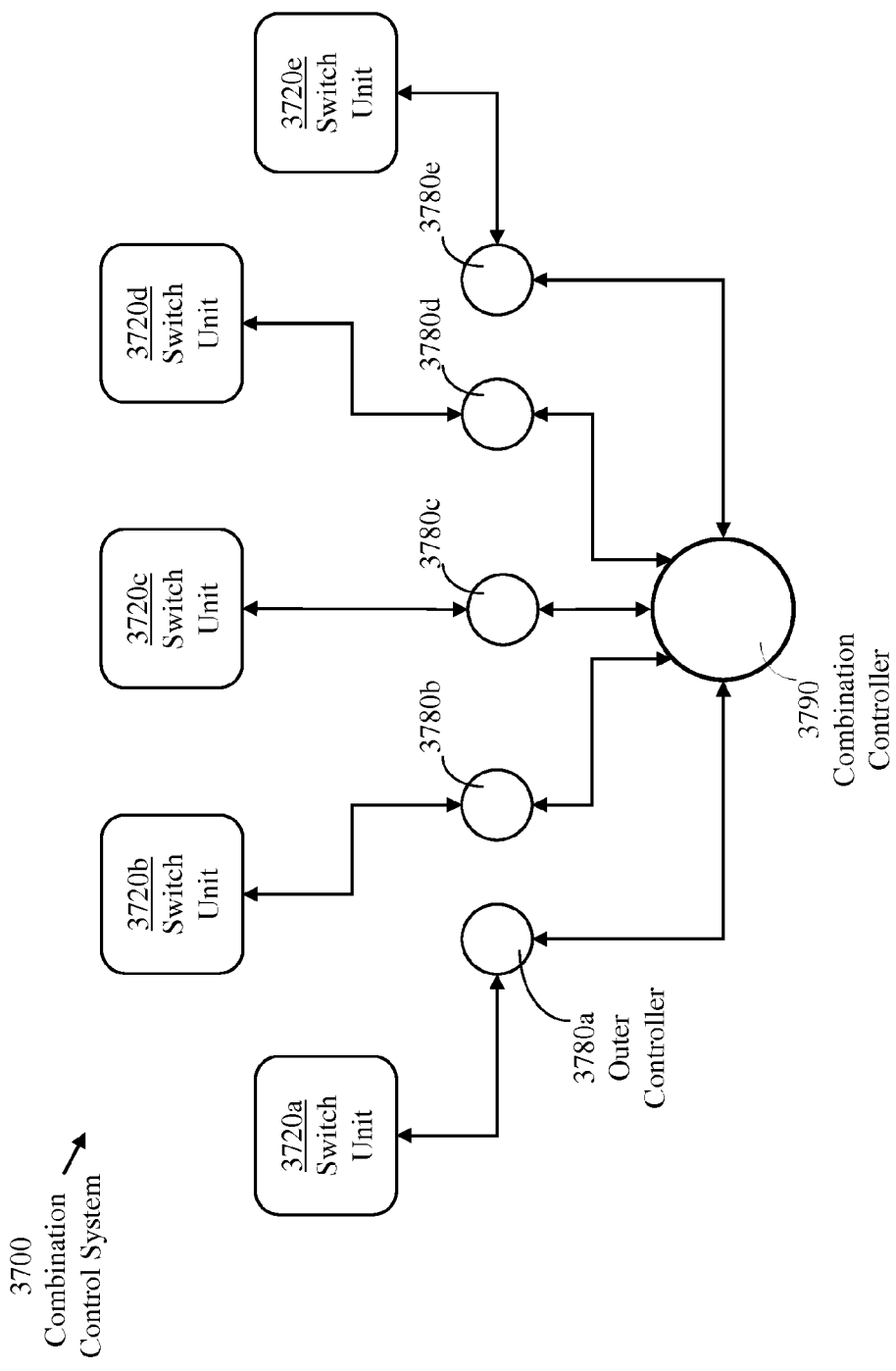
FIG. 37 illustrates a combination control system associated with each combination of outer memory devices in the switches of FIGS. 27 and 30, the control system including a combination controller coupled to outer controllers, each outer controller associated with an outer memory device according to an embodiment of the present invention.

FIG. 37 illustrates an exemplary combination of switch units in any of switches 2700, 2800, 3000, having five switch units 3720, individually identified as 3720$a$, 3720$b$, 3720$c$, 3720$d$, and 3720$e$. A switch-unit controller 3780 is associated with each switch unit 3720. Switch-unit controllers 3780$a$, 3780$b$, 3780$c$, 3780$d$, and 3780$e$, associated with switch units 3720$a$, 3720$b$, 3720$c$, 3720$d$, and 3720$e$ respectively, are coupled to a combination controller 3790. The connectivity of a switch-unit controller to a switch unit 3720 is further illustrated in FIG. 41.

Figure 38:
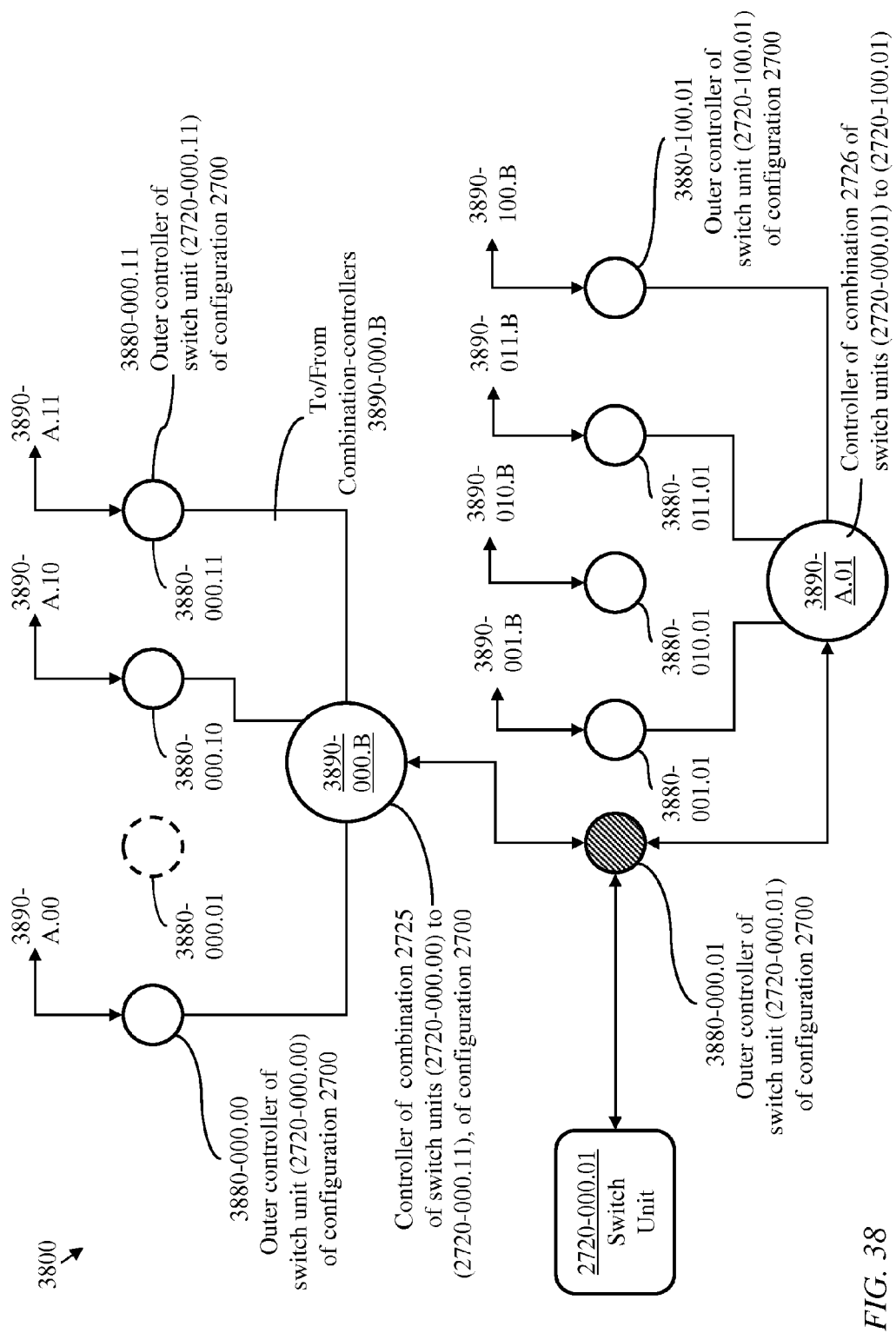
FIG. 38 illustrates a control system of the switch of FIG. 27 according to an embodiment of the present invention.

FIG. 38 illustrates switch-unit controllers 3880 and combination controllers associated with two combinations in switch 2700 of FIG. 27. One of the combinations has controllers 3880 associated with switch units 2720 indexed as 000.01, 001.01, 010.01, 011.01, and 100.01, which connect to inner memory device 2740 indexed as A.01 through a temporal multiplexer-demultiplexer 2730A. The other combination has controllers 3880 associated with switch units 2720 labeled 000.00, 000.01, 000.10, and 000.11, which connect to inner memory device 2740 indexed as 000.B through a temporal multiplexer-demultiplexer 2730B. The two combinations have a common switch unit 2720 indexed as 000.01.

Figure 39:
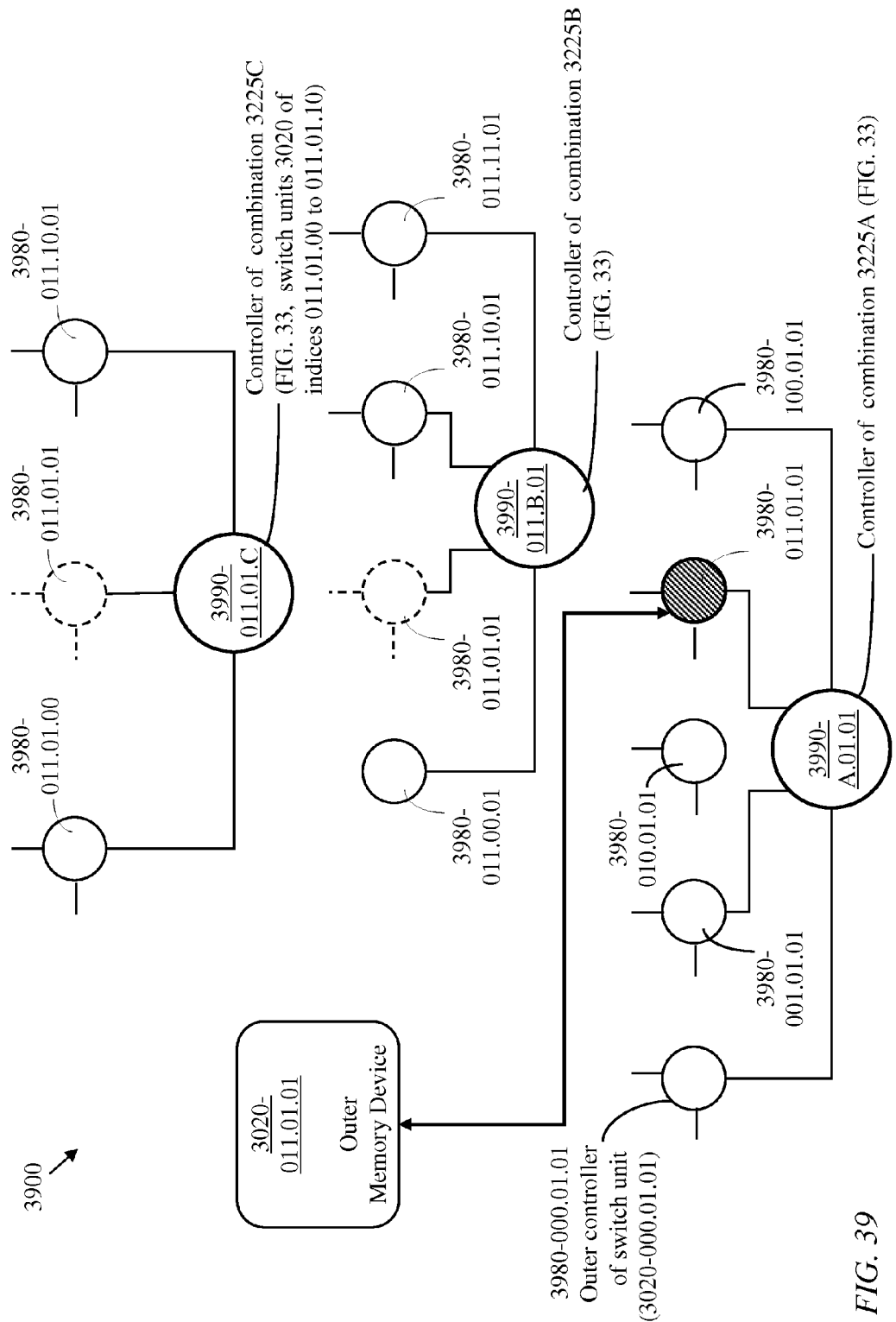
FIG. 39 illustrates a control system of the switch of FIG. 28 or the switch of FIG. 30 according to an embodiment of the present invention.

FIG. 39 illustrates switch-unit controllers 3980 and combination controllers 3990 associated with three combinations in switch 3000 of FIG. 30. The first combination includes switch-unit controllers 3980 associated with switch units 3020 indexed as 000.01.01, 001.01.01, 010.01.01, 011.01.01, and 100.01.01. The second combination includes switch-unit controllers 3980 associated with switch units 3020 indexed as 011.00.01, 011.01.01, 011.10.01, and 011.11.01. The third combination includes switch-unit controllers 3980 associated with switch units 3020 indexed as 11.01.00, 011.01.01, and 011.01.10. The three combinations have a common switch unit of index 011.01.01.

Control Message

Figure 40:
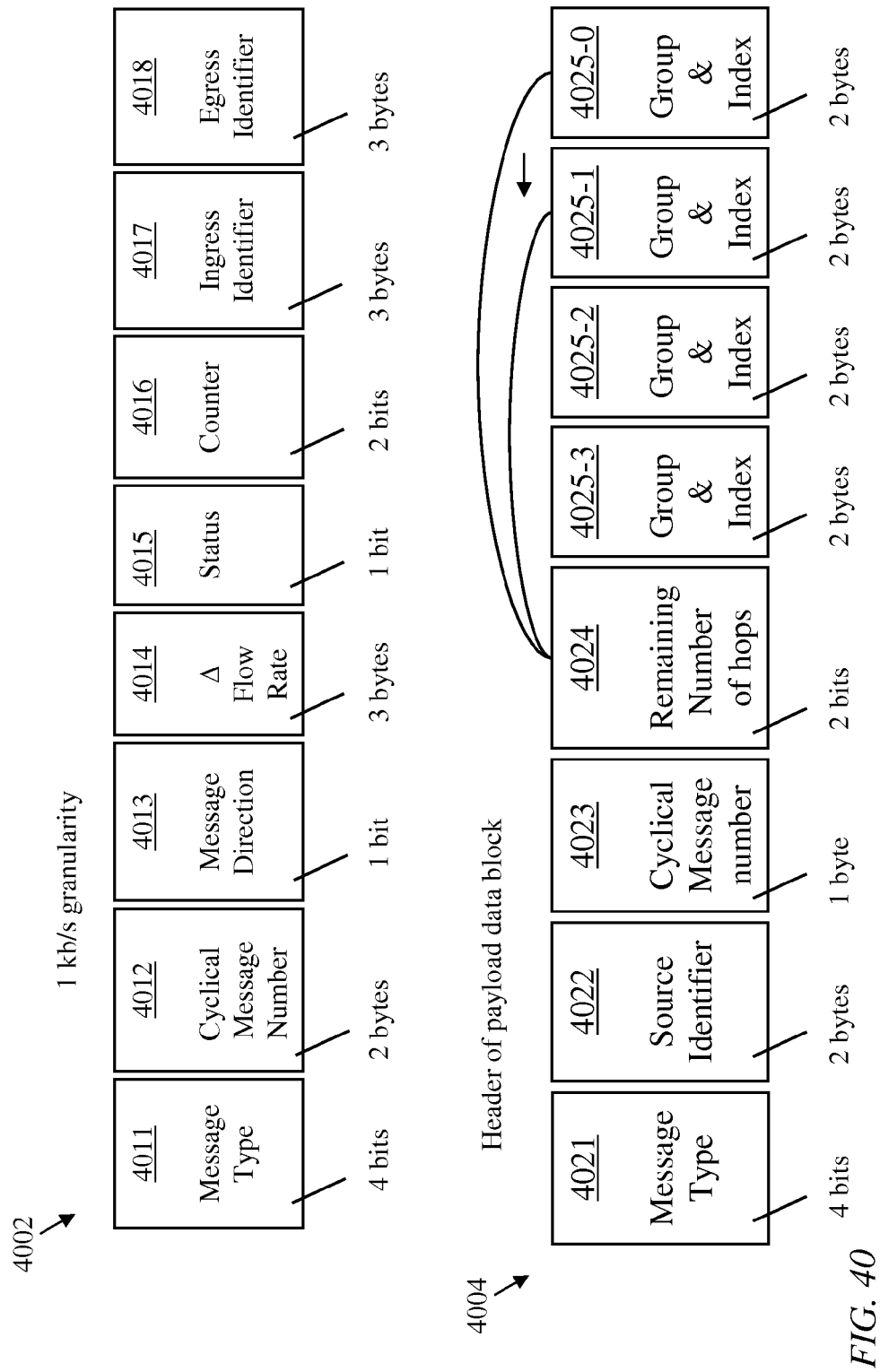
FIG. 40 illustrates the format of a capacity-allocation control signal in the control system of FIGS. 38 and 39 and the format of a forwarding signal in the switches of FIGS. 27, 28 and 30 according to an embodiment of the present invention.

Allocating a path and forwarding a data block within a switch 2700, 2800, or 3000 require exchanging control messages between the switch-unit controllers and the combination controllers of the control system described with reference to FIGS. 38 and 39. FIG. 40 illustrates two message types 4002 and 4004. Message 4002 may be used for setting a path from a source switch unit 3720, 3820, 3020 to a destination switch unit in a switch 2700, 2800, or 3000 illustrated in FIGS. 27, 28, and 30. Message 4004 may be used for forwarding data blocks within any of the switches of FIGS. 27, 28, or 30.

A message 4002 includes: a field 4011 containing an indication of the message type; a field 4012 containing a cyclical message number; a field 4013 containing an indication of message direction, i.e., a request message from a source switch unit versus a response message directed towards the source switch unit; field 4014 contains an indication of a required flow-rate allocation for an internal path; field 4015 contains an indication of the success, or otherwise, of path reservation process; field 4016 contains a counter of the number of switch-unit controllers traversed; field 4017 contains an identifier of the source switch unit; and field 4018 contains an identifier of the egress port (hence the destination switch unit).

A message 4004 includes: a field 4021 containing a message identifier; a field 4022 containing an identifier of the ingress port; a field 4023 containing a cyclical message number; a field 4024 containing an indication of the remaining number of hops, i.e., the remaining number of switch units to be traversed by a data block; and fields 4025-0, 4025-1, . . . , 4025-(k−1), where k is the total number of hops. Each field 4025 contains identifiers of a switch unit, the identifiers being a combination-group number and an index (position) assigned to a switch unit within a combination.

Path Selection

When a switch-unit controller receives a request to set-up a path, the switch-unit controller selects a combination set from which to start the search for a path having sufficient vacancy to accommodate the requested flow-rate allocation. The cyclical message number of field 4012 may be used to determine whether a connection request relates to establishing a new connection or to changing the allocated flow rate of an existing connection. Referring to FIG. 30 for example, where each switch unit 3020 belongs to three combinations of different sets, if the path search is for a new connection, the search may start from any of the three combinations. A path may traverse one, two, or three inner-memory devices 3040 depending on the relative positions of the source and destination switch units. For a path traversing three inner-memory devices, one from each group 3045A, 3045B, and 3045C, the order of group-selection is arbitrary; for example ABC or ACB. However, to simplify 'book keeping' without sacrificing efficiency, the path preferably follows one circular direction; for example ABC, BCA, or CAB. This way, a switch unit 3020 connecting to an inner-memory device 3040 of group 3045A either completes a path or forwards a message to a switch unit 3020 connecting to an inner-memory device 3040 of group 3045B and, likewise, a switch unit 3020 connecting to an inner-memory device 3040 of group 3045B would forward a message to a switch module 3020 connecting to an inner-memory device 3040 of group 3045C and a switch unit 3020 connecting to an inner-memory device 3040 of group 3045C would forward a message to a switch module 3020 connecting to an inner-memory device 3040 of group 3045A.

Switch-Unit Structure

Figure 41:
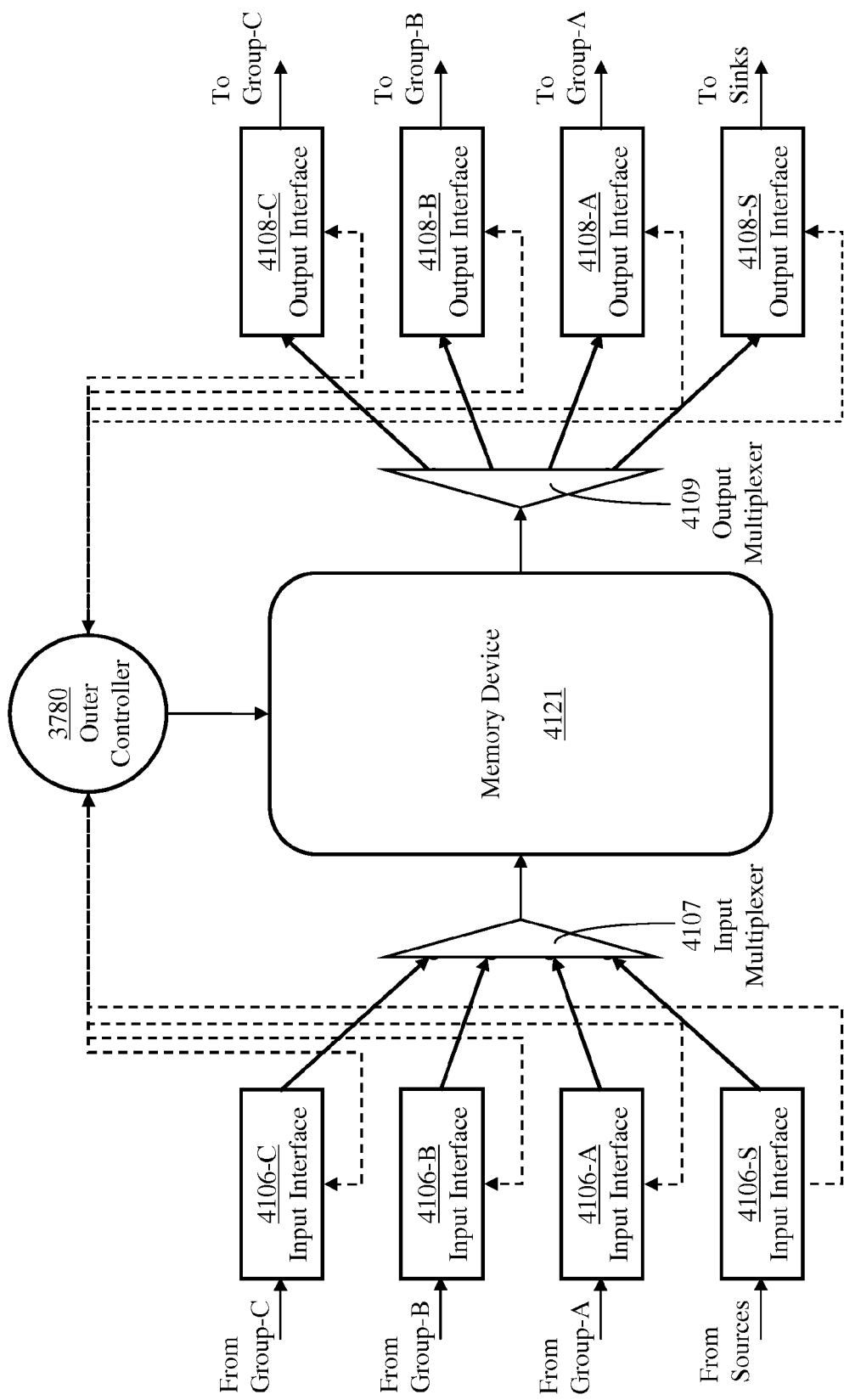
FIG. 41 illustrates an outer switch module in the switch of FIG. 28 or the switch of FIG. 30 comprising an outer memory device, an outer controller, input interfaces, and output interfaces.

Switch units 2820, and 3020 have similar structures, each connecting to three inner memory devices (2840 or 3040). Switch unit 2720 connects to two inner memory devices 2740. FIG. 41 illustrates a switch unit 3020 in switch 3000 of FIG. 30. The switch unit 3020 comprises a memory device 4121, an outer controller 4180, input interfaces 4106-A, 4106-B, 4106-C, and 4106-S and output interfaces 4108-A, 4108-B, 4108-C, and 4108-S. Input-interface 4106-S receives data from local data sources or from an external node and output interface 4108-S transmits data to local data sinks or to an external node. Input interfaces 4106-A, 4106-B, and 4106-C receive data read from inner-memory devices 3040 belonging to groups 3045A, 3045B, and 3045C, respectively. Likewise, output interfaces 4108-A, 4108-B, and 4108-C transmit data to be written in inner-memory devices 3040 of groups 3045A, 3045B, and 3045C, respectively. An inner memory device 3040 may be a conventional shared wide memory (FIGS. 1 and 2), a contention-free rotating-access module (FIG. 5) or a contention-free circulating module (FIG. 8). A temporal multiplexer 4107 time multiplexes data received from the four interfaces for sequential writing in the memory device 4121. A temporal demultiplexer 4109 cyclically distributes data read from memory device 4121 to the four output interfaces.

Connection Routing

Figure 42:
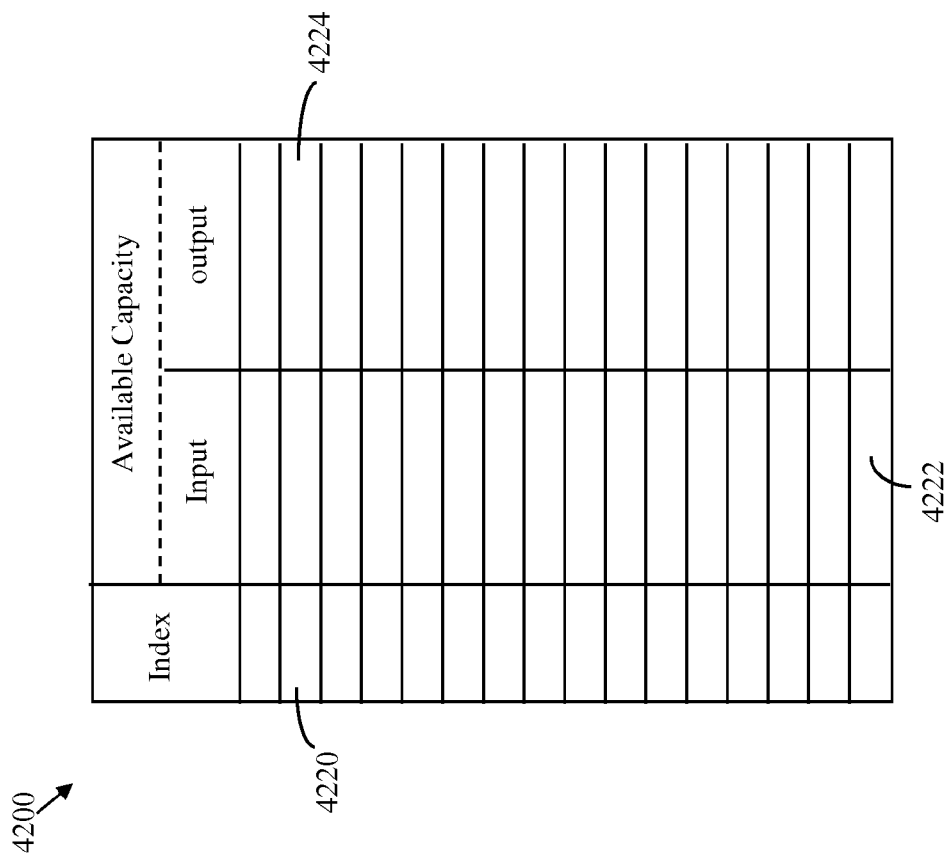
FIG. 42 illustrates a table used at a combination controller for capacity-allocation according to an embodiment of the present invention.

FIG. 42 illustrates a table 4200 which may be used by a combination controller 3890 to track the occupancy of inner dual channels of switch units 2720 of the combination. Table 4200 includes entries 4220 each of which indicating a unique index of a switch unit within the combination. An entry 4222 indicates a current vacancy (or occupancy) of an inner channel from a switch unit and an entry 4224 indicates a current vacancy (or occupancy) of an inner channel to the switch unit. The number of rows in table 4200 equals the number of switch units in a respective combination.

A path may traverse up to three inner memory devices and may be concisely represented as a sequence of identifiers of the inner memory devices 3040 it traverses. Several paths may be considered for a connection from a source switch unit to a destination switch unit. Consider a connection from a switch unit 3020 of indices 000.00.00 to a switch unit 3020 of indices 100.11.10, for example. Switch unit 3020/000.00.00 connects to inner memory devices 3040(A.00.00), 3040(000.B.00), and 3040(000.00.C). Using the above path representation, paths for the connection include:

{A.00.00/100.B.00/100.11.C}, {A.00.00/100.00.C/100.B.10},
{000.B.00/A.11.00/100.11.C}, {000.B.00/000.11.C/A.11.10},
{000.00.C/000.B.10/A.11.10}, and {000.00.C/A.00.10/100.B.10}.

Using the first path, {A.00.00/100.B.00/100.11.C}, switch unit 3020(000.00.00) transfers a data block to switch unit 3020(100.00.00). Switch unit 3020(100,00.00) disassembles the data block into its data units, forms a new data block comprising data units from different originating switch units 3020, and transfers the new data block to switch unit 3020 (100.11.00) through inner-memory device 3040(100.B.00). Switch unit 3020(100,11.00) disassembles the data block into its data units, forms another data block comprising data units from different originating switch units 3020, and transfers the formed data block to switch unit 3020(100.11.10) through inner-memory device 3040(100.11.C).

Reserving the above first path for a connection of a specific flow-rate requires only examining the vacancy (i.e., unreserved capacity) in a channel connecting inner-memory devices 3040(A.00.00) to switch unit 3020(100.00.00), a channel connecting inner-memory devices 3040(100.B.00) to switch unit 3020(100.11.00), and a channel connecting inner-memory devices 3040(100.11.C) to destination switch unit 3020(100.11.10),

Data-Block Formation

Figure 43:
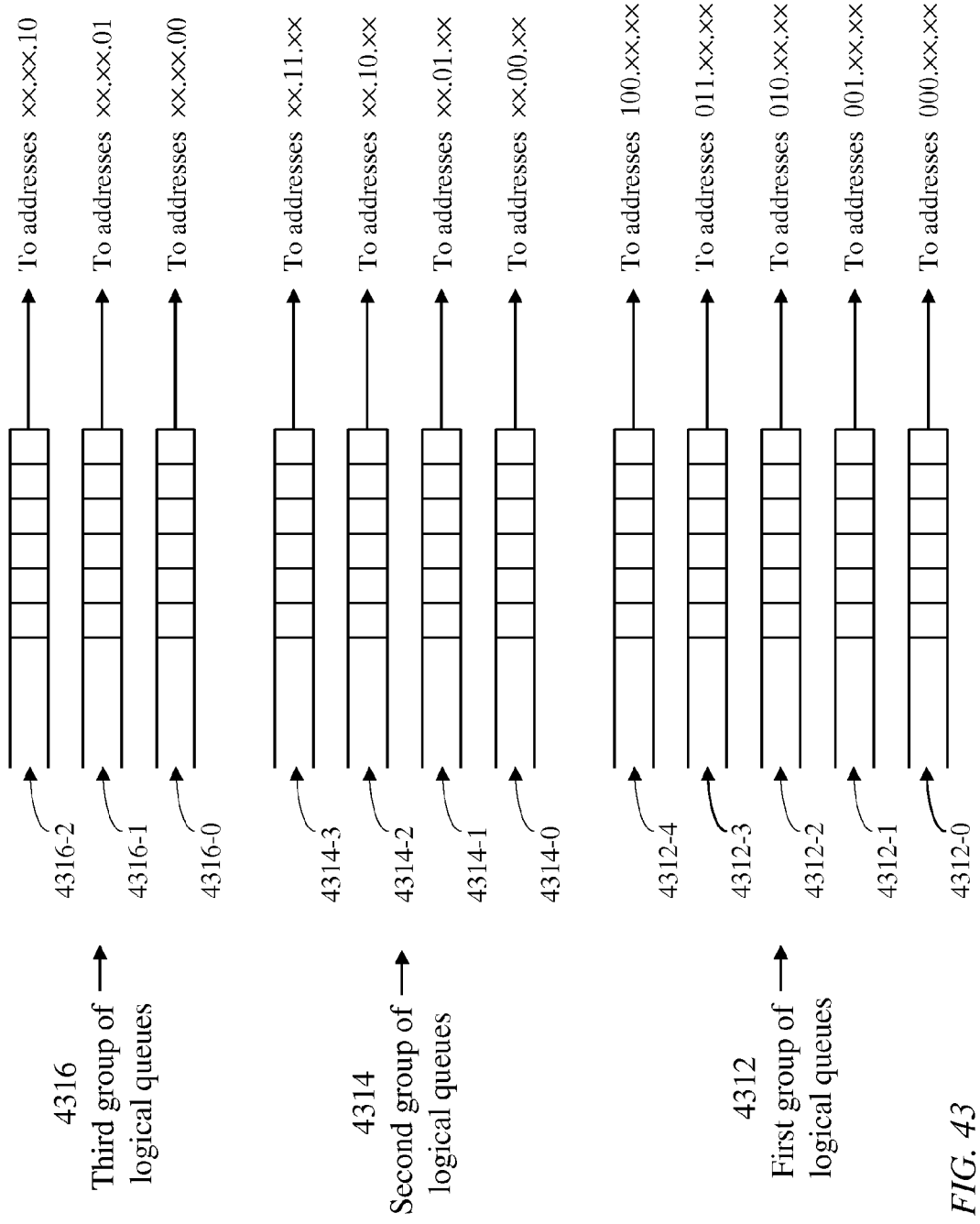
FIG. 43 illustrates logical organization of an outer memory device in the switch of FIG. 30 according to an embodiment of the present invention.

FIG. 43 illustrates logical organization of memory device 4121 (FIG. 41) of a switch unit 3020 of switch 3000 of FIG. 30. As described above, a switch unit 3020 is identified by three indices each indicating the position of the switch unit in a combination. The memory device 4121 is logically organized into a first group of five queues 4312-0, 4312-1, 4312-2, 4312-3, and 43124 each for holding data units destined to switch units 3020 of the same first index, a second group of four queues 4314-0, 4314-1, 4314-2, and 4314-3, each for holding data directed to switch units 3020 having indices of the same second index, and a third group of three queues 4316-0, 4316-1, and 4316-2 each for holding data units directed to switch units 3020 of the same third index. For example, queue 4312-2 holds data units directed to any of the 12 switch units 3020 of the third column in FIG. 32, each having a first index of 010.

A switch unit 3020 may receive data units from subtending data sources, or from an external node, as well as data blocks from other switch units 3020. A received data block may contain data units destined to different switch units 3020. The data block is then disassembled and its constituent data units may be placed in different queues 4312, 4314, and 4316. For each queue 4312, 4314, or 4316 holding Data units directed to other switch units and held in any of the queues 4312, 4314, or 4316 are assembled into data blocks for contention-free switching, through an inner memory device 3040, to a designated switch unit 3020.

Flow-rate Control and Path Routing

Two modes of operation may be used. In a first mode, each data packet received at ingress is routed independently. In a second mode, a data flow may be defined from each ingress port to each egress port of a switch 2700, 2800, or 3000. The ingress and egress ports may belong to switch units connecting to a same inner-memory device or to different inner-memory devices. Each data packet received at an ingress port is then associated with a flow. The data packet is then segmented into data units of equal size, with some data units null padded if required, to facilitate switching through the switch fabric. Each data flow is then allocated a flow rate which translates into a number of time slots in a time-slotted frame, with each time slot corresponding to the duration of a data unit. In the first mode, data units may be lost due to buffer overflow in any of the switch stages. In the second mode, data units may be delayed but not lost. Message 4002 of FIG. 40 is used to facilitate the flow-rate-allocation process implemented at each switch-unit controller in a switch 2700, 2800, or 3000 illustrated in FIGS. 27-30 and message 4004 is used for data forwarding.

Each packet received from an external data source is parsed to determine its size and destination. Each received packet is then associated with a flow defined by an ingress port and an egress port. Each ingress-egress pair is assigned at least one flow which may be allocated a flow-rate of zero. The received packet is segmented into data units which are placed in a corresponding queue as illustrated in FIG. 42. The switch-unit controller determines whether the flow warrants a change, positive or negative, in flow-rate allocation. The flow-rate change may be determined according to queue occupancy or according to an explicit request from a source.

To forward a data unit from a first switch unit 2720-$x$ to a second switch unit 2720-$y$, where the two switch units do not connect to a common inner-memory device 2740, switch unit 2720-$x$ selects either a combination 2725 or a combination 2726 to establish a contention-free path to an intermediate switch unit 2740-$m$ which share a common inner memory device with the second switch unit 2720-$y$. If a combination 2725 is selected, switch-unit 2720-$x$ forms a data block which may include a number of data units, and a message 4004 is included in a header of the data block. The formed data blocked may include a number of data units not exceeding the number of switch units connecting to the selected inner memory device 2725. The data blocked maybe disassembled at switch unit 2720-$m$ into its constituent data units and new data blocks comprising data units destined to the second switch unit 2720-$y$ may be formed and switched without contention to switch unit 2720-$y$.

The controller of each combination 2725 or 2726 of switch units tracks the vacancy (or occupancy) of the inner dual channels which connect each switch unit to respective inner memory devices 2740 in group 2745A and group 2745B. As described earlier, the switch units may be interconnected through an exclusive-access shared wide-memory device (FIGS. 1-2), an interleaved-access bank of transit memory devices (FIGS. 4-7), or through a passive dual rotator in an interleaved-access circulating switch module (FIGS. 8-9).

Alternative Lattice Structures of Contention-Free Switch Modules

Figure 44:
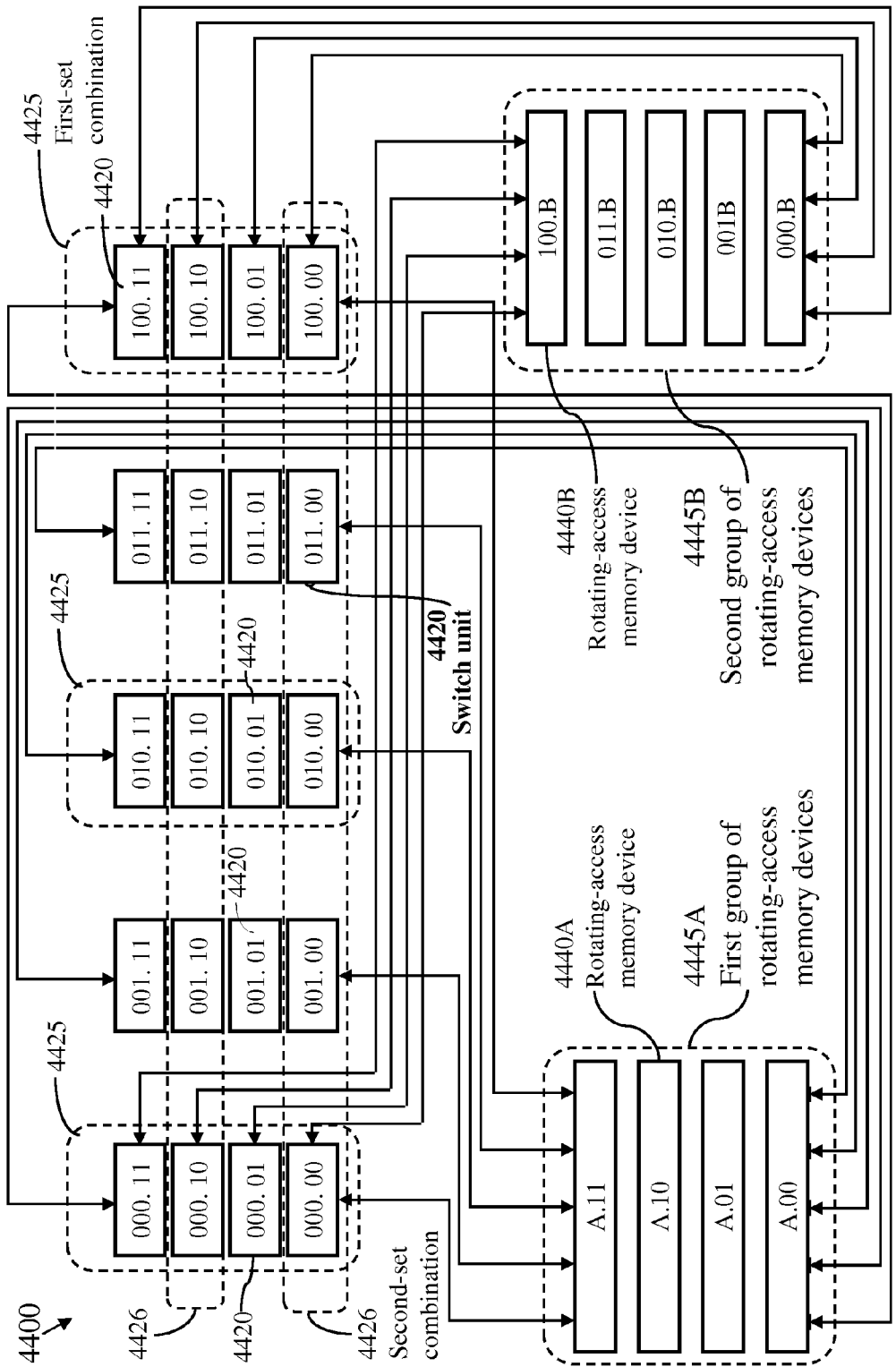
FIG. 44 illustrates a switch according to the present invention comprising a plurality of switch units and two groups of rotating-access memory devices connecting to combinations of switch units.

FIG. 44 illustrates an exemplary switch 4400 according to the present invention comprising a plurality of switch units 4420, a first group 4445A of rotating-access memory devices 4440A each connecting to a combination of switch units 4420, and a second group 4445B of rotating-access memory devices 4440B each connecting to a combination of switch units 4420. Switch 4400 has a similar structure to that of switch 2700 of FIG. 27. The main difference is that an inner memory device 2740 in switch 2700 may be a conventional shared wide memory with exclusive cyclic access (hence the temporal multiplexers/demultiplexers 2730) while an inner memory device 4440 in switch 4400 is based on contention-free interleaved access of a bank of memory devices as in FIGS. 4-7.

Exemplary switch 4400 comprises 20 switch units 4420 arranged into first-set combinations 4425 and second-set combinations 4426 so that each switch unit 4420 is a member of a combination of the first set and a combination of the second set. Each rotating-access memory device 4440A has five dual ports (five input ports and five output ports) and each rotating-access memory device 4440B has four dual ports. Each first-set combination 4425 includes four switch units 4420 which connect to input ports of a rotating-access memory device 4440B. Each second-set combination 4426 includes five switch units 4420 which connect to input ports of a rotating-access memory device 4440A.

Figure 45:
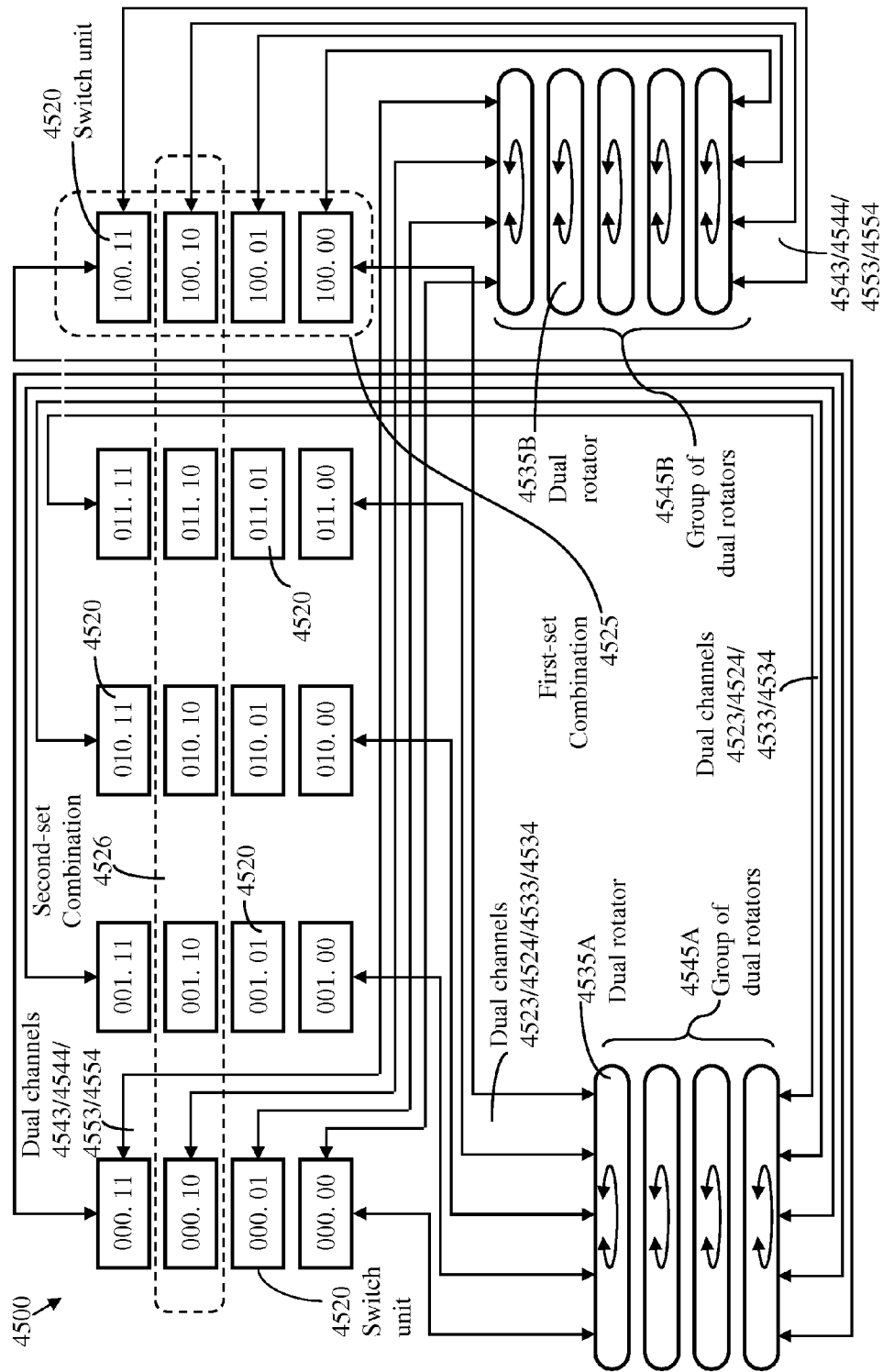
FIG. 45 illustrates a switch according to the present invention comprising a plurality of switch units organized into intersecting combinations where the switch units of each combination are interconnected by a dual rotator to form a temporal mesh.

FIG. 45 illustrates an exemplary switch 4500 according to the present invention comprising a plurality of switch units 4520, a first group 4545A of dual rotators 4535A each dual rotator connecting to a combination 4525 or 4526 of switch units 4420, and a second group 4545B of dual rotators 4535B each connecting to a combination of switch units 4420. A dual rotator comprises two rotators; an ascending rotator and a descending rotator rotating in opposite directions as described with reference to FIG. 3 and FIG. 11. The two rotators have the same number of dual ports; a dual port being an input port and an output port. Each switch unit 4500 has a dual channel to external sources (to be illustrated in FIG. 49). Each switch unit 4500 has a dual channel 4523/4524 from/to an ascending rotator of a dual rotator 4535A, a dual channel 4533/4534 from/to a descending rotator of the dual rotator 4535A, a dual channel 4543/4544 from/to an ascending rotator of a dual rotator 4535B, and a dual channel 4553/4554 from/to a descending rotator of the dual rotator 4535B.

Exemplary switch 4500 comprises 20 switch units 4520 arranged into first-set combinations 4425 and second-set combinations 4526 so that each switch unit 4520 is a member of a combination of the first set and a combination of the second set. Each dual rotator 4535A has five dual ports (five input ports and five output ports) and each dual rotator 4535B has four dual ports. Each first-set combination 4525 includes four switch units 4520 which connect to input ports of a dual rotator 4535B. Each second-set combination 4526 includes five switch units 4520 which connect to input ports of a dual 4535A.

Thus, the invention provides a switch comprising a set of N>2 switch units arranged in a plurality of combinations each combination comprising at least a number m of switch units. Within each combination, each switch unit cyclically connects to each other switch unit to form a temporal mesh. Each switch unit belongs to G combinations, G being a predefined number. The number m is selected to satisfy the inequality $N \leq m^G$. Any two combinations of the plurality of combinations have at most one switch unit in common. The switch further comprises an outer controller associated with each of the N switch units and a combination controller associated with each combination of the plurality of combinations. Each switch unit may interface with an access link to an external node or to local data sources and sinks. However, the number of switch units interfacing with external access links may be less than N.

Switch-Unit Connectivity

Switches 2700, 2800, 3000, 4400 and 4500 (FIGS. 27, 28, 30, 44 and 45, respectively) are based on lattice configurations with the switch units organized into intersecting combinations. In switches 2700, 2800, 3000, and 4400, the combinations are interconnected by either conventional shared-memory devices or rotating-access shared memory devices. In switch 4500, the combinations are interconnected through bufferless dual rotators. The connectivity of a switch unit to the connecting medium (shared-memory devices or bufferless dual rotators) differs among the lattice configurations as described below with reference to FIGS. 47-51.

Figure 46:
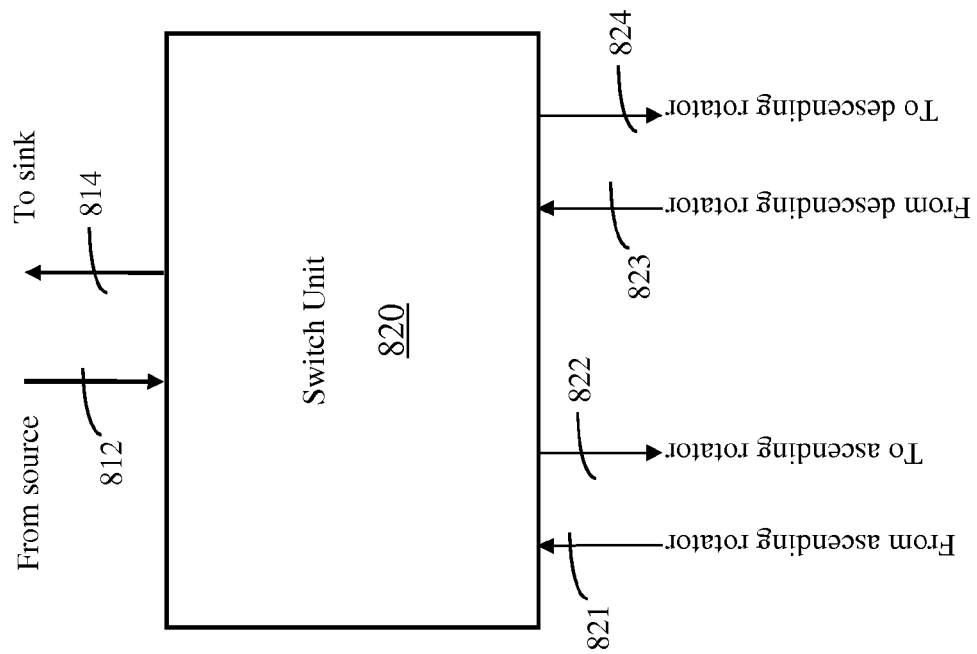
FIG. 46 illustrates the connectivity of a switch unit in the contention-free circulating switch of FIG. 8, according to an embodiment of the present invention.

FIG. 46 illustrates the connectivity of a switch unit 820 in the switch of FIG. 8. The switch unit 820 has an access dual port connecting to an ingress channel 812 from data sources or an external node, and an egress channel 814 to data sinks or to an external node. The switch unit 820 connects to an internal input channel 821 from a first rotator of dual rotator 825, an internal channel 822 to the first rotator, an internal channel 823 from a second rotator of dual rotator 825, and an internal channel 824 to the second rotator.

Figure 47:
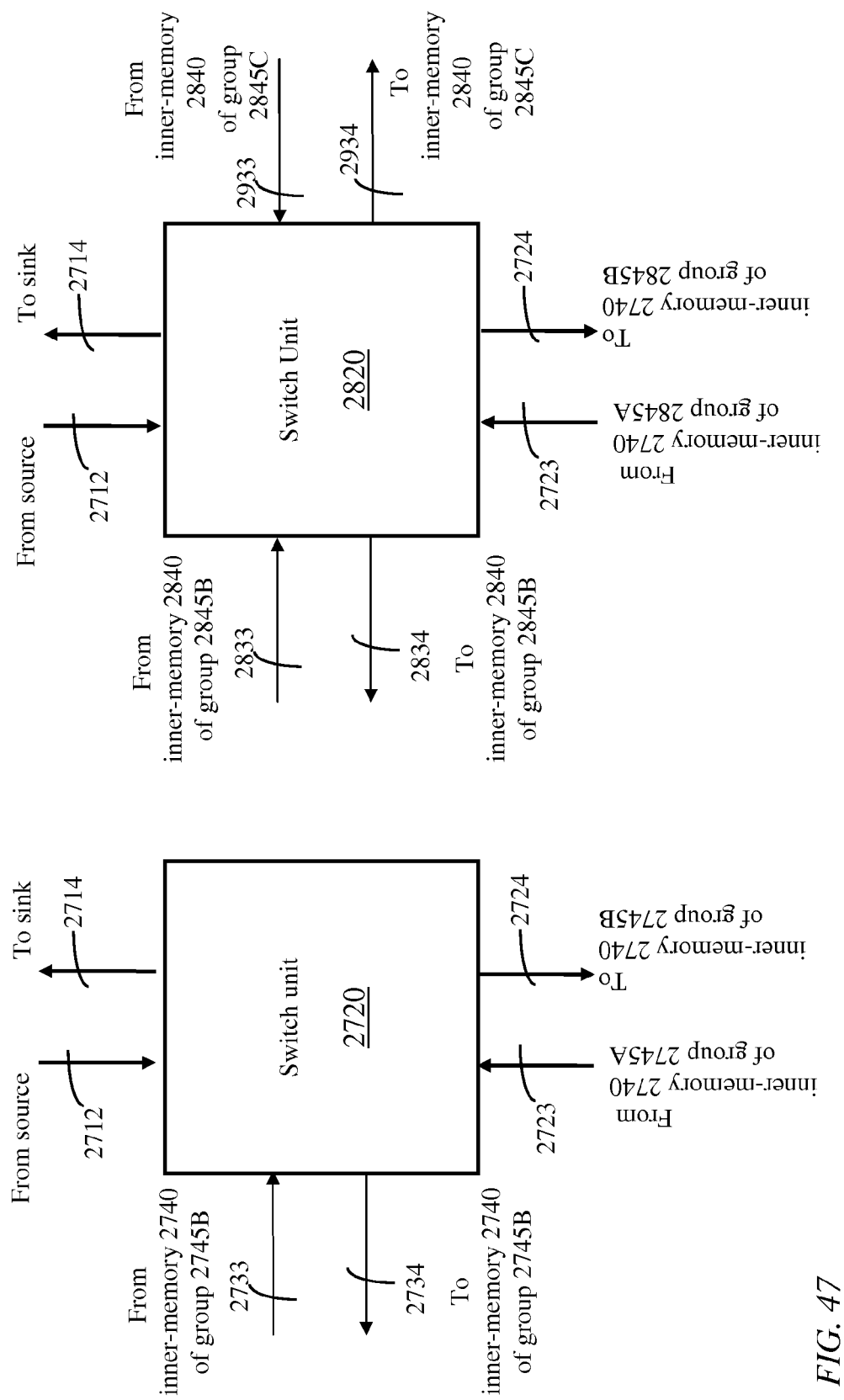
FIG. 47 illustrates the connectivity of a switch unit in the switch of FIG. 27 and the connectivity of a switch unit in the switch of FIG. 28 or the switch of FIG. 30, according to an embodiment of the present invention.

FIG. 47 illustrates the connectivity of a switch unit 2720 in the switch of FIG. 27. The switch unit 2720 has an access dual port connecting to an ingress channel 2712 from data sources or an external node, and an egress channel 2714 to data sinks or to an external node. The switch unit 2720 connects to an internal input channel 2723 from a first temporal demultiplexer, an internal channel 2724 to a first temporal multiplexer, an internal channel 2733 from a second temporal demultiplexer, and an internal channel 2734 to a second temporal multiplexer. The first temporal multiplexer and first temporal demultiplexer are collectively referenced in FIG. 27 as 2730A. The second temporal multiplexer and second temporal demultiplexer are collectively referenced in FIG. 27 as 2730B.

FIG. 47 also illustrates the connectivity of a switch unit 2820 in the switch of FIG. 28 (which is continued in FIG. 29). The switch unit 2820 has an access dual port connecting to an ingress channel 2812 from data sources or an external node, and an egress channel 2814 to data sinks or to an external node. The switch unit 2820 connects to an internal input channel 2823 from a first temporal demultiplexer, an internal channel 2824 to a first temporal multiplexer, an internal channel 2833 from a second temporal demultiplexer, an internal channel 2834 to a second temporal multiplexer, an internal channel 2933 from a third temporal demultiplexer, an internal channel 2934 to a third temporal multiplexer. The first temporal multiplexer and first temporal demultiplexer are collectively referenced in FIG. 28 as 2830A. The second temporal multiplexer and second temporal demultiplexer are collectively referenced in FIG. 28 as 2830B. The third temporal multiplexer and third temporal demultiplexer are collectively referenced in FIG. 29 as 2930.

Although switch 3000 of FIG. 30 is functionally distinct from switch 2800 of FIG. 2800 as described above with reference to FIG. 30, the connectivity of a switch unit 3020 to inner-memory devices 3040 of groups 3045A, 3045B, and 3045C is similar to the connectivity of switch unit 2820. Notably, if the inner-memory devices in switch 2800 or switch 3000 is a rotating-access memory device, the connectivity configuration of either a switch unit 2820 or 3020 differs slightly, with channels from/to temporal multiplexers demultiplexers becoming channels from/to rotators.

Figure 48:
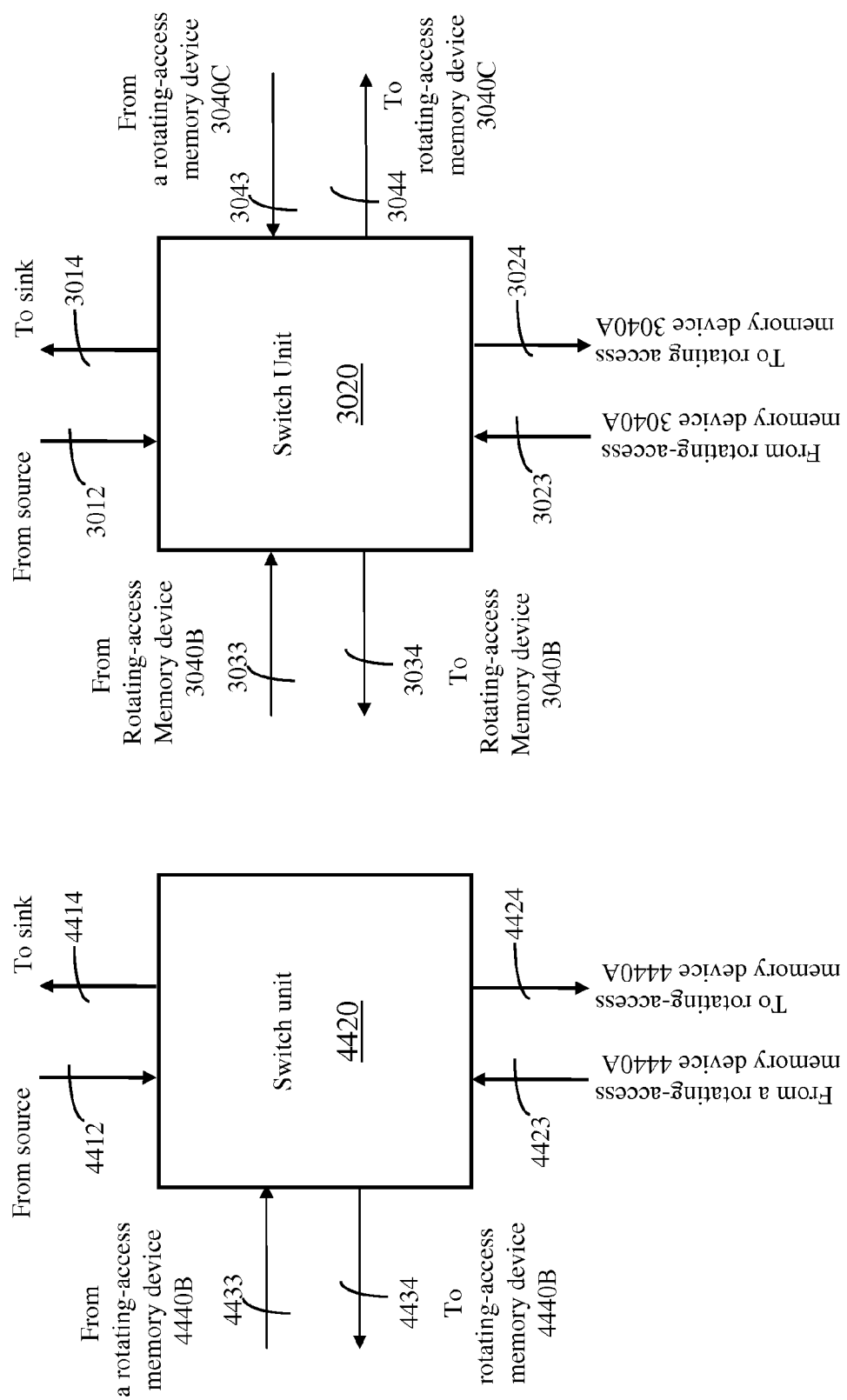
FIG. 48 illustrates the connectivity of a switch unit in the switch of FIG. 44 and the connectivity of a switch unit in the switch of FIG. 30.

FIG. 48 illustrates the connectivity of a switch unit 4420 in the switch of FIG. 44. The switch unit 4420 has an access dual port connecting to an ingress channel 4412 from data sources or an external node, and an egress channel 4414 to data sinks or to an external node. The switch unit 4420 connects to an internal input channel 4423 from a rotating-access memory device 4440A, an internal channel 4424 to rotating-access memory device 4440A, an internal channel 4433 from a rotating-access memory device 4440B, and an internal channel 4434 to rotating-access memory device 4440B.

FIG. 48 also illustrates the connectivity of a switch unit in switch 3000 of FIG. 30 where the switch units 3020 exchange data through rotating-access memory devices, according to an embodiment of the present invention.

The switch unit 3020 has an access dual port connecting to an ingress channel 3012 from data sources or an external node, and an egress channel 3014 to data sinks or to an external node. The switch unit 3020 connects to an internal input channel 3023 from a first rotating-access memory device 3040A, an internal channel 3024 to the first rotating-access memory device 3040A, an internal channel 3033 from a second rotating-access memory device 3040B, an internal channel 3034 to the second rotating-access memory device 3040B, an internal channel 3043 from a third rotating-access memory device 3040C, an internal channel 3044 to the third rotating-access memory device 3040C.

Figure 49:
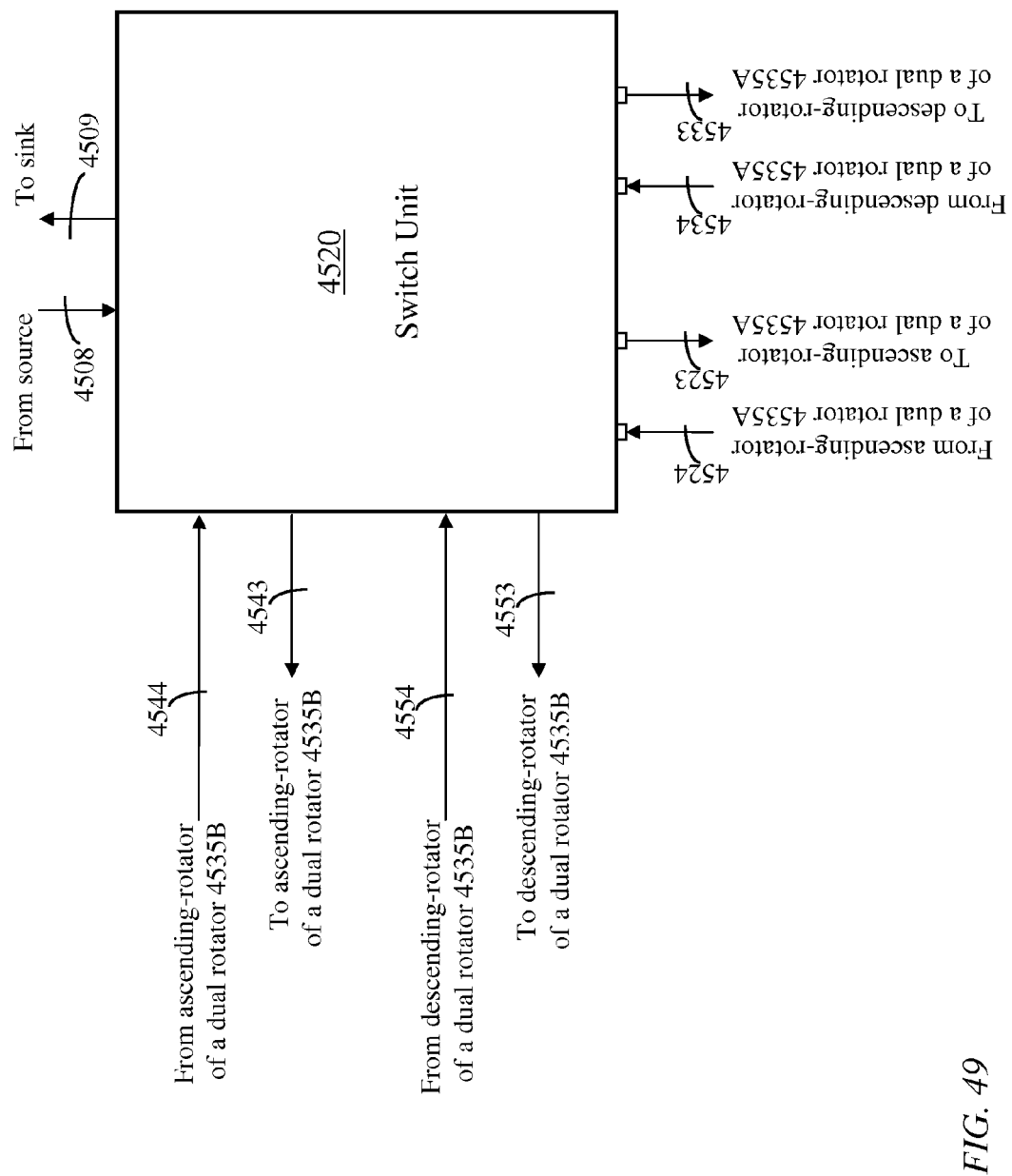
FIG. 49 illustrates the connectivity of a switch unit in the switch of FIG. 45 according to an embodiment of the present invention.

FIG. 49 illustrates the connectivity of a switch unit 4520 in switch 4500 of FIG. 45. The switch unit 4520 has an access dual port connecting to an ingress channel 4512 from data sources or an external node, and an egress channel 4514 to data sinks or to an external node. The switch unit 4520 connects to two internal input channels 4523 and 4533 from a first dual rotator 4535A, two internal channels 4524 and 4534 to first dual rotator 4535A, two internal channels 4543 and 4553 from a second dual rotator 4535B device 4440B, and two internal channels 4544 and 4554 to second dual rotator 4535B.

Network Based on Scalable Router-Switches

Figure 50:
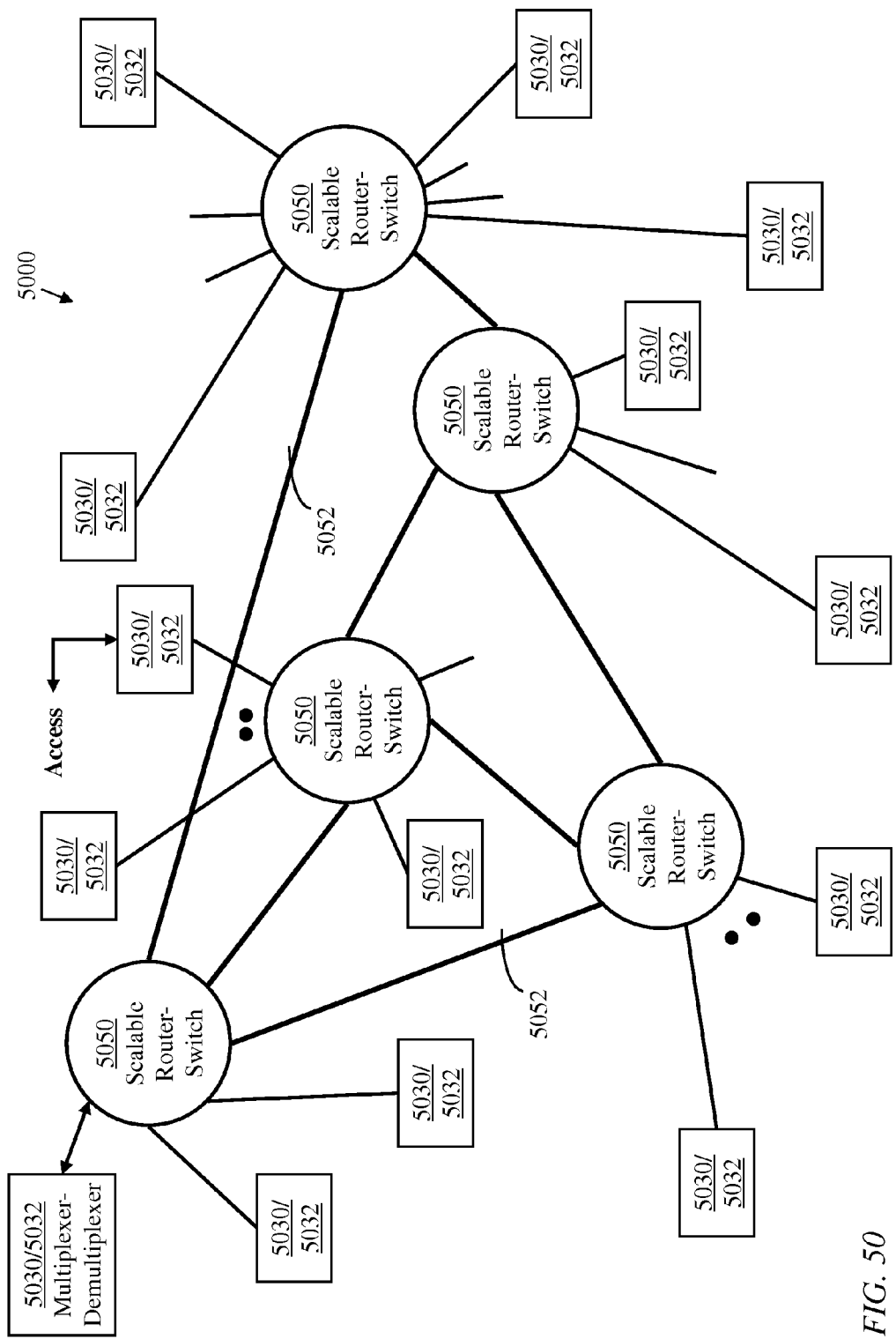
FIG. 50 illustrates a network using passive multiplexers/demultiplexers to connect access equipment directly to flow-rate-controlled scalable router-switches according to an embodiment of the present invention.

A typical data network comprises edge routers connecting to core routers, possibly through cross-connectors. FIG. 50 illustrates a simpler network 5000, having switch-routers 5050 interconnected through wavelength-division-multiplexed (WDM) links 5052, where edge routers may be eliminated altogether and data from access devices connect to scalable router-switches 5050 through passive temporal and spatial multiplexers/demultiplexers 5030/5032. The scalable router-switches 5050 provide multi-granular flow control. A multiplexer 5030 may comprise temporal multiplexers, each for time multiplexing signals received from access devices onto a wavelength channel, and spectral multiplexers, each for spectral multiplexing of wavelength channels received from temporal multiplexers onto a WDM link directed to a router-switch. A demultiplexer 5032 may comprise spectral demultiplexers, each for demultiplexing a WDM link from a router-switch 5050 into individual wavelength channels. A demultiplexer 5032 may also include temporal demultiplexers for time demultiplexing signals received over a wavelength channel from a router switch 5050, either directly or through a spectral demultiplexer, into time-slotted signals directed to different access devices.

Figure 51:
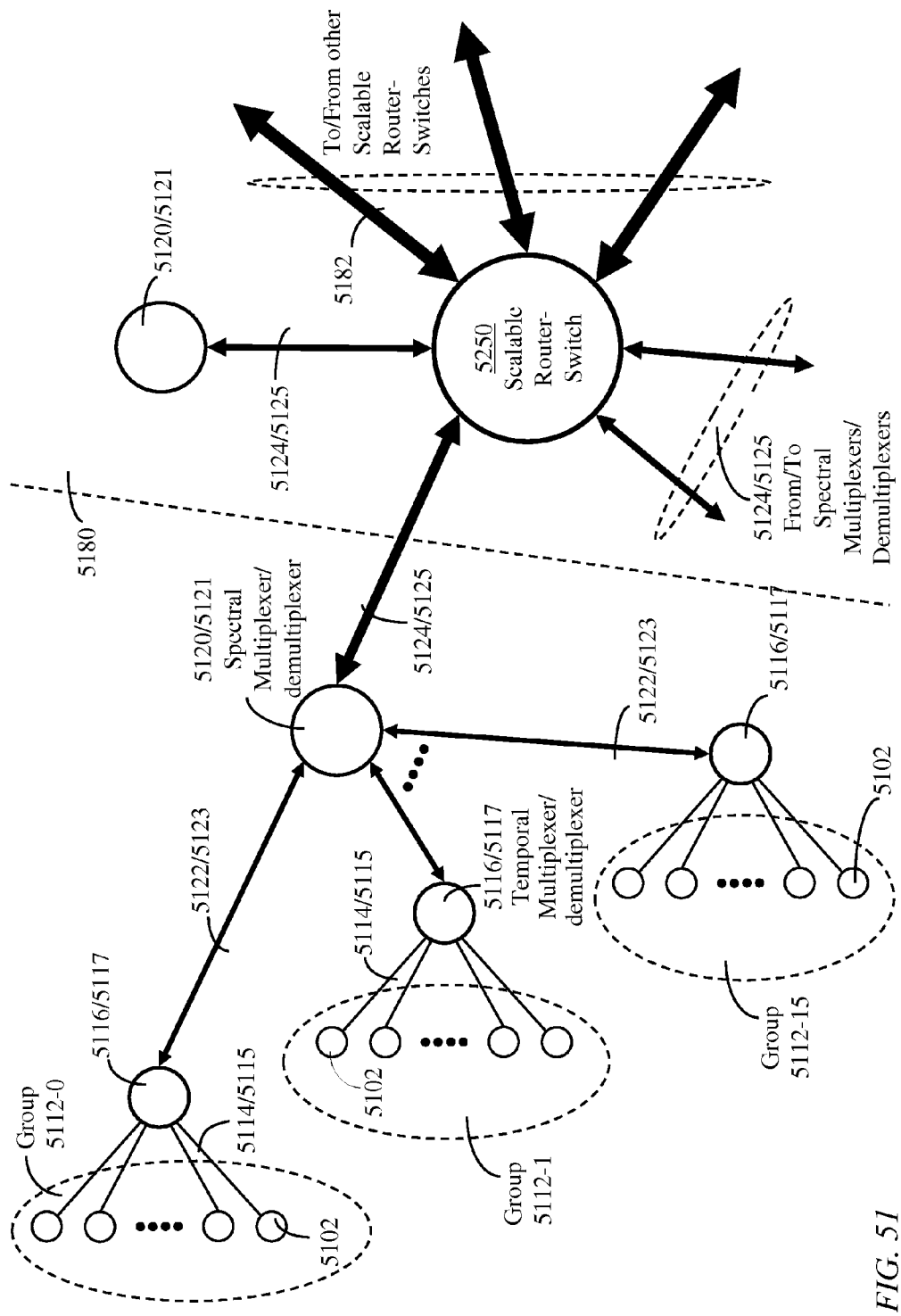
FIG. 51 illustrates access devices connecting to a router-switch in the network of FIG. 50 through temporal multiplexers-demultiplexers and spectral multiplexers-demultiplexers in accordance with an embodiment of the present invention.

FIG. 51 illustrates multiplexed paths from access devices 5102 to a scalable router-switch 5050. The access devices 5102 are arranged into groups 5112 each group comprising a number of access devices 5102. The access devices 5102 may transmit time-slotted signals and, hence, each access device is preferably provided with a time indicator, such as a time counter. Data from access devices 5102 of a group 5112 are transmitted over local channels 5114 and time multiplexed in a temporal multiplexer 5116 into an upstream channel 5122 connecting the temporal multiplexer 5116 to a passive spectral multiplexer 5120. Upstream channels 5122 from several temporal multiplexers 5116 may be multiplexed at spectral multiplexer 5120 into a wavelength-division-multiplexed (WDM) link 5124 which terminates on a scalable router-switch 5050. In the downstream direction, spectral demultiplexer 5121 de-multiplexes a WDM link 5125 from router-switch 5050, which has optical/electrical (O/E) and electrical/optical (E/O) interfaces, into individual wavelength channels 5123 which are routed to corresponding temporal demultiplexers 5117. Each temporal demultiplexer 5117 cyclically distributes the signal it receives from a channel 5123 to respective access devices 5102. Each access device 5102 detects a baseband signal from the time-slotted optical signal it receives. A spectral-demultiplexer 5120/5121 together with its subtending temporal multiplexers-demultiplexers 5116/5117 constitute a multiplexer-demultiplexer 5030/5032 in network 5000. Line 5180 in FIG. 51 separates the illustrated passive access system from the network core.

Figure 52:
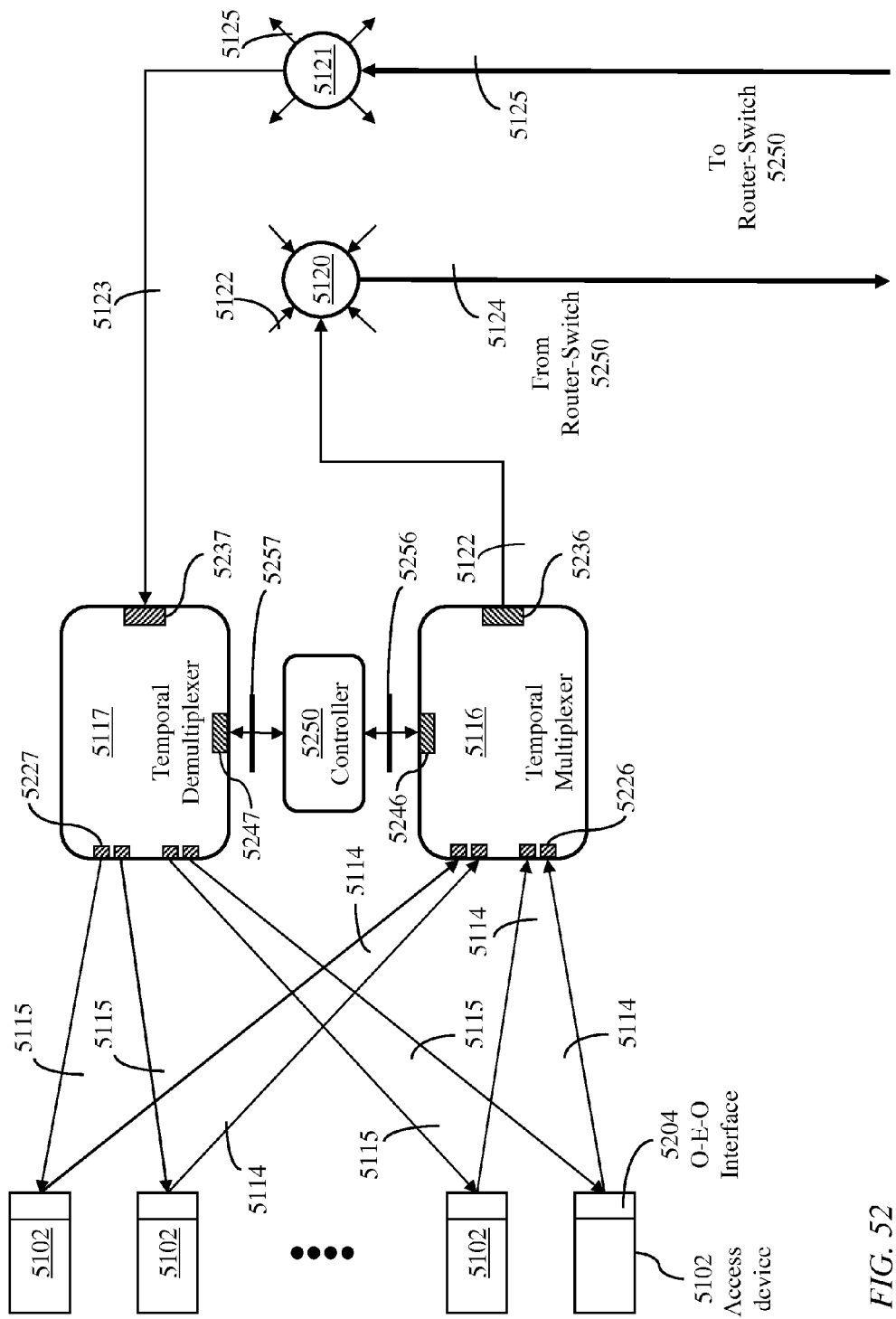
FIG. 52 illustrates access devices connecting to a temporal multiplexer and a temporal demultiplexer in accordance with an embodiment of the present invention.

FIG. 52 illustrates a temporal multiplexer 5116, for multiplexing time-slotted signals received from a group 5112 of access devices 5102 through channels 5114 onto an upstream wavelength channel 5122, and a temporal demultiplexer 5117 for demultiplexing time-slotted signals carried on a downstream wavelength channel 5123 onto channels 5115 each leading to an access device 5102. Temporal multiplexer 5116 has a number of input ports 5226 at least equal to the number of access devices 5102 in group 5112, an output port 5236 connecting to upstream channel 5122, and a control port 5246 connecting to an access-group controller 5250. Temporal demultiplexer 5117 has an input port 5237 terminating downstream channel 5123, a number of output ports 5227 equal to the number of access devices 5102 in group 5112, and a control port 5247 connecting to access-group controller 5250. Access-group controller 5250 preferably comprises a time indicator, such as a time counter, in order to exchange time-alignment signals with other network elements when needed.

The propagation delays along channels 5114 from the group 5112 of access devices 5102 may vary significantly; for example from 1 microsecond to 50 microseconds. The transmission of time-slotted signals from the access devices 5102 has to be timed so that the time-slotted signals from the access devices 5102 arrive at the temporal multiplexer 5116 at consecutive time slots. Two methods may be used to set the transmission times from the access devices 5102.

In a first method, each access device 5102 in the group 5112 may time-lock to the temporal multiplexer 5116 by exchanging time indications with access-group controller 5250. In a time-locking process, a first device time locks to a second device by transmitting a time indication, as read from a first time-indicator, to the second device, receiving a corresponding time indication as read from a second time-indicator located with the second device, and re-setting the first time indicator accordingly. Details of a time-locking process are disclosed in U.S. Pat. No. 7,117,257 issued on Oct. 3, 2006 and titled "Multi-phase adaptive network configuration".

An exchange of time-indications between each access device 5102 and access-group controller 5250 may take place over a round-trip path traversing a channel 5114, an input port 5226 of temporal-multiplexer 5116, control port 5246, access-group-controller 5250, control port 5247, output port 5227 of temporal demultiplexer 5117, and a channel 5115.

In a second method, each access device 5102 may time-lock to a port in router-switch 5050 to which channel 5122 originating from temporal multiplexer 5116 connects. The second method is based on the observation that the access devices 5102 of a given group 5112 have different channels 5114 to temporal multiplexer 5116 but their multiplexed time-slotted signals share a common wavelength channel 5122 to spectral multiplexer 5120 and a common wavelength channel in link 5124 to an ingress port of a router-switch 5050. Ensuring that the time-slotted signals arrive in order at the ingress port of the switch-router 5050 implies that the time-slotted signals also arrive in proper order at the input ports 5226 of temporal multiplexer 5116. The ingress and egress ports of router-switch 5050 are paired into integrated dual ports. Thus, a round-trip path is available for exchange of time indications between any access device 5102 in a group 5112 and a respective dual ingress-egress port in router-switch 5050.

An upstream link 5124 from a spectral multiplexer 5120 comprises a number of multiplexed channels 5122, each channel 5122 originating from an access-device group 5112 and carrying time-multiplexed signals from access devices 5102 of the access-device group 5112. A downstream link 5125 comprises spectrally multiplexed channels each originating from an output port of a router-switch 5050 and carrying time-multiplexed signals destined to an access-device group 5112. Spectral demultiplexer 5121 demultiplexes downstream link 5125 into its constituent channels 5123.

Figure 53:
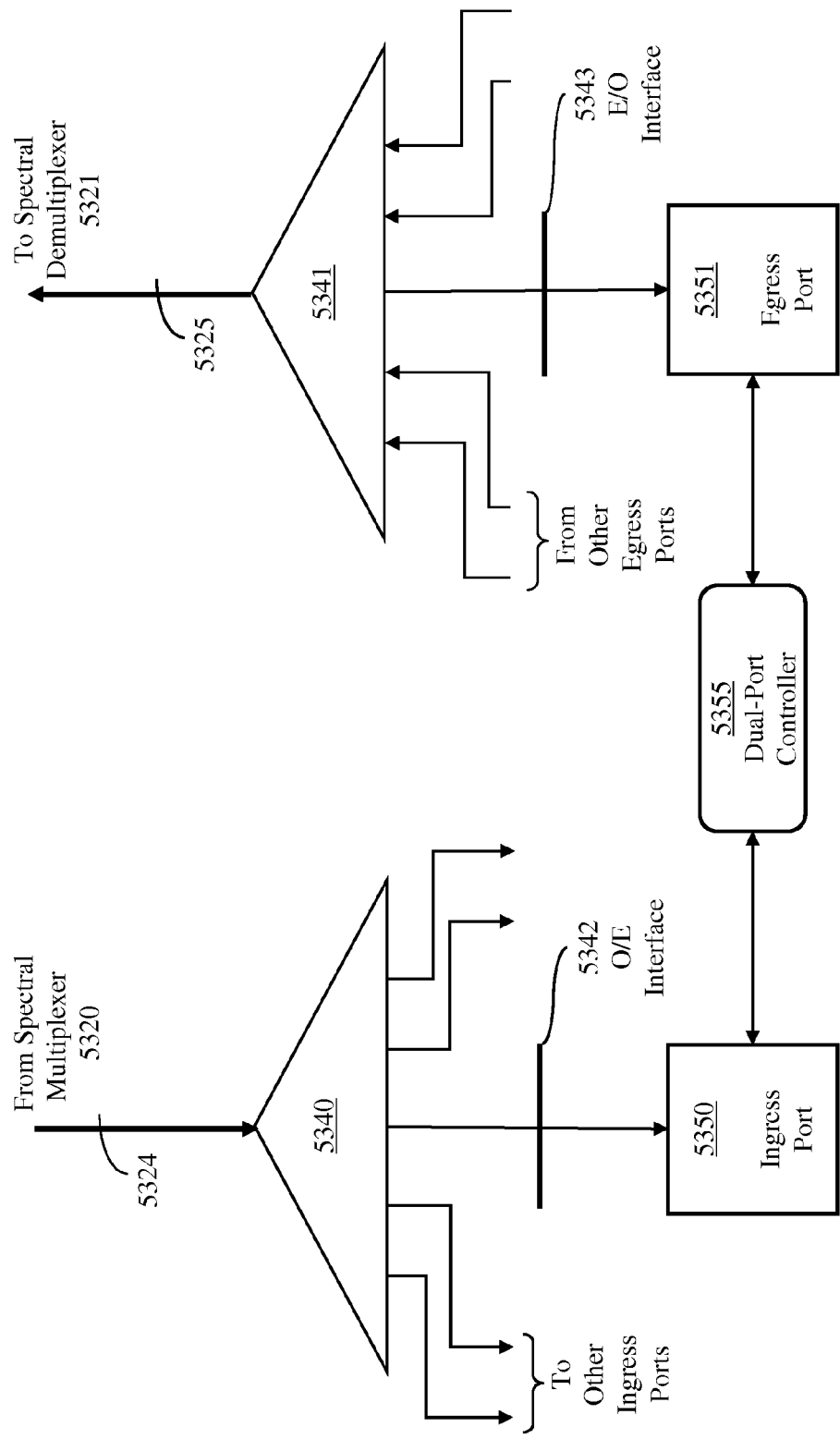
FIG. 53 illustrates interfaces of a downstream WDM link and an upstream WDM link with ingress ports and egress ports of a router-switch in accordance with an embodiment of the present invention.

At a router-switch 5050, a spectral demultiplexer 5540 (FIG. 53) demultiplexes an upstream link 5124 into channels 5322 each connecting to an ingress port 5350 of the router-switch 5050. A spectral multiplexer 5541 multiplexes channels 5323, each originating from an egress port 5351 of the router-switch 5050 and carrying time-multiplexed signals directed to an access-device group 5112, onto downstream link 5125. Each channel 5322 (FIG. 53) corresponds to a channel 5122 (FIG. 51) and each channel 5123 corresponds to a channel 5323. A dual-port controller 5355 in communication with the ingress port 5350 and egress port 5351 may have a time indicator, such as a time counter, and time-locking circuitry to facilitate time-locking each of the access devices 5102 sharing a channel 5322 to the dual-port controller 5355. As described above, the access devices 5102 sharing an upstream channel 5114 may time-lock to either a controller 5250 (FIG. 52) of a respective temporal multiplexer-demultiplexer 5116/5117 (FIGS. 51-52) or to a respective port of router-switch 5050. An optical-to-electrical (O/E) conversion interface 5542 demodulates the optical signal received from a channel 5322 to produce an electronic signal comprising time-multiplexed data segments originating from an access-device group 5112. An electrical-to-optical (E/O) conversion interface 5543 modules an optical carrier and transmits the modulated carrier on an upstream channel 5323.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A switch comprising:
    a plurality of switch units, each having a memory device, said switch units arranged into switch modules, each switch module including m switch units, m>1, and each of said m switch units of said each switch module connecting to κ switch units, κ>1, of κ different switch modules, through κ channels, to create a full spatial mesh of (m×κ+1) switch modules where each switch module has a channel to each other switch module,
    wherein said m switch units of said each switch module are interconnected, through a plurality of dual rotators, in a contention-free temporal mesh;
    and wherein each switch unit in said each switch module
        receives primary data blocks from an ingress port, each primary data block having m data segments of arbitrary destination switch modules;
        switches said primary data blocks without contention to other switch units of said each switch module through said dual rotators;
        receives switched primary data blocks from switch units of said each switch module;
        merges, in an associated consolidation unit, data segments of different primary data blocks into secondary data blocks, each secondary data block having m data segments directed to a selected switch module.

2. The switch of claim 1 wherein said m data segments of each said primary data block are allocated respective identical memory addresses in said m switch units and said m data segments of each said secondary data block are allocated respective identical memory addresses in said m switch units.

3. In a switch comprising a plurality of switch units organized into a plurality of switch modules interconnected to form a spatial mesh where each switch module has a channel to each other switch module, each switch module having a number m, m>1, of said plurality of switch units, a method of switching comprising:
- receiving, at ingress ports coupled to said switch units, data packets of arbitrary lengths from external sources;
- segmenting each said data packet into data segments of equal lengths;
- assembling said data segments into primary data blocks, according to a first criterion, each primary data block comprising m data segments;
- switching, without contention, each of said primary data blocks through a respective switch module among said plurality of switch modules;
- disassembling, at inner consolidation units, switched primary data blocks into primary constituent data segments;
- reassembling, at said inner consolidation units, said primary constituent data segments of different primary data blocks into secondary data blocks according to a second criterion, each secondary data block having m data segments; and
- switching, without contention, each of said secondary data blocks through a selected switch module.

4. The method of claim 3 further comprising a step of disassembling switched secondary data blocks at egress ports of said selected switch module into constituent secondary data segments for transmission to external data sinks.

5. The method of claim 4 wherein said first criterion is an identifier of a switch module from among said plurality of switch modules and said second criterion is an identifier of a switch unit of said selected switch module.

6. The method of claim 3 further comprising steps of:
- disassembling, at said inner consolidation units, switched secondary data blocks into secondary constituent data segments;
- reassembling, at said inner consolidation units, said secondary constituent data segments into ternary data blocks according to a third criterion, each ternary data block having m data segments destined for a single egress port of a particular switch module;
- switching said each ternary data block through said particular switch module;
- disassembling said ternary data block at said single egress port into ternary constituent data segments;
- reconstructing egress data packets from said ternary constituent data segments, where each egress data packet comprises at least one ternary constituent data segment; and
- transmitting said egress data packets to respective external data sinks.

7. The method of claim 6 wherein said first criterion is an identifier of a switch module from among said plurality of switch modules, said second criterion is an identifier of another switch module from among said plurality of switch modules, and said third criterion is an identifier of an egress port of said particular switch module.

8. The method of claim 6 wherein said m data segments of said each primary data block have arbitrary destination switch units, said m data segments of said each secondary data block are destined for switch units of a single switch module among said plurality of switch modules, and said m data segments of said each ternary data block are destined for a single egress port.

9. The method of claim 6 further comprising inserting null data segments in any of said primary data blocks, secondary data blocks, and ternary data block where needed to create data blocks each containing exactly m data segments.

10. The switch of claim 1 wherein said ingress port:
- receives data packets of arbitrary lengths from external sources;
- segments each said data packet into data segments of equal lengths; and
- assembles said data segments into said primary data blocks.

11. The switch of claim 1 further comprising egress ports, each egress port coupled to a respective switch unit among said plurality of switch units, said each egress port:
- receives switched data blocks from said respective switch unit, each switched data block comprising m data segments;
- disassembles each said switched data block into constituent data segments;
- reconstructs egress data packets from said constituent data segments, where each egress data packet comprises at least one constituent data segment; and
- transmits said egress data packets to respective external data sinks.

12. A switch comprising a plurality of switch modules, each switch module comprising:
- a respective plurality of input switch units divided into:
  - a number $m_1$ of ingress switch units, $m_1 \geq 1$; and
  - a number $m_2$ of inner input switch units $m_2 > 1$;
- $m_1$ egress switch units;
- $m_2$ inner output ports; and
- a rotating-access shared memory connecting to said ingress switch units, inner input switch units, egress switch units, and inner output ports;
- wherein said each switch module provides contention-free switching from any input switch unit to any inner output port and contention-based switching from any input switch unit to any egress switch unit; and
- wherein each inner output port of said each switch module connects to an inner input switch unit of a respective switch module through an inter-module channel to form a full spatial mesh interconnection of $(m_2+1)$ switch modules of said plurality of switch modules thereby providing a configuration of said switch having a number $m_1 \times (m_2+1)$ of ingress switch units and a number $m_1 \times (m_2+1)$ of egress switch units.

13. The switch of claim 12 wherein $m_2 = 2 \times m_1$.

14. The switch of claim 12 wherein said rotating access shared memory comprises an input rotator connecting said input switch units to a bank of memory devices and an output rotator connecting said bank of memory devices to said egress switch units and to said inner output ports.

15. The switch of claim 12 wherein each ingress switch unit:
- receives data packets of arbitrary sizes from external data sources;
- segments said data packets into data segments of a predetermined size;
- places data segments destined for said egress switch units of said each switch module in a first set of queues, each queue corresponding to an egress switch unit;
- aggregates data segments destined for other switch modules into data blocks, each data block containing $(m_1 + m_2)$ data segments; and
- places said data blocks in a second set of queues, each queue corresponding to one of said inner output ports of said each switch module.

16. The switch of claim 15 wherein said each switch module:
- switches individual data segments placed in said first set of queues to respective egress switch units; and switches data blocks placed in said second set of queues, without contention, to respective inner output ports of said each switch module.

17. The switch of claim 15 wherein each inner input switch unit:

receives switched data blocks from an inner output port of another switch module, each switched data block containing ($m_1+m_2$) data segments;

disassembles each switched data block into its constituent data segments;

places data segments, among said constituent data segments, destined for said egress switch units of said each switch module in a third set of queues, each queue corresponding to an egress switch unit;

aggregates data segments destined for other switch modules into data blocks, each data block containing ($m_1+m_2$) data segments; and places said data blocks in a fourth set of queues, each queue corresponding to one of said inner output ports of said each switch module.

18. The switch of claim 17 wherein said each switch module:

switches individual data segments placed in said third set of queues to respective egress switch units; and switches data blocks placed in said fourth set of queues, without contention, to respective inner output ports of said each switch module.

19. The switch of claim 12 further comprising an occupancy-state memory, communicatively coupled to controllers of said plurality of switch modules, for storing an occupancy-tracking matrix 2000 for tracking occupancy of inter-module channels, each entry 2002 of said occupancy-tracking matrix indicating available capacity along each inter-module channel in the direction from an inner output port of said each switch module to a respective inner switch unit of another switch module.

20. The switch of claim 15 wherein a sum of the numbers $m_1$ and $m_2$ is limited by a permissible delay of forming said each data block containing ($m_1+m_2$) data segments.

* * * * *